US011358616B2

(12) United States Patent
Gupta et al.

(10) Patent No.: US 11,358,616 B2
(45) Date of Patent: Jun. 14, 2022

(54) APPARATUS FOR VISCOUS HYDROCARBON TRANSPORTATION

(71) Applicant: FCCL Partnership, Calgary (CA)

(72) Inventors: Subodh Gupta, Calgary (CA); Michael N. Holmes, Calgary (CA); Jennifer D. Wood, Calgary (CA); Sarbajit Banerjee, College Station, TX (US); Robert V. Dennis-Pelcher, Cuyahoga Falls, OH (US); Lacey Douglas, Bryan, TX (US); Thomas E. O'Loughlin, College Station, TX (US)

(73) Assignee: FCCL Partnership, Calgary (CA)

( * ) Notice: Subject to any disclaimer, the term of this patent is extended or adjusted under 35 U.S.C. 154(b) by 697 days.

(21) Appl. No.: 15/807,382

(22) Filed: Nov. 8, 2017

(65) Prior Publication Data

US 2018/0186388 A1    Jul. 5, 2018

(30) Foreign Application Priority Data

Nov. 9, 2016 (CA) .................................. CA2948169

(51) Int. Cl.
*B61D 17/18* (2006.01)
*B61D 49/00* (2006.01)
(Continued)

(52) U.S. Cl.
CPC ............... *B61D 17/18* (2013.01); *B05D 5/02* (2013.01); *B61D 3/16* (2013.01); *B61D 5/00* (2013.01);
(Continued)

(58) Field of Classification Search
CPC .......... B61D 17/18; B61D 5/00; B61D 47/00; B61D 3/16; B61D 17/00; B61D 49/00;
(Continued)

(56) References Cited

U.S. PATENT DOCUMENTS 4,658,989 A    4/1987 Bonerb
5,693,236 A *  12/1997 Okumura ................. C09K 3/18
                                                    216/11
(Continued)

FOREIGN PATENT DOCUMENTS

CA    2706377 A1    5/2009
CA    2704204 A1    8/2009
(Continued)

OTHER PUBLICATIONS

Bramfitt et al., "Metallographer's Guide: Practices and Procedures for Irons and Steels," ASM International, 2001, pp. 302-304.
(Continued)

*Primary Examiner* — James C Yager

(57) ABSTRACT

A vessel for transporting a material that is solid or semi-solid at ambient temperature, includes a body having an interior surface comprising textured metal, and a superoleophobic coating on the interior surface for inhibiting the material from adhering to the interior surface, the superoleophobic coating including a nanotextured coating disposed on the textured metal and functionalized with a fluorinated compound. The superoleophobic coating facilitates flow of the material along the interior surface.

8 Claims, 22 Drawing Sheets

(51) Int. Cl.
  *C09D 1/00* (2006.01)
  *B05D 5/02* (2006.01)
  *C23C 28/00* (2006.01)
  *C23F 17/00* (2006.01)
  *B61D 5/00* (2006.01)
  *B61D 47/00* (2006.01)
  *B61D 3/16* (2006.01)
  *B61D 17/00* (2006.01)
  *B82Y 30/00* (2011.01)

(52) U.S. Cl.
  CPC .............. *B61D 17/00* (2013.01); *B61D 47/00* (2013.01); *B61D 49/00* (2013.01); *C09D 1/00* (2013.01); *C23C 28/345* (2013.01); *C23C 28/36* (2013.01); *C23F 17/00* (2013.01); *B05D 2202/10* (2013.01); *B05D 2259/00* (2013.01); *B82Y 30/00* (2013.01); *Y02T 30/00* (2013.01)

(58) Field of Classification Search
  CPC ........ C09D 1/00; B05D 5/02; B05D 2259/00; B05D 2202/10; C23C 28/36; C23C 28/345; C23F 17/00; Y02T 30/30; B82Y 30/00
  USPC ...... 428/141, 142, 213, 336, 34.1, 402, 408, 428/447, 450
  See application file for complete search history.

(56) References Cited

U.S. PATENT DOCUMENTS

| | | |
|---|---|---|
| 6,858,090 B2 | 2/2005 | Hebert |
| 8,580,027 B1 | 11/2013 | Campos et al. |
| 8,651,580 B2 | 2/2014 | Hagenbuch |
| 8,690,259 B2 | 4/2014 | Hagenbuch |
| 2008/0229976 A1 | 9/2008 | Amos et al. |
| 2010/0080957 A1 | 4/2010 | Chinn et al. |
| 2013/0192993 A1 | 8/2013 | Mardilovich et al. |
| 2014/0011013 A1 | 1/2014 | Jin et al. |
| 2014/0020783 A1 | 1/2014 | Zazovsky et al. |
| 2014/0147627 A1* | 5/2014 | Aizenberg ............ A61L 33/064 428/141 |
| 2015/0175814 A1* | 6/2015 | Aizenberg ............ B65D 25/14 428/312.8 |
| 2016/0153094 A1 | 6/2016 | Tuteja et al. |

FOREIGN PATENT DOCUMENTS

| | | |
|---|---|---|
| CA | 2850442 A1 | 4/2013 |
| WO | 2013101544 A1 | 7/2013 |
| WO | WO2016014946 A2 * | 1/2016 |

OTHER PUBLICATIONS

Brown et al., "Durable, Superoleophobic Polymer-Nanoparticle Composite Surfaces With Re-Entrant Geometry via Solvent-Induced Phase Transformation," Scientific Reports, 2016, vol. 6 (1), Article No. 21048.

Peng et al., "Mechanically Durable Superoleophobic Aluminum Surfaces With Microstep and Nanoreticula Hierarchical Structure for Self-cleaning and Anti-smudge Properties," Journal of Colloid and Interface Science, Jan. 2016, vol. 461, pp. 273-284.

Timpel et al., "Surface Modification of ZnO(0001)—Zn With Phosphonate-Based Self-Assembled Monolayers: Binding Modes, Orientation, and Work Function," Chemistry of Materials, Sep. 2014, vol. 26 (17), pp. 5042-5050.

Velazquez et al., "Effective Piezoelectric Response of Substrate-integrated ZnO Nanowire Array Devices on Galvanized Steel," ACS Applied Materials & Interfaces, Nov. 2013, vol. 5 (21), pp. 10650-10657.

Velazquez et al., "Nanotexturation-Induced Extreme Wettability of an Elemental Tellurium Coating," Journal of Materials Chemistry, 2012, vol. 22, pp. 3335-3339.

* cited by examiner

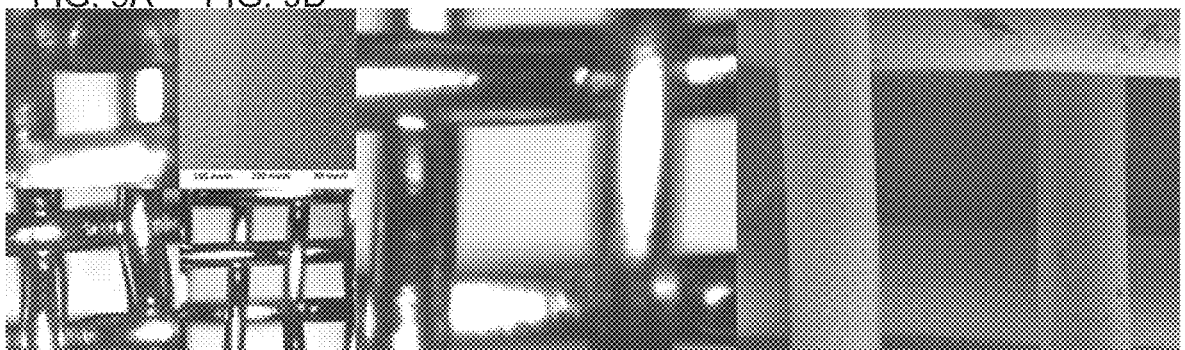
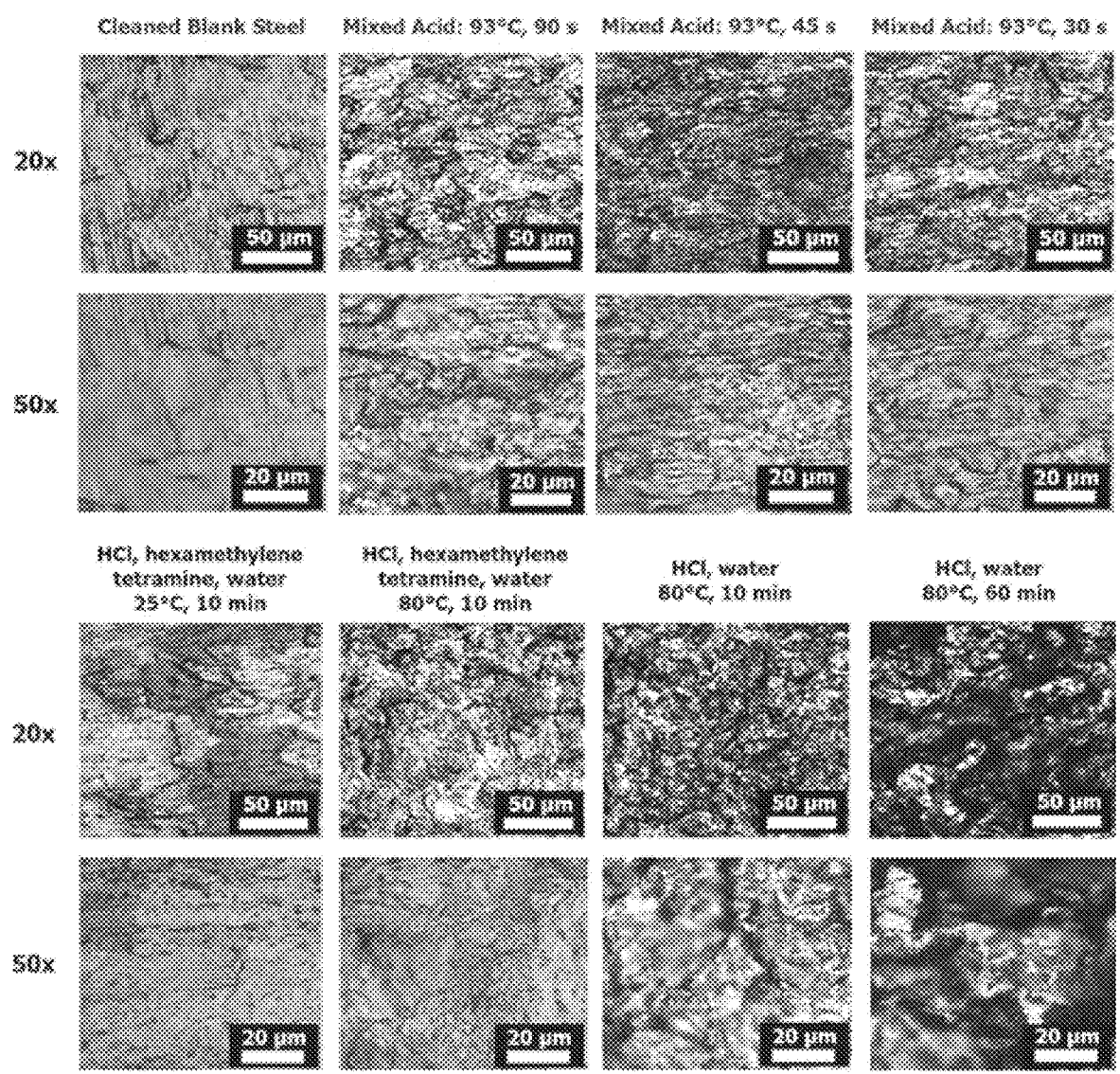
FIG. 10

FIG. 12A  63°± 3°       FIG. 12B  40°± 8°
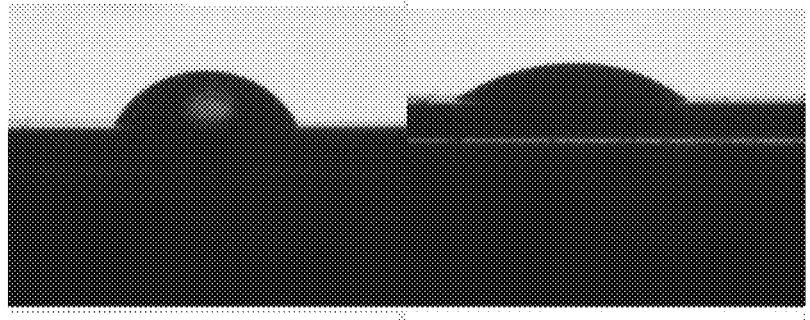
FIG. 12C  108°± 9°      FIG. 12D  133°± 3°
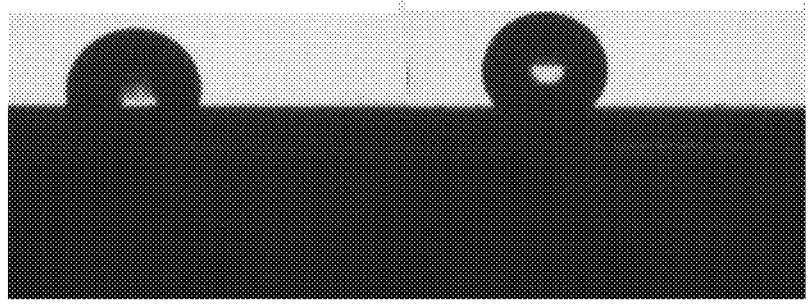
FIG. 13A  63°± 3°       FIG. 13B  10°± 1°
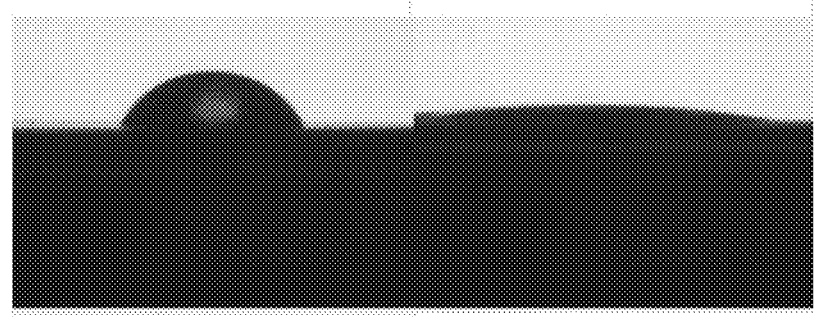
FIG. 13C  108°± 9°      FIG. 13D  158°± 4°
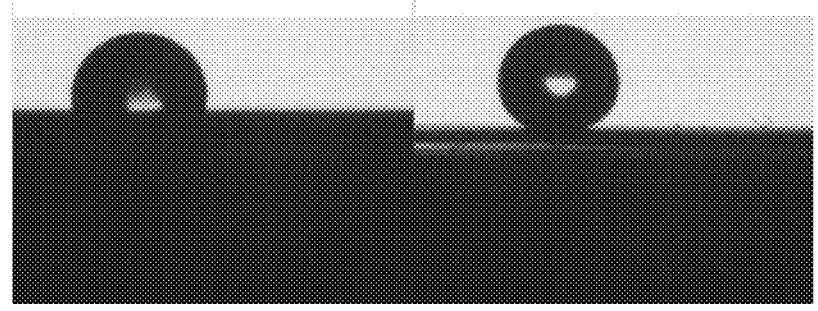

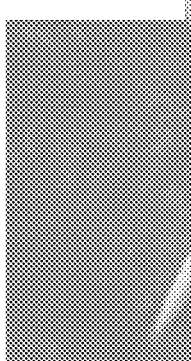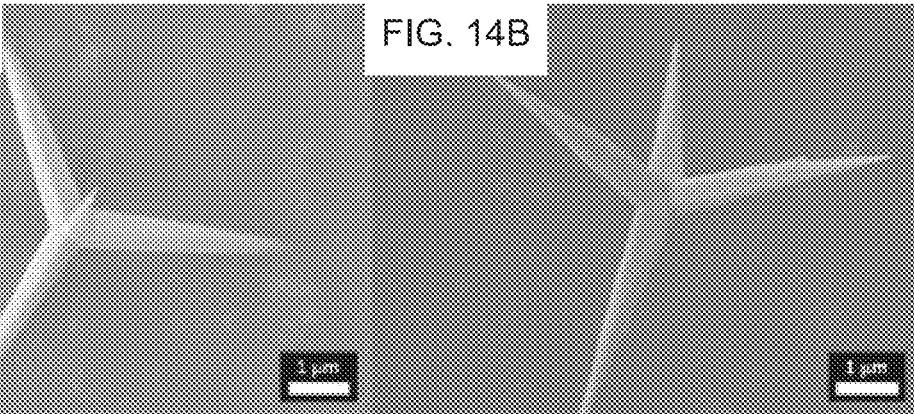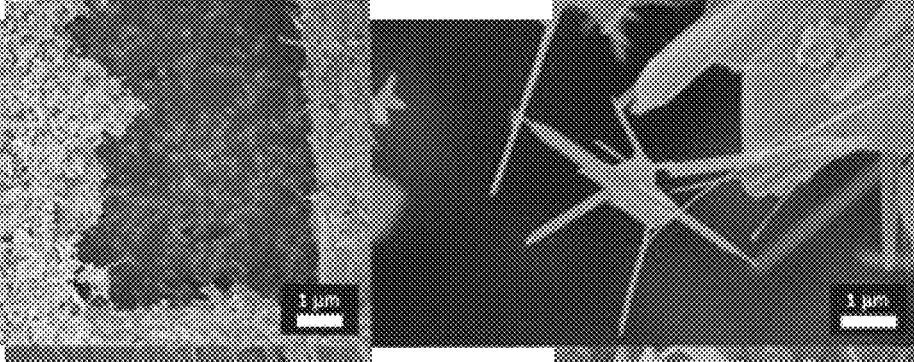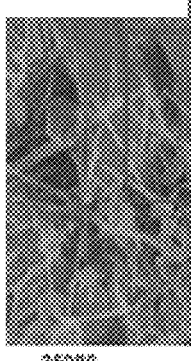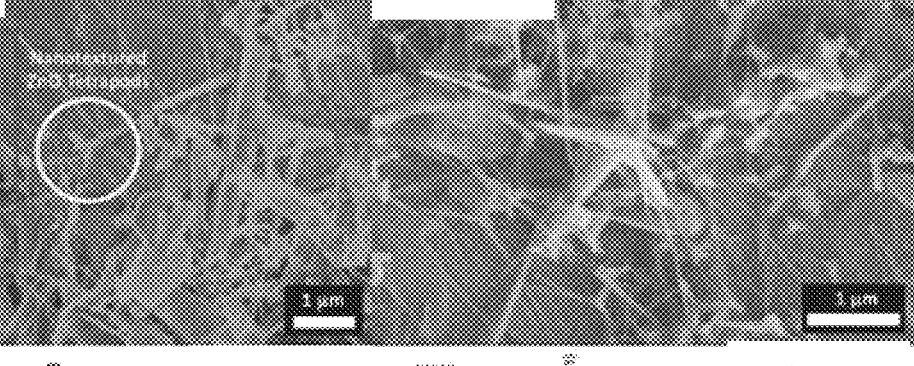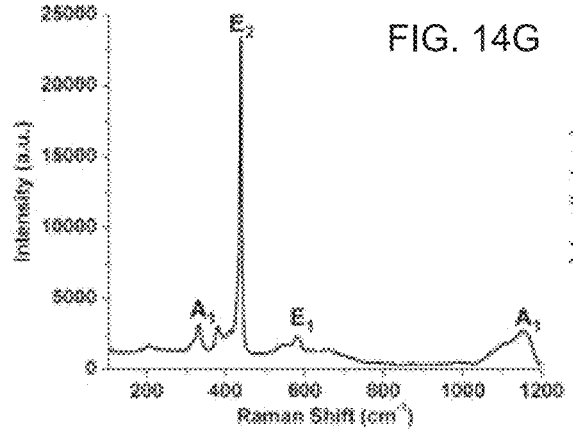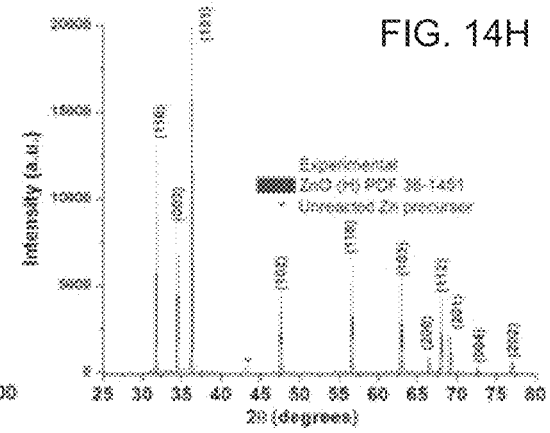

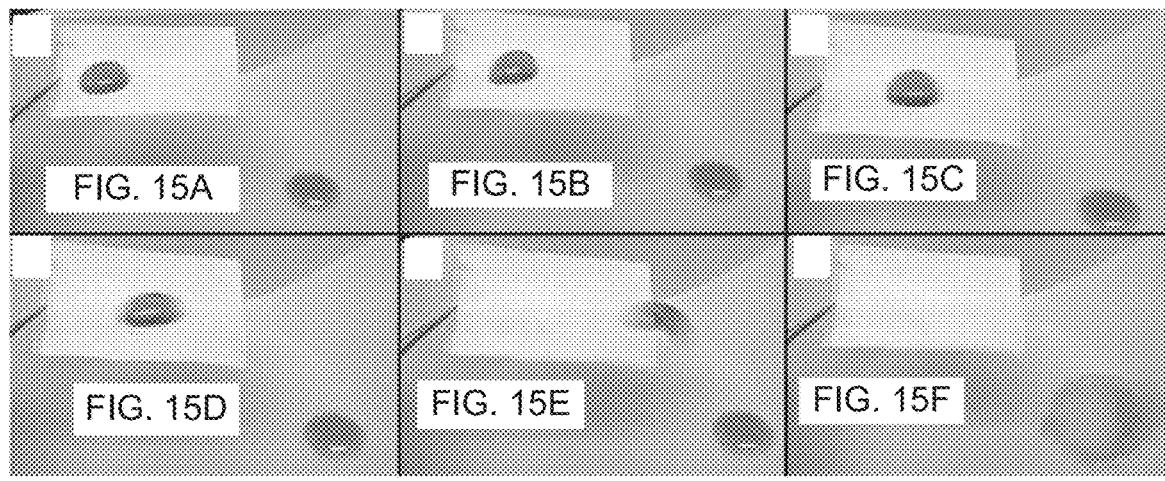
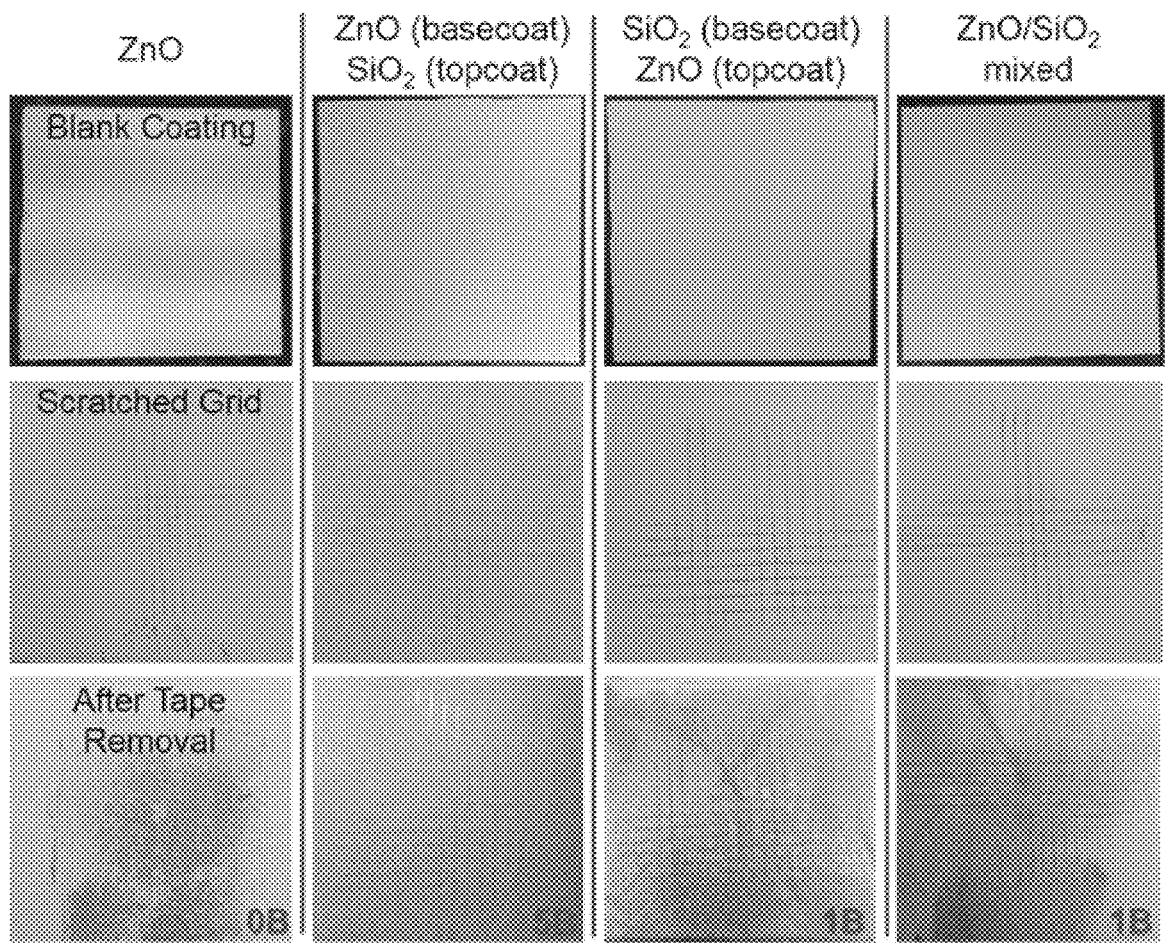
FIG. 16

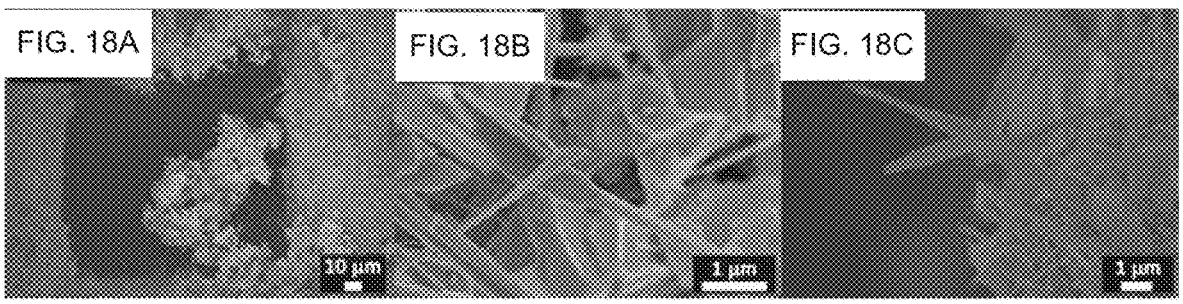
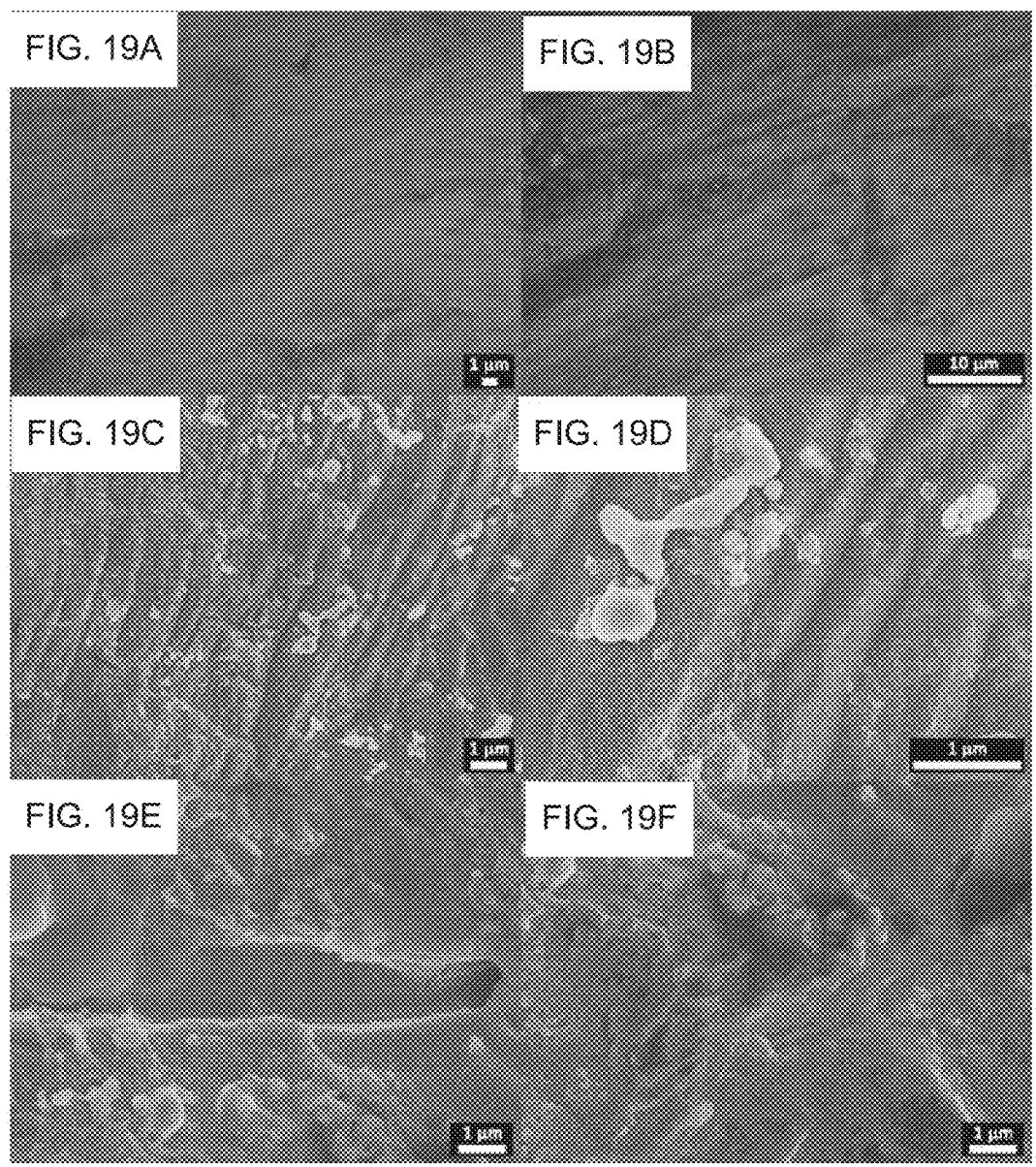

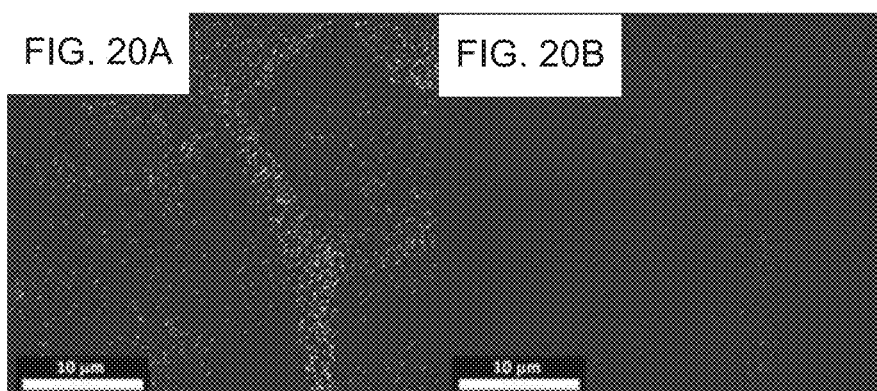
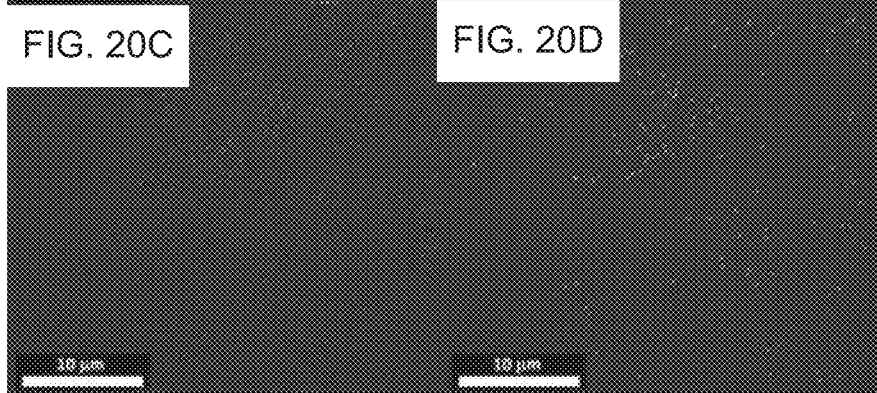
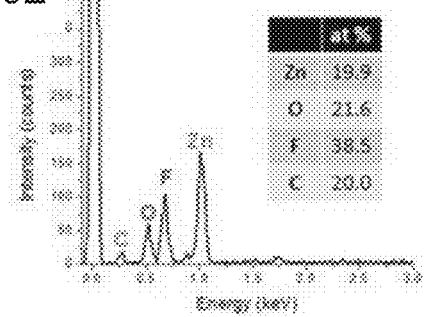
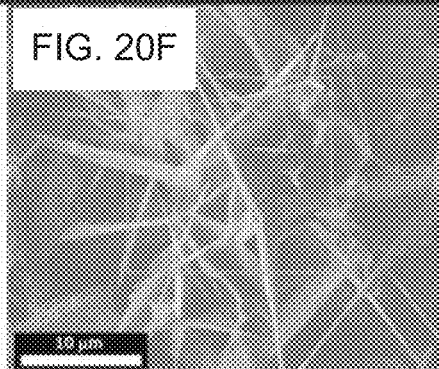
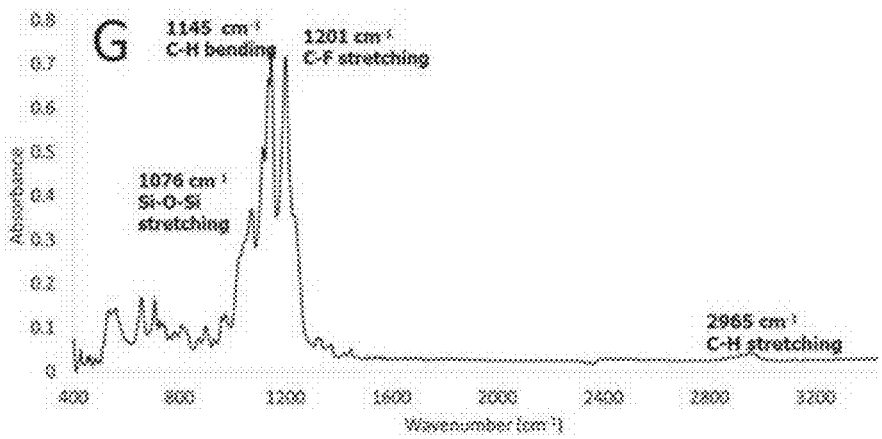
FIG. 20G

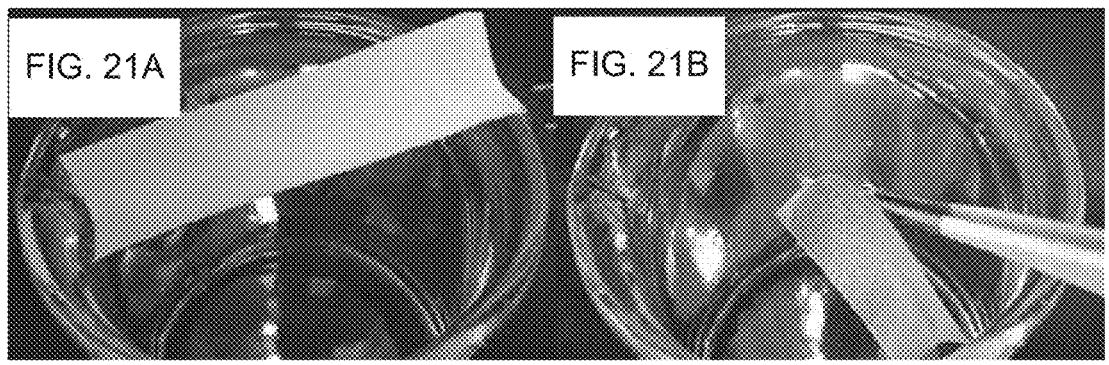
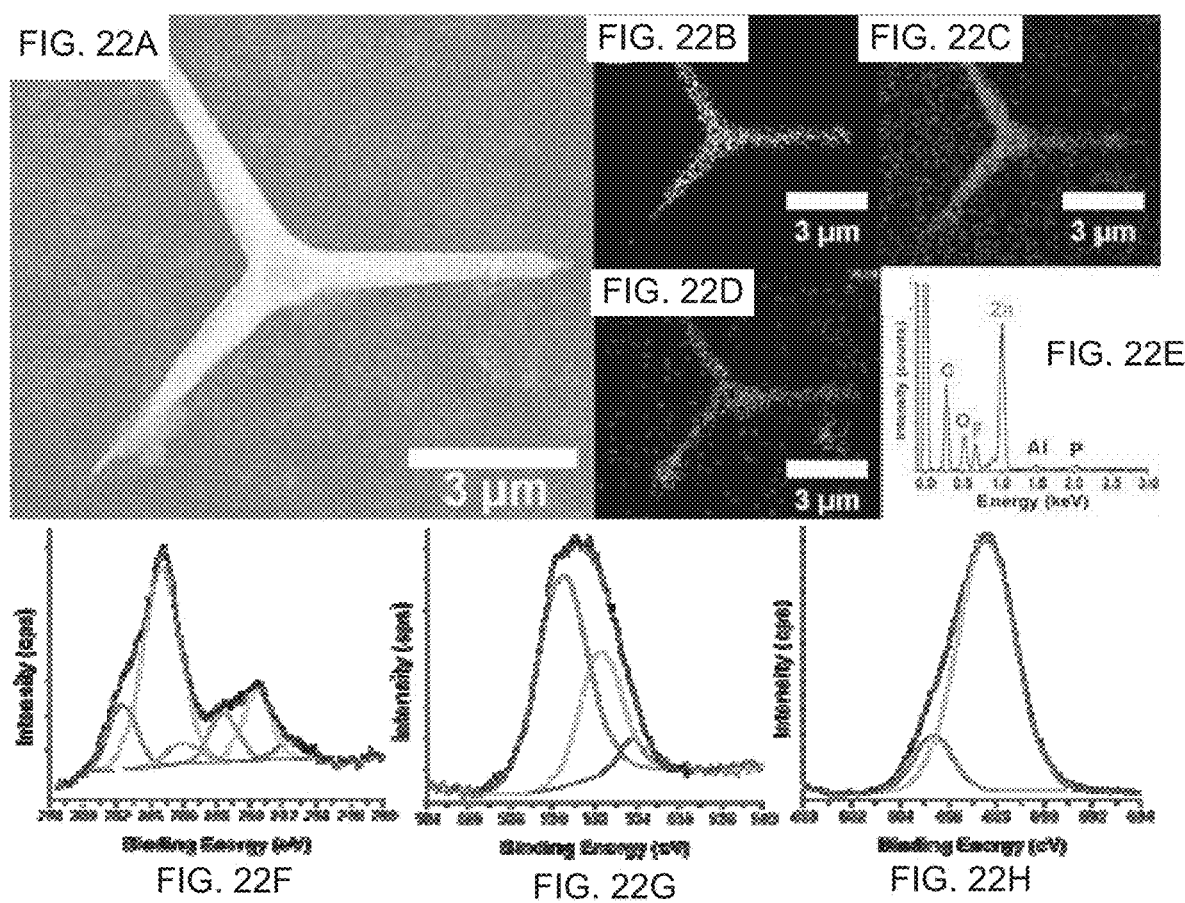

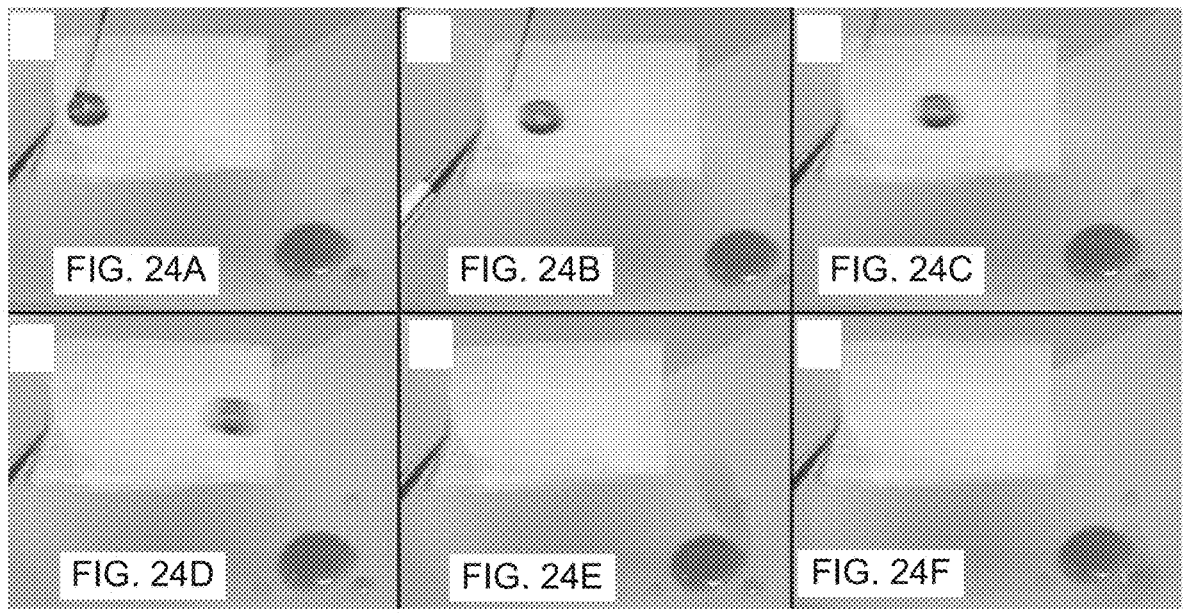
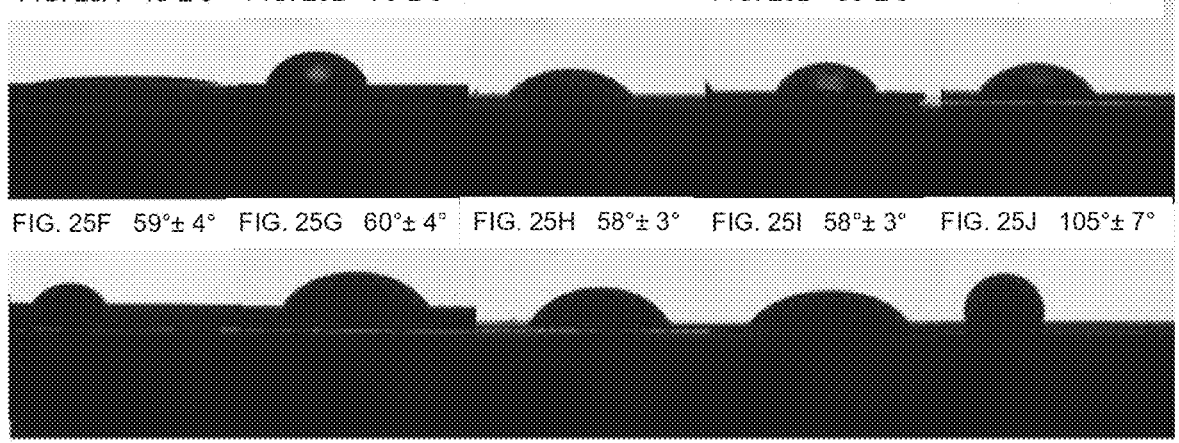

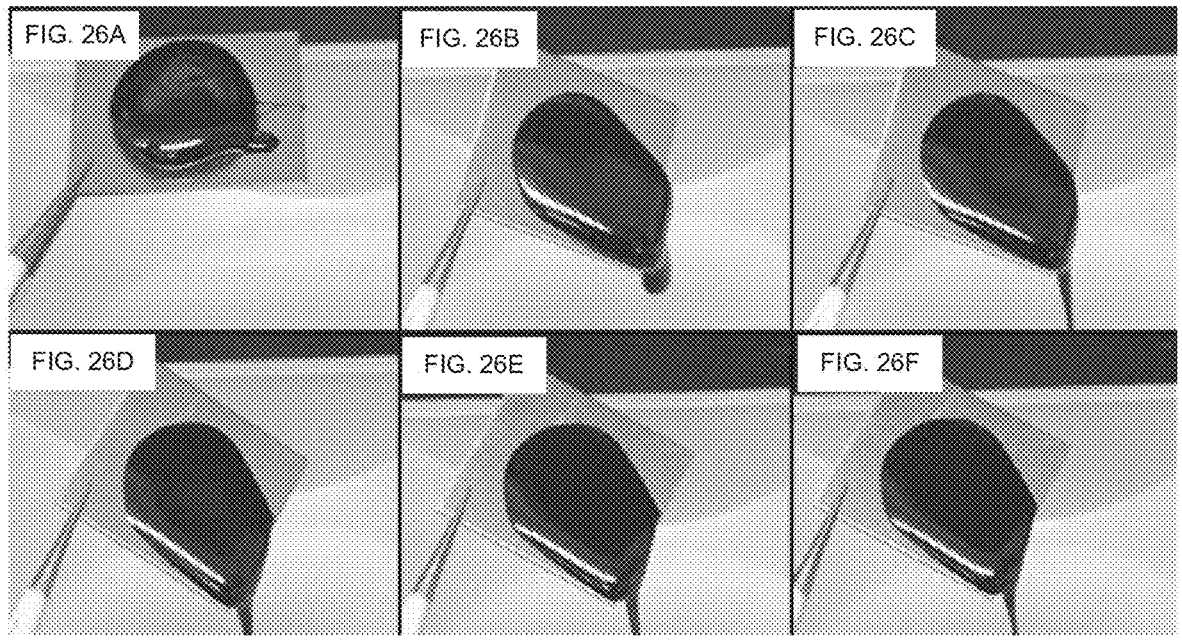
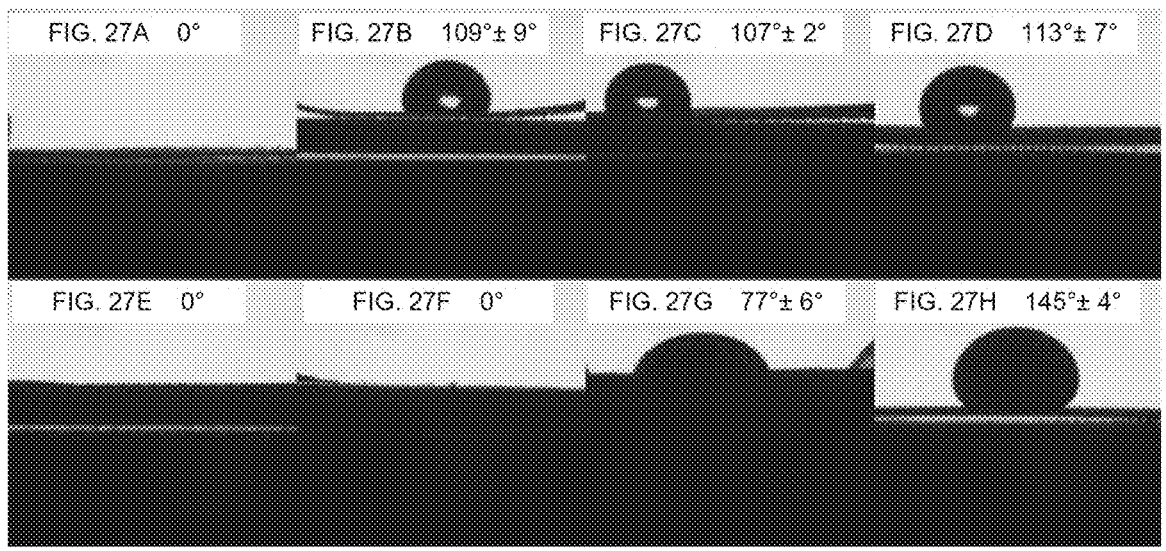

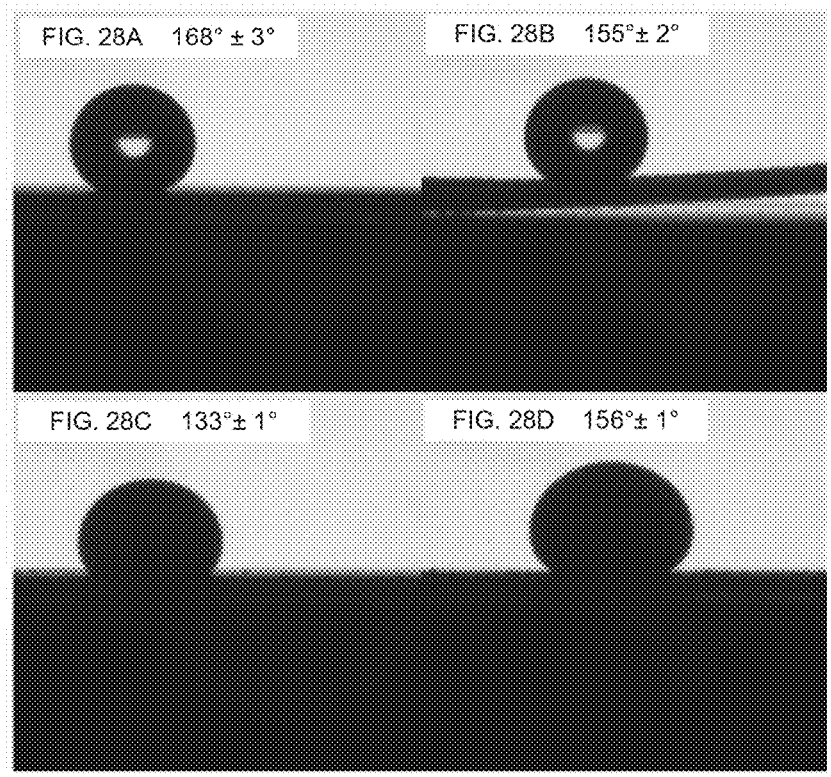
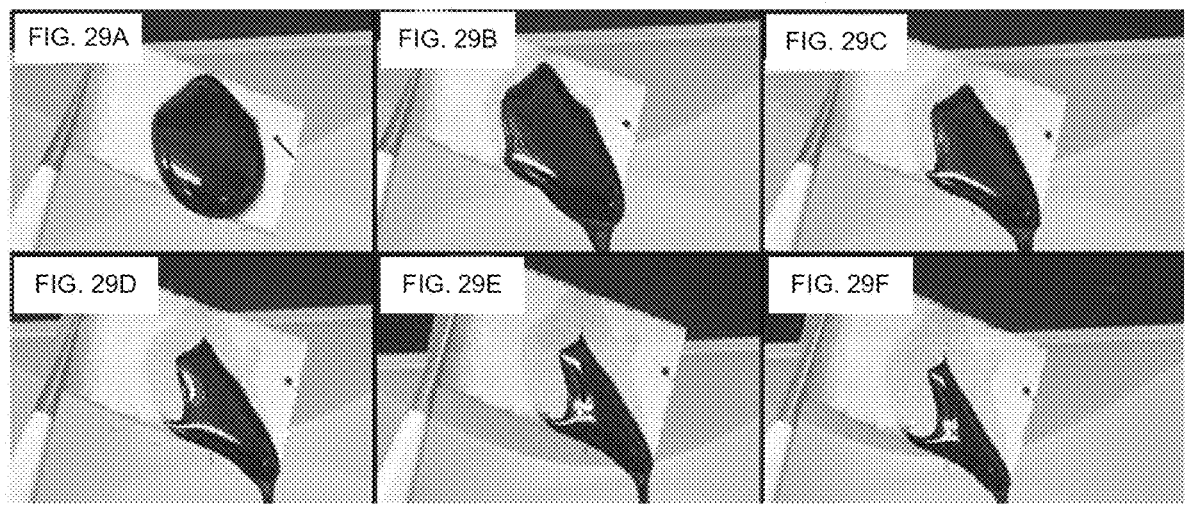

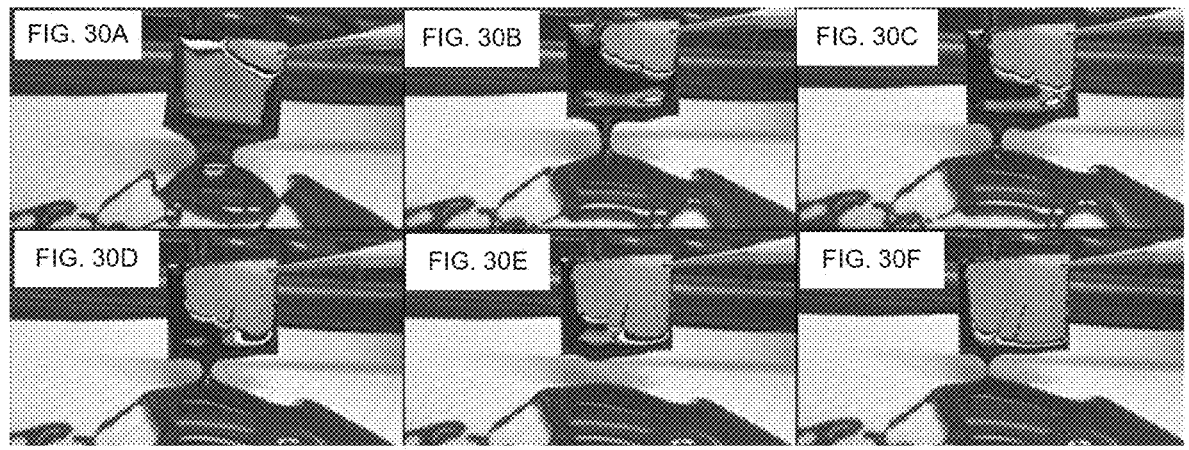
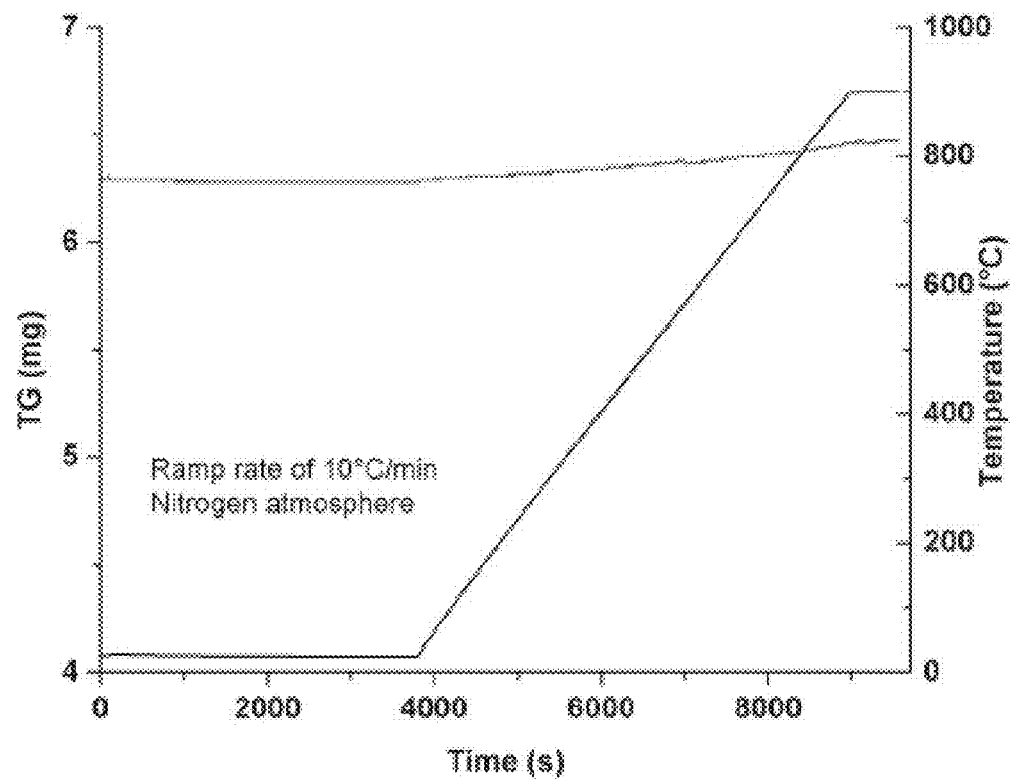
FIG. 31A

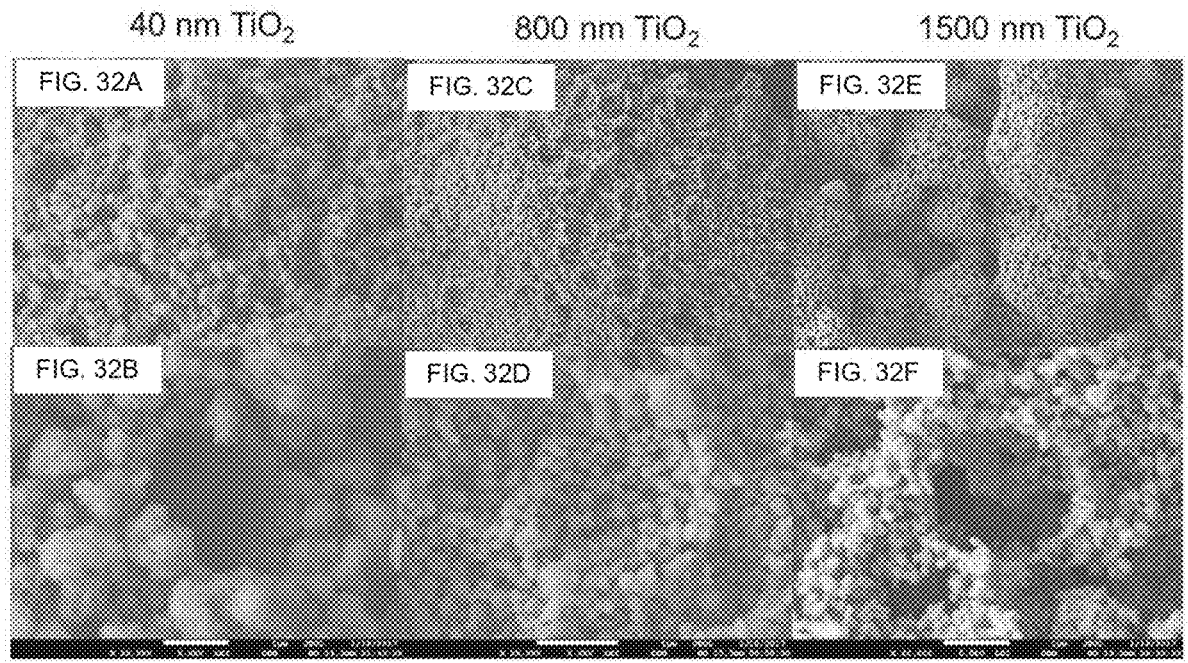
FIG. 32A  FIG. 32C  FIG. 32E
FIG. 32B  FIG. 32D  FIG. 32F
FIG. 33A
FIG. 33B

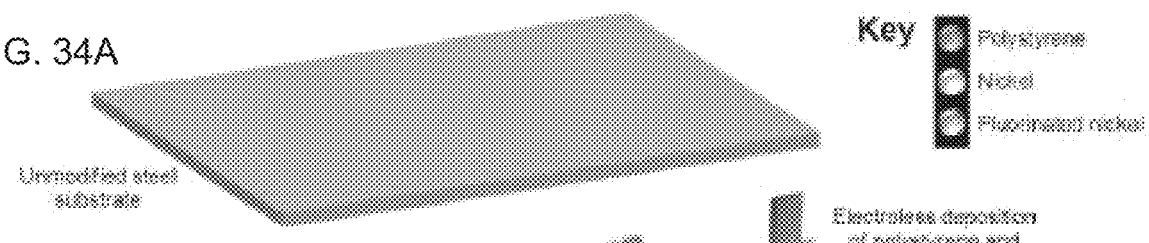

FIG. 34A Unmodified steel substrate

Key: Polystyrene, Nickel, Fluorinated nickel

Electroless deposition of polystyrene and nickel onto steel

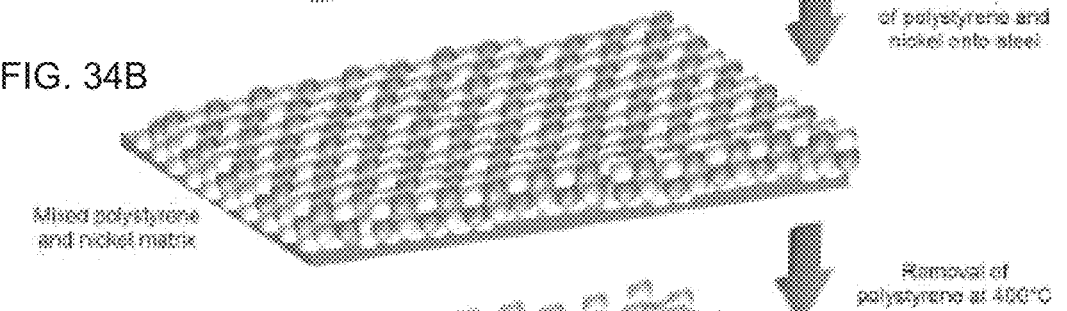

FIG. 34B Mixed polystyrene and nickel matrix

Removal of polystyrene at 450°C

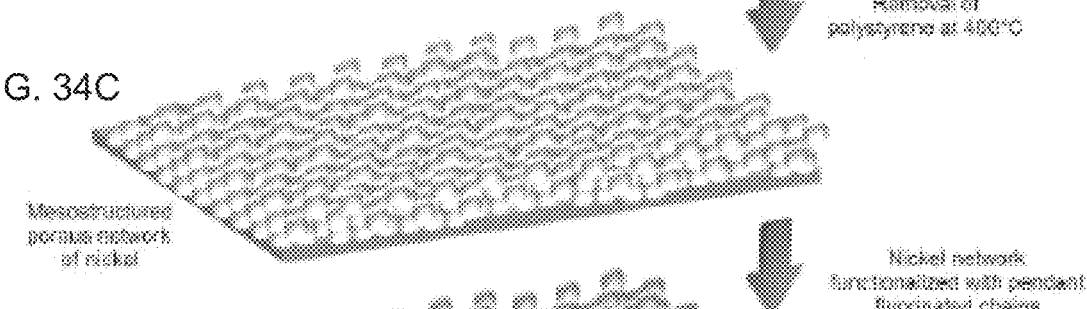

FIG. 34C Mesostructured porous network of nickel

Nickel network functionalized with pendant fluorinated chains

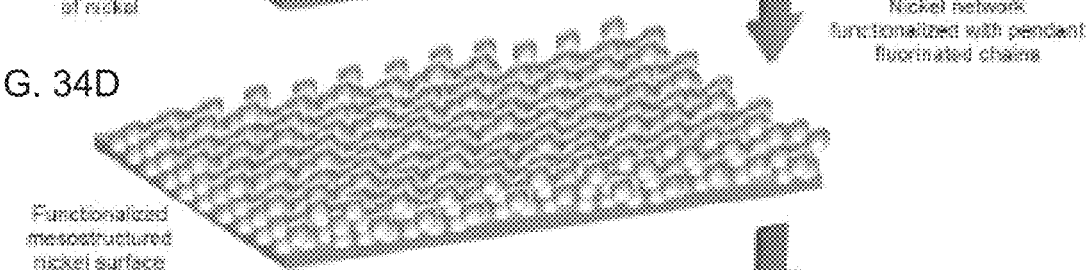

FIG. 34D Functionalized mesostructured nickel surface

Omniphobic nickel coated steel

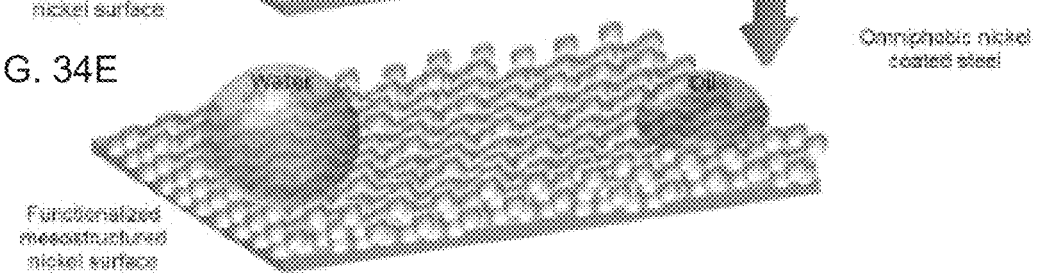

FIG. 34E Functionalized mesostructured nickel surface

APPARATUS FOR VISCOUS HYDROCARBON TRANSPORTATION

TECHNICAL FIELD

The present invention relates to transportation of viscous hydrocarbons from underground deposits.

BACKGROUND

Extensive deposits of viscous hydrocarbons exist around the world, including large deposits in the Northern Alberta oil sands. One problem associated with producing hydrocarbons from such deposits is that the hydrocarbons are too viscous to flow at commercially relevant rates at ambient temperatures and pressures.

The transportation of such viscous hydrocarbons, referred to herein as crude oil, from Alberta to refineries in the United States has been faced with increased constraints in recent years. The increase in production of bitumen in recent years has not been met with a proportional increase in pipeline capacity, which has resulted in a larger volume of bitumen produced compared to the transportation capacity of pipelines. Shipping crude by rail can ultimately allow producers to obtain greater value for the oil they produce. Extensive rail road networks extend market access, which allows the crude oil to reach more markets, which in turn gives traders better flexibility when selling crude oil.

Rail transportation also allows bitumen to be transported as railbit, which is a mixture of bitumen and diluent, but requires less diluent compared to the bitumen-diluent mixture required for pipelines. Ultimately, using rail transportation to supplement pipeline transportation provides increased flexibility to get bitumen to market. Though rail provides increased flexibility, this method of transportation typically costs more per barrel than pipeline transportation. These increased costs are mainly associated with the loading operation, unloading operation and rail freight expenses. The higher costs of rail transportation do not make this transportation method an economic alternative to pipelines, unless the pipelines are at capacity.

Crude oil can be transported either by manifest train, which is a train with a mixture of railcar types and cargoes or by unit train, which is a train that transports a single commodity in one type of railcar. Shipping via unit train is typically faster and cheaper because the train can take a direct route, without numerous stops to various rail terminals for the other products on the manifest train. Unit trains also have a higher capacity and are thus preferred over manifest trains.

Crude oil is typically transported by rail using DOT-111 (or CTC-111A) cars. These railcars are cylindrical in shape, with two elliptical heads at each end and often have heat coils and insulation. This type of railcar is typically loaded with a mechanical loading arm through the top of the railcar and unloaded using a mechanical unloading arm at the bottom of the vessel. Rail (or rail loading) facilities (or terminals) with a pipeline connected to loading units allow multiple cars to be loaded at the same time, reducing the time required to load the whole train. Because of derailing incidents in the past few years, regulations are increasingly strict for shipping crude oil by rail in DOT-111 railcars. These regulations include using railcars that are equipped with head shields, thermal jackets and thicker steel, which make them more expensive to buy or rent.

The diluent required to facilitate loading and unloading adds significant cost to transporting bitumen by rail. At ambient temperatures bitumen is a semi-solid sticky material similar to a chocolate bar in a tropical climate or cold peanut butter. Undiluted bitumen does not flow at ambient conditions due to its high viscosity and is diluted to flow at these conditions.

Diluent is added to the bitumen to reduce the viscosity to below the heavy crude flowing viscosity. A certain heavy crude flowing viscosity specification must be met for pipeline transportation of bitumen. This specification is not required for rail transportation; however, the bitumen must still be able to flow to load and unload the railcars and railbit can be loaded into railcars to reduce the costs associated with diluent for pipeline transportation of bitumen. Unfortunately, many rail facilities are connected to hydrocarbon recovery operations only by pipeline, so the heavy crude flowing viscosity must be met for the pipeline portion of the transportation. Many rail facilities do not have the infrastructure to remove a fraction of the diluent from the bitumen-diluent mixture; therefore the more diluted bitumen-diluent mixture is typically shipped by railcar, rather than the less expensive railbit. If the bitumen is shipped as railbit, it must be heated at the unloading facility to achieve the heavy crude flowing viscosity. Heat for unloading requires railcars with heaters, thus additional energy, and up to 24 hours may be required to reduce the viscosity enough for the bitumen to flow. The large volume of diluent required for conventional transportation of bitumen means that a large volume of the shipping capacity of pipelines or railcars is occupied by diluent, instead of the produced bitumen. Also, diluent is expensive and therefore significant cost savings could be realized by shipping bitumen to refineries with less, or without any, added diluent.

FIG. 1 shows the relationship between cost savings and % diluent reduction. This plot indicates that as the volume of diluent shipped is reduced, an increase in cost savings results. 0% diluent reduction represents the ratio of diluent to bitumen that is currently used for rail transportation. 100% diluent reduction would indicate dry bitumen. For example, at 100,000 barrels of oil production per day, a $20 per barrel pentane-Western Canadian Select (WCS) differential, and $16 per barrel rail tolls, as examples, the cost savings due to 100% diluent reduction would offer a net cost savings of $11.48 per barrel shipped. This cost savings is significant because a typical unit train can transport about 77,000 barrels of bitumen, which would make the net cost savings just over $880,000 per unit train.

Railcars must also be cleaned at the end of the leasing period before being returned to the owner. Railcar cleaning typically costs US $5,000 per car but costs can be higher due to limited availability at the facilities that conduct the cleaning. Railcars occasionally need to be moved across Canada or the United States to a railcar cleaner, which can quickly increase the cost of cleaning. Reducing the required cleaning of railcars would improve the economics of rail transportation.

Improvements in transportation of viscous hydrocarbons are desirable.

SUMMARY

According to one aspect, a vessel for transporting a material that is solid or semi-solid at ambient temperature is provided. The vessel includes a body having an interior surface comprising textured metal, and a superoleophobic coating on the interior surface for inhibiting the material from adhering to interior surface, the superoleophobic coating including a nanotextured coating disposed on the textured metal and functionalized with a fluorinated compound. The superoleophobic coating facilitates flow of the material along the interior surface.

According to another aspect, a lining for use with a vessel for transporting a material that is solid or semi-solid at ambient temperature is provided. The lining includes a lining body having an interior surface comprising textured metal and a superoleophobic coating on the interior surface for inhibiting the material from adhering to interior surface, the superoleophobic coating including a nanotextured coating disposed on the textured metal and functionalized with a fluorinated compound. The superoleophobic coating facilitates flow of the material along the interior surface.

According to yet another aspect, there is provided a method of producing a superoleophobic coating for a vessel for transporting a material that is solid or semi-solid at ambient temperature. The method includes applying a nanotextured coating to a surface of the vessel, the surface comprising textured metal, and functionalizing the nanotextured coating with a fluorinated compound to provide a superoleophobic coating to facilitate flow of the material along the surface.

BRIEF DESCRIPTION OF THE DRAWINGS

Embodiments of the present invention will be described, by way of example, with reference to the drawings and to the following description, in which:

FIG. 9A through FIG. 9F show microscale topographies defined by substrate meshes and structured interlocking stainless steel fibers;

FIG. 10 shows optical microscopy images of carbon steel surfaces after etching;

FIG. 11A and FIG. 11B are images of cleaned steel with no etching; FIG. 11C and FIG. 11D are images upon etching with a mixed acid solution at 93° C. for 45 s; and FIG. 11E and FIG. 11F are images of A36 carbon steel substrates etched using an HCl solution at 80° C. for 1 h, depicting deeper etch pits with accompanying nanoscale porosity;

FIG. 12A through FIG. 12D show water contact angles of (A) cleaned blank steel, (B) steel after etching with mixed acid solution at 93° C. for 45 s. (C) and (D) represent the water contact angles measured for (A) and (B) after immersion in a 2.7 mM butanol solution of heptadecafluoro-1,1, 2,2-tetrahydrodecyl trimethoxysilane;

FIG. 13A through FIG. 13D show water contact angles of (A) cleaned blank steel, (B) steel after etching in HCl solution at 80° C. for 60 min. (C) and (D) represent the water contact angles measured for (A) and (B) after immersion in a 2.7 mM butanol solution of heptadecafluoro-1,1,2,2-tetrahydrodecyl trimethoxysilane;

FIG. 14A through FIG. 14H show: (A, B) SEM images acquired for individual ZnO nanotetrapods indicating the four protuberant and tapered arms; (C, D) SEM images depicting the mesostructured (hierarchically textured) metal meshes modified by the deposition of ZnO nanotetrapods at various magnifications; (E, F) SEM images depicting interconnected ZnO nanotetrapods residing on etched steel substrates; (G) Raman spectrum and (H) X-ray diffraction (XRD) pattern acquired for ZnO nanotetrapods;

FIG. 15A through FIG. 15F show still frame images from a video indicating water droplets (dyed blue, colour not shown) being strongly repelled by a stainless steel mesh loaded with 3.5 mg/cm$^2$ of ZnO. The sequence of images (A) through (F) was acquired within 1 s;

FIG. 16 shows the results of ASTM (American Society for Testing and Materials) D3359 testing of the adhesion of ZnO nanotetrapods to steel substrates;

FIG. 18A through FIG. 18C show increasingly higher magnification SEM images of a ZnO nanotetrapod layer adhered to a 180 gauge stainless steel mesh using TEOS as the precursor to constitute a $SiO_2$ layer;

FIG. 19A through FIG. 19F show increasingly higher magnification SEM images of: (A-C) a ZnO nanotetrapod layer adhered to a steel substrate, etched with an HCl solution, using TEOS as the precursor to constitute a $SiO_2$ layer; (D-F) a ZnO nanotetrapod layer adhered to a steel substrate, etched with a mixed acid solution, using TEOS as the precursor to constitute a $SiO_2$ layer;

FIG. 20A through FIG. 20G show: (A) zinc, (B) oxygen, (C) fluorine, and (D) carbon energy dispersive X-ray (EDX) maps of ZnO nanotetrapod samples on a stainless steel mesh; (E) an EDX spectrum of the sample area analyzed in (F); (F) a SEM image of the ZnO nanotetrapods coated onto a stainless steel mesh; and (G) an attenuated total reflection (ATR) Fourier transform infrared (FTIR) spectrum of TEOS-derived $SiO_2$ coated ZnO nanotetrapods soaked for 1 h in a 2.7 mM butanol solution of heptadecafluoro-1,1,2,2-tetrahydrodecyl trimethoxysilane;

FIG. 21A and FIG. 21B show the ZnO nanotetrapod coated mesh dry and immersed in water, illustrating water repellency;

FIG. 22A through FIG. 22H show: (A) an SEM image of a single ZnO nanotetrapod functionalized with 1H,1H,2H, 2H-perfluorooctanephosphonic acid (abbreviated FPA or PFOPA); energy dispersive X-ray (EDX) spectroscopy maps showing the distribution of (B), zinc, (C) oxygen, and (D) fluorine; (E) an integrated EDX spectrum acquired for the single tetrapod; and (F) C 1s, (G) O 1s, and (H) F 1s high resolution X-ray Photoelectron Spectroscopy (XPS) spectra acquired for functionalized ZnO tetrapods;

FIG. 24A through FIG. 24F show still frame images from a video indicating water droplets (dyed blue, colour not shown) being strongly repelled by a stainless steel mesh loaded with 3.5 mg/cm$^2$ of ZnO and functionalized with 2.7 mM nonafluorohexyltriethoxysilane in butanol solution for 1 h, over a time from panels (A) to (F) of <1 s;

FIG. 25A through FIG. 25J show hexadecane contact angles of (A) cleaned blank steel; (B) cleaned blank steel functionalized with a perfluorinated compound; (C) steel etched with HCl at 80° C. for 1 h and functionalized with a perfluorinated compound; (D) steel etched with HCl at 80° C. for 1 h, coated with ZnO nanotetrapods, and functionalized with a perfluorinated compound; (E) steel etched with HCl at 80° C. for 1 h, coated with ZnO nanotetrapods, TEOS-derived SiO$_2$ coated, and functionalized with a perfluorinated compound; and (F-J) oil contact angles for samples (A-E), respectively;

FIG. 26A through FIG. 26F show freeze frame images of sales oil dripping off the surface of an A36 steel substrate at times of 0, 10, 20, 30, 40, and 50 s;

FIG. 27A through FIG. 27H show hexadecane contact angles of (A) blank stainless steel mesh; (B) stainless mesh functionalized with a perfluorinated compound; (C) stainless mesh after deposition of ZnO nanotetrapods, followed by functionalization with a perfluorinated compound; (D) stainless steel mesh after deposition of ZnO nanotetrapods, deposition of a TEOS-derived SiO$_2$ overlayer, followed by functionalization with a perfluorinated compound; and (E-H) oil contact angles for samples (A-D), respectively;

FIG. 28A through FIG. 28D show water contact angles on (A) carbon steel after etching with an HCl:H$_2$O solution at 80° C. for 1 h, deposition of 7.8 mg/cm$^2$ of ZnO nanotetrapods, and modification with a 27.0 mM tetrahydrofuran (THF) solution of 1H,1H,2H,2H-perfluorooctanephosphonic acid (FPA); (B) 80 gauge mesh loaded with 7.0 mg/cm$^2$ of ZnO nanotetrapods and modification with a 27.0 mM THF solution of FPA; and (C) and (D) demonstrate the wetting behavior of sales oil for samples (A) and (B), respectively;

FIG. 29A through FIG. 29F show freeze frame images of sales oil dripping from a stainless steel mesh surface coated with 7.0 mg/cm$^2$ of ZnO nanotetrapods functionalized by immersion in a tetrahydrofuran (THF) solution of 27.0 mM 1H,1H,2H,2H-perfluorooctanephosphonic acid (FPA) for 1 h, at times of 0, 10, 20, 30, 40, and 50 s, respectively;

FIG. 30A through FIG. 30F show freeze frame images of sales oil dripping from a stainless steel mesh surface coated with 7.0 mg/cm$^2$ of ZnO nanotetrapods functionalized by immersion in a tetrahydrofuran (THF) solution of 27.0 mM 1H,1H,2H,2H-perfluorooctanephosphonic acid (FPA) for 60 min, acquired over a period of 90 s; and FIG. 31A through FIG. 31C show: thermogravimetric analysis (TGA) plots of (A) ZnO nanotetrapods; (B) ZnO nanotetrapods with a topcoat of SiO$_2$ constituted from hydrolysis and cross-linking of TEOS; and (C) ZnO nanotetrapods functionalized with a perfluorinated compound;

FIG. 32A through FIG. 32F illustrate TiO$_2$ coatings with nanoscale texturation;

FIG. 33A and FIG. 33B illustrate water contact angles on a surface of a coating utilizing TiO$_2$; and FIG. 34A through FIG. 34E illustrate a process for preparing textured nickel coatings.

DETAILED DESCRIPTION

Figure 1:
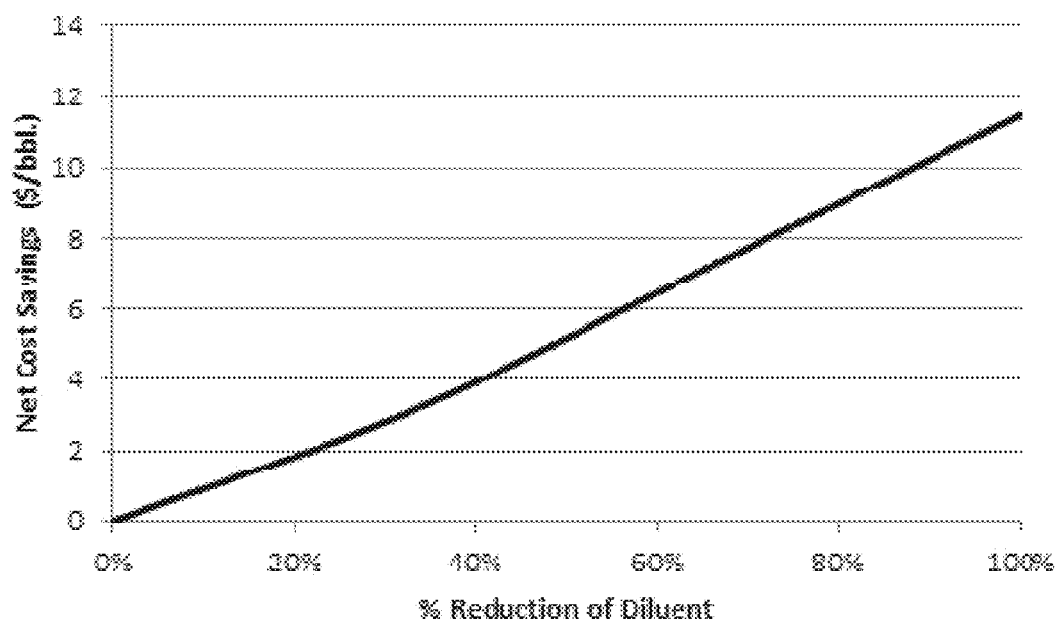
FIG. 1 is a graph illustrating the relationship between cost savings and % diluent reduction.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to a vessel for transporting a material that is solid or semi-solid at ambient temperature. The vessel includes a body having an interior surface comprising textured metal, and a superoleophobic coating on the interior surface for inhibiting the material from adhering to the interior surface, the superoleophobic coating including a nanotextured coating disposed on the textured metal and functionalized with a fluorinated compound. The superoleophobic coating facilitates flow of the material along the interior surface. For example, the vessel may be a pipe for transporting bitumen, a railcar for transporting bitumen, or any other suitable vessel or equipment utilized in the transportation of bitumen.

The vessel may be a railcar for transporting solid or semi-solid material or a lining for use with the railcar, the railcar or lining including a superoleophobic coating for inhibiting bitumen from adhering to an interior surface of the railcar body, the superoleophobic coating including, for example, a nanotetrapodal oxide coating disposed on a metal substrate and functionalized with a fluorinated silane or other fluorinated compound. The metal substrate may be the railcar body or a lining for the railcar. The coating may also be superhydrophobic to facilitate cleaning the railcar after use. In other words, the coating may be superomniphobic. A railcar or lining including a coating for inhibiting bitumen from adhering to an interior of the railcar body allows for more efficient re-use of the railcar by reducing the time, cost, or both required to clean the railcar before it is re-loaded. Thus, the coating facilitates cleaning of the railcar body for reuse of the railcar.

Due to the semi-solid state of bitumen at ambient conditions, bitumen transportation without diluent, in a similar manner to coal, sulfur, or ore transported in railcars, is possible. Shipping bitumen as a semi-solid may significantly reduce the costs for rail transportation because no or less diluent is required and a different type of railcar may be used. Shipping dry bitumen reduces risks compared to shipping dilbit or railbit by rail, due to reduced volatility and reduced flammability. Dry bitumen has a relatively high flash point and is considered non-flammable. To ship bitumen by rail, a railcar coating that repels or allows the sticky bitumen to slide off may be applied to the interior of a railcar to facilitate dry transportation of bitumen by rail. Superoleophobic coatings repel oil and are useful in facilitating this method of bitumen transportation.

Superoleophobic coatings are also useful in coating other transportation infrastructure, for example, pipelines and storage tanks. Internal coating of pipelines to reduce frictional losses during bitumen transport requires less energy and yield a higher product throughput compared to uncoated pipelines.

The surface wetting characteristics of heavy oil and bitumen further give rise to considerable amounts of retained liquids and surface fouling, thereby necessitating maintenance costs pertaining to flushing of pipelines. The accumulation of deposits such as from asphaltene precipitation in constricted regions of tubing or pipes also presents a major maintenance challenge with safety and cost implications.

Reliance on diluent for transporting such heavy oil or bitumen in pipelines reduces the capacity of the pipelines as an estimated 15% of existing capacity is utilized to flow diluent in North America, and represents a considerable cost burden to heavy oil producers.

The ability to of bitumen or heavy oil droplets to glide facilitates transportation, diminishing maintenance needs and reducing energy costs of transportation. The reduction of pressure drops and friction losses across pipelines is advantageous. Superoleophobic coatings on the surfaces that are not wetted by heavy oil or bitumen facilitates gliding of such semi-solids or fluids. Such surfaces greatly reduce the volume of diluent utilized to facilitate transportation.

Coating of storage tanks allows easier cleaning of these pieces of equipment and reduces issues with adherence of the bitumen to the tanks and corrosion. As described above, for both repelling oil and facilitating cleaning, coatings that are both superoleophobic and superhydrophobic are desirable.

Solid railcars such as gondola and hopper cars are of interest. Gondola cars are rectangular steel cars that typically travel uncovered. Hopper cars are rectangular steel cars with sloped ends and can be covered or uncovered. The method of unloading the cargo differs for gondola cars and hopper cars. Hopper cars are unloaded by opening the doors on the underside or the side of the railcar, whereas gondola railcars are typically unloaded using a rotary dump method to unload the cargo. A benefit of gondola cars is that they do not require sloped ends. Thus, such cars can be shorter and have a lower center of gravity, while carrying the same load as a hopper railcar and gondola cars may make cargo unloading easier.

Figure 2:
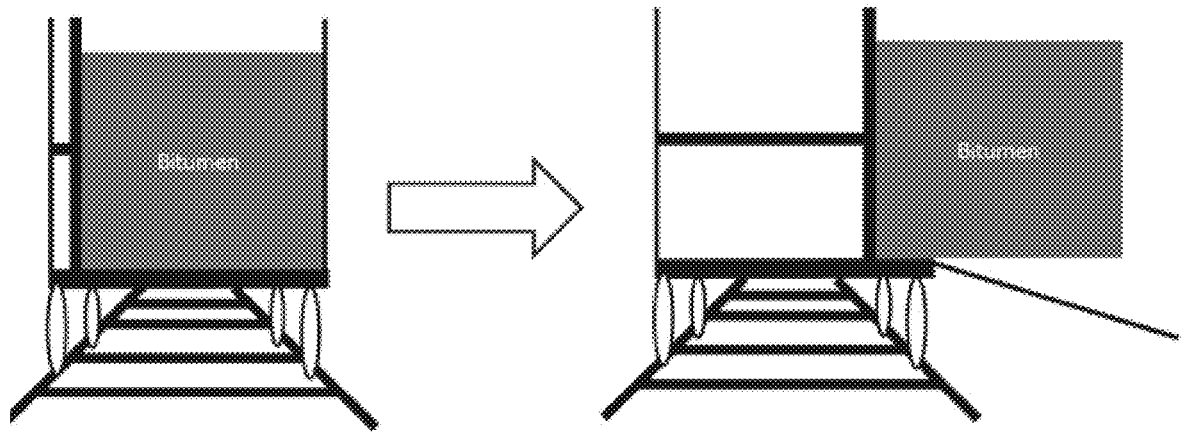
FIG. 2 is a simplified sectional view of a railcar including bitumen being pushed out of the railcar.
Figure 3:
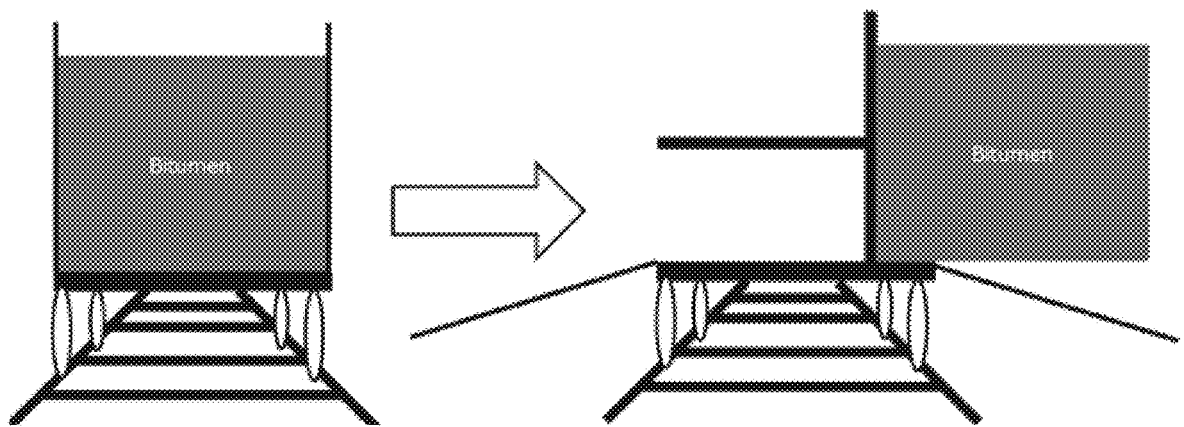
FIG. 3 is a further simplified sectional view of a railcar including bitumen being pushed out of the railcar.

Semi-solid bitumen, for example in the form of one or more bricks, may be removable from a hopper railcar using a piston type device and from a gondola railcar using a rotary dump device, as is currently used to unload the latter type of railcar. Both methods require adequate infrastructure and equipment at the receiving end, or an existing hopper type railcar may be modified to include a piston within the railcar. FIG. 2 shows bitumen being pushed out of a railcar by a piston that is installed within the railcar. For a hopper railcar to unload semi-solid bitumen bricks, the doors on the railcar may be on the sides of the railcar and may extend the full length of the railcar; therefore, once the doors are open, the bitumen bricks are able to slide out. Adding a piston to each railcar may be costly; therefore having the piston or other suitable equipment available at the unloading facility is preferable. FIG. 3 shows bitumen being pushed out of the railcar body by a piston that is installed at the receiving terminal. Using a piston installed at the receiving terminal is useful for railcars that have two opposing walls that can open fully or can fold down in order for the bitumen bricks to be pushed out of the railcar.

Figure 4:
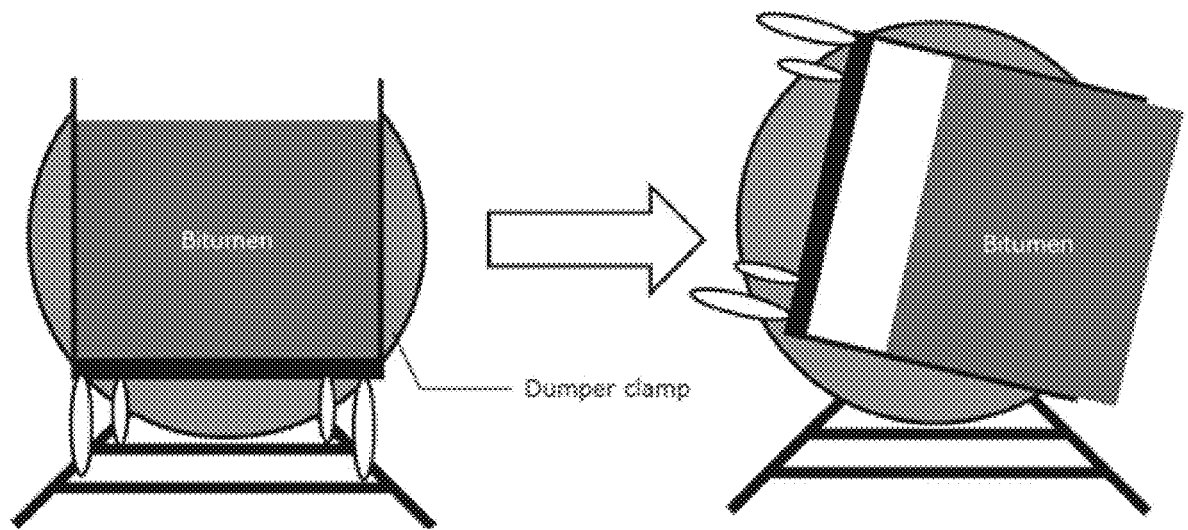
FIG. 4 is a simplified sectional view of a railcar including bitumen being removed from the railcar by way of a rotary dump method.

As shown in FIG. 4, a rotary dump method may also be utilized for lifting and rotating a railcar to remove one or more bitumen bricks from the railcar using gravity. This method of unloading reduces the time for unloading the bitumen, which reduces the unloading costs and increases the time the railcars are available for transportation. The rotary dump method is possible using railcars that have a removable cover or removable lid, as a semi-solid bitumen brick may be removable as one piece through the top, rather than in multiple pieces, to improve the ease and efficiency of the unloading operation. To ship semi-solid bitumen in gondola or hopper railcars, improvements to reduce the adhering of the semi-solid bitumen to the railcar walls are desirable.

Superoleophobic coatings applied to the interior of a railcar body facilitate the use of rail as a method of bitumen transportation. A superoleophobic coating may allow the solid or semi-solid bitumen to be easily pushed or dumped out of the railcar with low force by comparison to the force required when no coating is present.

Figure 5:
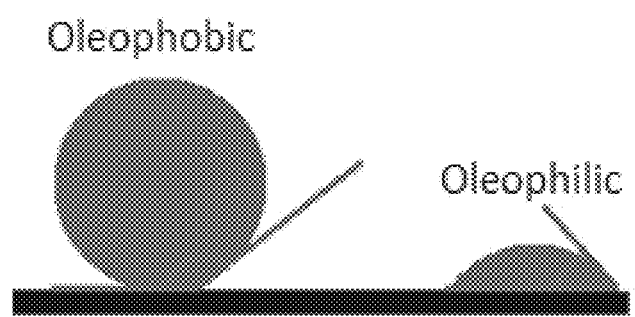
FIG. 5 shows the contact angle of a droplet of oil for an oleophobic surface and an oleophilic surface.

Whether a surface is oleophobic or oleophilic is determined by the contact angle between the surface and a droplet of oil. FIG. 5 shows the contact angle for an oleophobic surface and an oleophilic surface. For oil, an oleophilic, or oil loving, surface has a contact angle of less than 90° and an oleophobic, or oil repelling, surface has a contact angle of more than 90°. A superoleophobic surface has a contact angle of more than 150°.

Surfaces are also categorized as hydrophilic, hydrophobic, and superhydrophobic in the same manner, but use the contact angle measurement between the surface and a droplet of water instead of a droplet of oil.

Superoleophobic surfaces may be produced by roughening the surface and then applying a coating that is repellent to oil. The surface may be roughened by chemical etching using NaOH, HCl or another chemical, or a sequential etching using multiple chemicals to provide a textured surface. Alternatively, etching may be achieved by mechanical roughening to provide a textured surface. For example, the surface may be roughened utilizing sandpaper, or other mechanical grinding techniques. Alternatively, a metal mesh inherently has a textured surface. The coating may include a fluorinated compound, as these compounds are known to repel oil. A coating may also include silane compounds (for example silanes bearing alkyl, aromatic, or perfluorinated groups), that repel water, thus creating an omniphobic (both oleophobic and hydrophobic) material. Durability of such coatings in industrial applications is important.

A railcar with wheels coupled to a body that has a superoleophobic coating facilitates the transportation of bitumen as a solid brick by rail and improves the economics of bitumen transportation by rail. The hot bitumen is loaded into hopper or gondola railcars using the current mechanical loading arm. The bitumen cools as the temperature falls to ambient temperature, at which point the bitumen is in the form of a solid or semi-solid due to the extremely high viscosity of bitumen. The railcars holding the solid bitumen can travel to the refineries, preferably as a unit train due to the increased shipping capacity.

The superoleophobic coating to inhibit bitumen from adhering to the interior of the body of the railcar may be applied in two different ways, either as a permanent coating or as a temporary lining in the railcar. The permanent coating is applicable using a spray technique, a paint brush technique, a hot dipping technique, a printing technique or other methods such as electrodeposition, chemical etching, chemical treatment or vapor deposition. The coating is applicable to the entire surface of the interior of the railcar, including all gaskets and other internal components. These internal components are smooth to inhibit the solid bitumen, for example, in the form of bricks, from getting stuck in the railcar once the bitumen has solidified.

The temporary lining is similar to a bag or foldable box that covers or coats all of the internal railcar surfaces and is fastened to the railcar using, for example, a strong hook and loop fastener or strong snaps. The lining may be installed without drilling through the walls of the railcar, so as not to damage to the railcar and to allow flexibility for the use of the railcar. A foldable coated container may be placed inside the railcar, unfolded when transporting bitumen and folded back up and stowed when transporting other materials.

Figure 6:
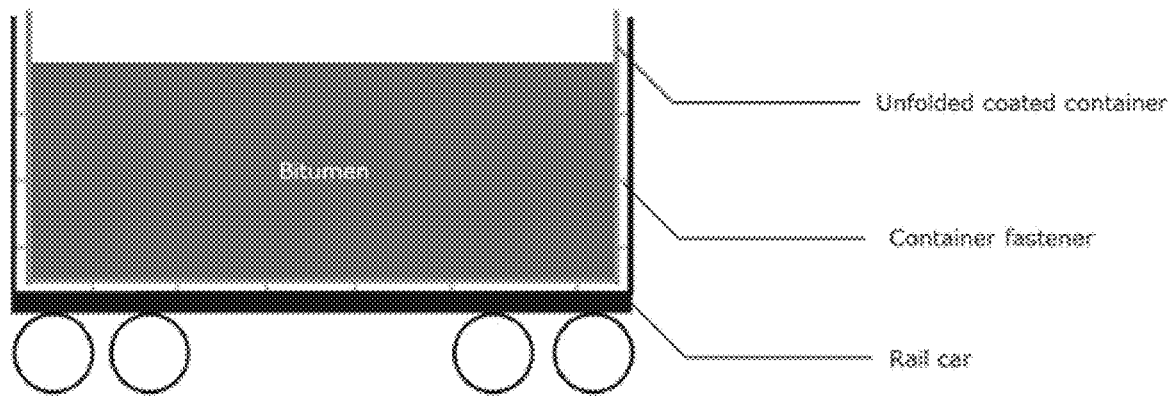
FIG. 6 is a simplified sectional view of a railcar with an unfolded coated container fastened interior the railcar.

A removable lining with a superoleophobic coating provides additional benefits. Such a lining is easily removable and allows the railcar to be used for shipping the bitumen without changes to the rail car beyond removing or folding up the liner (lining) before shipping another commodity. This however adds an additional step, which adds additional costs. FIG. 6 shows a railcar with an unfolded coated container fastened inside the railcar. With a removable and stowable lining, other products may be easily backhauled, simply by removing the liner or folding it up, without cleaning the railcars. Another benefit of removable liners is that they are easily inserted or removed from leased railcars, reducing the initial capital cost of purchasing a railcar fleet and reducing the need for railcar modifications.

Removal of the light ends of the bitumen may optionally be carried out to further reduce the volatility compared to dry bitumen. The volatility of a substance is related to its ability to vaporize. The volatility and the total shipped volume of bitumen may be reduced before shipping by removing the light ends, which make up about 2% to 4% of the bitumen, depending on the quality of the feed.

Figure 7:
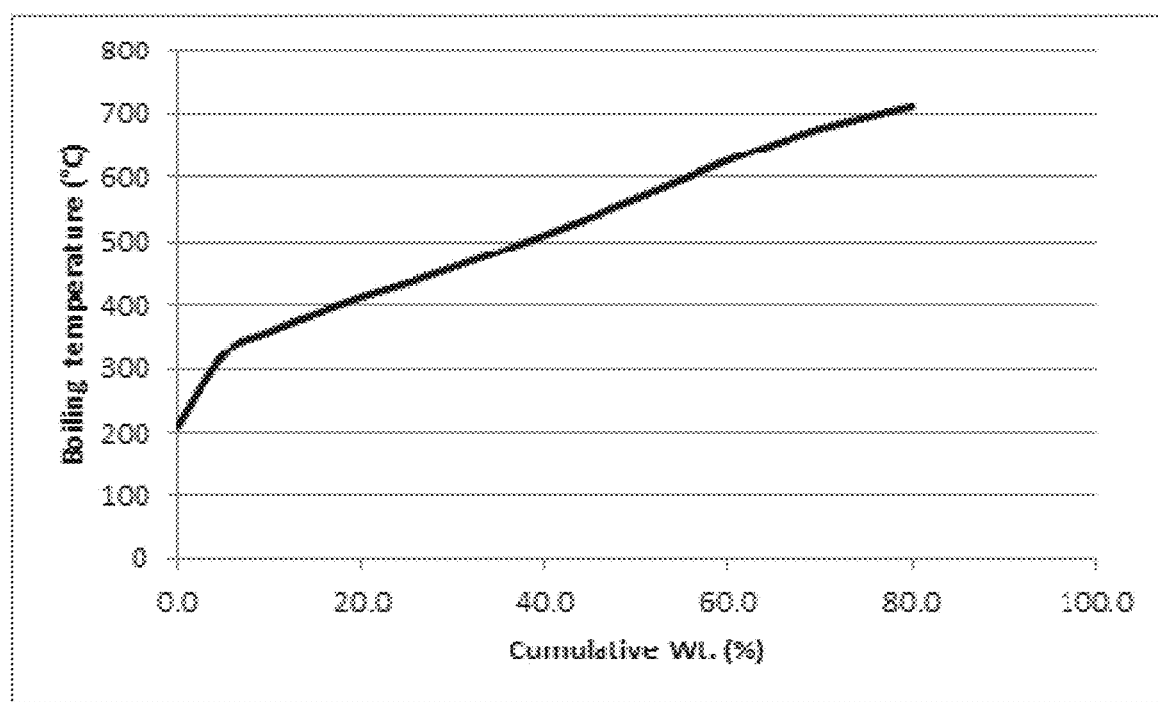
FIG. 7 shows the distillation curve for a typical bitumen sample.

FIG. 7 shows the distillation curve for a typical bitumen sample. The light ends have a low viscosity, making them easy to ship via pipeline. The reduced volatility of the bitumen lowers the transportation risk, which in turn reduces the shipping costs. A volatile product or more dangerous product is more expensive to ship than a safer product resulting from the increased risks of shipping a more volatile product. The environmental hazards of a spill are reduced with solid bitumen, as the bitumen is more likely to remain in its solid form, and ideally within the railcar, unlike a liquid that may flow and contaminate the surrounding area.

A superoleophobic surface significantly reduces residual heel, meaning that cleaning of railcars having a superoleophobic surface is not required after the bitumen has been removed. Any bitumen that remains in the railcar after the semi-solid bitumen brick or bricks are removed is cleaned using a high pressure washer. An omniphobic surface or coating also facilitates easier and less time consuming cleaning of the railcars before they are returned to the owner.

If no residual bitumen or oil remains in the railcars after the railcars leave the refinery, the railcars may be utilized to ship other substances from the refinery or surrounding area, significantly decreasing the costs associated with rail transportation of bitumen. An exterior coating may optionally be utilized to reduce rail car cleaning on the outside due to spillage or graffiti. The exterior coating may be superoleophobic or superomniphobic.

Deposits of viscous hydrocarbons exist around the world, including large deposits in the northern Alberta oil sands. Examples of hydrocarbon recovery operations for producing bitumen include mining or thermal techniques and an example of the latter is steam-assisted gravity drainage (SAGD). Facilities may be somewhat modified to facilitate shipping of bitumen as a solid, instead of as a bitumen-diluent mixture. Due to the cost of diluent, transportation of the bitumen from hydrocarbon recovery operations to rail terminals without the use of diluent is beneficial. Because of the distance that may exist between the hydrocarbon recovery operations and the rail loading facilities, heat is supplied for the bitumen to flow through pipelines to inhibit the bitumen from cooling sufficiently to solidify in the pipelines. This heat may be supplied continuously, for example, as a heat tracing surrounding the pipeline. Alternatively, diluent may be added to the bitumen to transport the bitumen to the rail facility, and then the diluent may be removed from the bitumen at the rail facility. The bitumen may also be transported by a vehicle, for example a truck, to a rail loading facility and the trucks may be, for example, heat traced trucks. Rail lines may be extended to hydrocarbon recovery operation sites, where economical. The bitumen may be loaded directly into the railcars when the bitumen is already sufficiently heated to flow.

Additional infrastructure may be utilized for unloading solid bitumen at a refinery. Pistons or rotary dump tools may be utilized to remove the solid bricks from the railcars in bitumen unloading facilities at refineries. A collection tray may be installed to gather the solid bitumen bricks to transfer these bricks to the next processing step. The solid bricks of bitumen may travel from the railcar unloading area to the bitumen heating area, for example, utilizing a conveyor apparatus. The bitumen may then be heated to flow as a liquid for refining into a higher quality product.

The reduction of diluent use, reduced risk and alternative car types makes shipping solid bitumen by rail significantly less expensive than shipping a liquid bitumen-diluent mixture by rail. The presence of a superoleophobic coating in the railcar may repel oil and facilitate easy sliding of bitumen out of the railcar at the refinery and into the collection tray. As discussed above, the solid state of bitumen significantly reduces the risks involved with rail transportation because the undesirable effects of a spill of solid bitumen are reduced compared to a spill of liquid bitumen-diluent mixture.

Advantageously, superoleophobic coatings utilized with railcars and other infrastructure, for example, pipelines and storage tanks, reduces the costs associated with rail and other aspects of bitumen transportation.

EXAMPLES

In the following examples, a "plastron" that traps air in a manner somewhat similar to a cuticle coated with hairs that serves as a respiratory reservoir for aquatic insects may be utilized to produce a superoleophobic surface for railcar transportation of bitumen. Such a topography, upon reduction of surface energy as a result of functionalization with a perfluorinated compound, facilitates suspension not just of water droplets but also droplets of oil.

In general, the behavior of a liquid droplet upon being placed on a substrate is predicated on the surface tension of the liquid (as determined by the cohesive forces between the liquid molecules), the microscale and nanoscale texturation of the surface (which can amplify intrinsic wettability or provide reentrant curvature to surfaces enabling stabilization of plastrons), as well as the specific surface energy at the liquid/solid interface.

An oleophobic surface is more difficult to prepare as compared to a hydrophobic surface. This difference is readily explained by considering Young's formalism for the spread of a liquid droplet on a (flat) solid substrate (assuming conformal Wenzel wetting) where the equilibrium contact angle ($\theta_e$) is defined in Equation 1 below as:

$$\cos\theta_e = \frac{\gamma_{SV} - \gamma_{SL}}{\gamma_{LV}} \qquad (1)$$

where $\gamma_{SV}$, $\gamma_{SL}$, and $\gamma_{LV}$ represent the interfacial energies at solid-vapor, solid-liquid, and liquid-vapor interfaces. In order to obtain a non-wettable surface with a high contact angle, the cosine term must be a negative value in the range of −0.5 and −1.0, which necessitates as a first condition that the interfacial energy at the solid-liquid interface far exceed the interfacial energy of the surface (a solid-vapor term). In other words, a substrate is more likely to repel a liquid droplet if it has a low surface energy ($\gamma_{SV}$ is low) and if it is chemically incompatible with the liquid droplet. The $\gamma_{SL}$ term represents interfacial interactions and reflects a balance between disruption of cohesive forces between liquid molecules at the interface, the formation of new interactions between the liquid molecules and surficial atoms, and the reorganization of surface bonds. The distinctive behavior of water and oil originates from their vastly different surface tension values (water has a surface tension of $72.80 \times 10^{-3}$ N/m, whereas hexadecane has a surface tension of $27.47 \times 10^{-3}$ N/m at 293 K; bitumen has a surface tension estimated to be $23.6 \times 10^{-3}$ N/m at the same temperature), which reflects the relative magnitudes of their intermolecular interactions; hydrogen bonding in water is much stronger than London dispersion forces typical of oils. These latter, relatively weak, intermolecular cohesive interactions are much more readily disrupted at surfaces and thus oil droplets tend to more readily spread across surfaces. The proclivity of oil to wet surfaces is mitigated by modification of the surfaces to expose groups that are incompatible with hydrocarbons (commonly fluorous phases) or wherein the droplets are suspended across pockets of air defined by nanoscale topographies (the Cassie Baxter regime).

While bioinspired successes that deliver universal non-wettability have been realized through various approaches, previous solutions do not entirely meet the needs of handling realistic oil samples. Previous approaches have been attempted to prepare omniphobic surfaces. While much mechanistic understanding has been derived from studies of lithographically patterned substrates with variably spaced pillars, such substrates are complex to fabricate and are not viable at any realistic scales. An alternative is a polymer derived architecture, wherein microscale topography is defined by electrospinning or through the use of woven fabric substrates or electrospun fibrous mats. Polymer derived architectures are much more readily and inexpensively prepared compared to lithographically patterned substrates, but are unable to withstand high temperatures. Polymer derived architectures are further mechanically pliant and thus cannot be deployed in applications requiring high fluid flow. For the various reasons described, polymer derived architectures are thus unviable for applications such as railcars.

For viable largescale applications, a metallic substrate is a mechanically robust substrate, formable, and weldable. Microscale and even nanoscale texturation is applicable directly onto metallic substrates by selective etching. The fundamental basis for this approach is the accumulation of dislocations at the surfaces of structural metals, which enable differential pitting corrosion wherein a corrosion cell is established across intact and highly strained regions of the metal surface. Various standardized etching methods exist that may be tailored for a specific metal substrate, for example electrochemical etching, acid etching, or base etching. Multiscale texturation within Al substrates has been realized by dual etching, first using HCl to define microscale texturation and then using a mixture of $HNO_3$ and $Cu(NO_3)_2$ to define nanoscale topographies. The etched substrate was functionalized with a perfluorinated siloxane to obtain a mechanically stable omniphobic surface (see Peng, S.; Bhushan, B. *J. Colloid Interf. Sci.* 2016, 461, 273-284). However, implementation of such aggressive etching procedures on steel as well as other structural alloys results in severe corrosion, exposes sites for potential catastrophic failure, and may substantially compromise the mechanical integrity of the substrate.

Alternative approaches to the use of woven fibers or etching of metals that have emerged in recent years include the layer-by-layer deposition of polymeric and nanocrystalline layers and the stabilization of complexes of polyelectrolytes and fluorosurfactants. For instance, Bhushan and co-workers have reported a polyelectrolyte assembly incorporating $SiO_2$ nanocrystals with oriented fluorosurfactants as the top layers (see Brown, P. S.; Bhushan, B. *Sci. Rep.* 2015, 5, 1-9). These films demonstrate oleophobic but hydrophilic behavior with good resistance to wear and particulate contamination. However, the use of polyelectrolytes gives rise to similar thermal degradation issues as noted above for woven polymer substrates. Furthermore, adhesion of polyelectrolytes to steel represents a substantial challenge.

The following examples relate to the preparation of omniphobic surfaces.

Example 1. ZnO

Omniphobic surfaces may be directly integrated onto structural steel using a combination of microscale and nanoscale texturation and surface modification to decrease the surface energy. Two distinct types of steel substrates were used in this example: woven stainless steel meshes and A36 structural grade carbon steel. Microscale texturation of the former is derived from the mesh geometry, whereas in the latter case, a mild acid etching step was used to remove scale and define microscale surface features. Nanoscale texturation in both cases was derived from ZnO nanotetrapods (sometimes referred to herein as tetrapods) that were spray-coated onto the substrates and further adhered by a modified Stöber method wherein tetraethylorthosilicate (TEOS) was used as the precursor for a conformal amorphous $SiO_2$ coating (TEOS-derived) that adheres ZnO to the steel substrates. The use of a ceramic $ZnO/SiO_2$ coating allows for compatibility with high-temperature operations and further lends mechanical resilience to the coating.

Ceramic refers to the higher thermal stability and mechanical resilience that may be provided by the coating compared to other polymeric or metallic materials. Mesh and etched steel substrates showing the most promising non-wettability were further functionalized with perfluorinated molecules to endow oleophobicity. Functionalization with perfluorinated molecules allows for reduction of surface energies and renders the surface omniphobic. The length of the perfluorinated alkyl chain, the binding group, the concentration of the functionalizing compound, mixtures of perfluorinated compounds with different chain lengths and binding groups, and the immersion time were screened in order to maximize surface coverage of the perfluorinated molecules on the hierarchically textured substrates.

Steel Substrates

Two types of steel substrates were used in the experiments. Stainless steel 316 meshes with gauges of 80, 100, 150, and 180 mesh were purchased from McMaster-Carr and used after degreasing by rinsing the meshes with acetone followed by 2-propanol. 180 gauge meshes with a pore size of about 84 μm were utilized. The woven mesh strands defined the microscale texturation of these samples. A range of gauges from about 60 to about 325 may be applicable. Higher gauges may increase the roughness of the surface. The metal mesh substrate may be at least one of stainless steel, aluminum, brass, bronze, copper, polytetrafluoroethylene (PTFE) coated stainless steel, galvanized low alloy steel, nickel coated low alloy steel, and an acid-resistant nickel. For example, the metal mesh substrate may be 316 stainless steel mesh of from about 60 gauge to about 325 gauge, 304 stainless steel mesh of from about 60 gauge to about 325 gauge, aluminum mesh of up to about 200 gauge, brass wire mesh of up to about 100 gauge, bronze wire mesh of up to about 325 gauge, copper mesh of up to about 200 gauge, PTFE coated 304 stainless mesh of up to about 325 gauge, or acid-resistant nickel mesh of up to about 200 gauge.

Flat sheets of low carbon steel (type A36, 9.1 mm in thickness, The Metal Store®, Maple Heights, Ohio, USA) were also cut and were thoroughly cleaned by successively washing with hexanes (98.5%, Millipore), ethanol (99.5+%, Koptec), Alconox® soap solution, and deionized water ($\rho$=18.2 M$\Omega$/cm). Three different etching processes were carried out in order to provide microscale topographies. In the first method, the substrates were immersed in a 1:1 (v/v) solution of 12.1 M HCl and deionized water and solid hexamethylenetetramine (HMT) was added to obtain a concentration of 24.9 mM. The substrates were etched at 25-80° C. for 10-60 min. In the second method, the A36 substrates were immersed in equal parts 12.1 M HCl and deionized water (v/v). The solution was then heated to 80° C. for 10-60 min. In the third method, a mixed acid solution containing $H_2SO_4$:HCl:$H_2O$ in a 12%:38%:50% (v/v/v) ratio, using 18.0 M $H_2SO_4$ and 12.1 M HCl, was used to etch the substrates. The mixed acid solution was first heated to 93° C. before immersing samples in the solution for 30-90 s. The samples were rinsed with copious amounts of water after extraction from the acid baths prior to application of ZnO nanotetrapods or surface modification with perfluorinated groups. The deposition of the nanostructured layer and TEOS-derived $SiO_2$ or the functionalizing compound on the etched steel was performed within a few minutes of completing the etching procedure in order to prevent visible red rust formation.

Nanotetrapodal Coating

According to a process for generating ZnO nanotetrapods (see Velazquez, J. M.; Baskaran, S.; Gaikwad, A. V; Ngo-Duc, T.-T.; He, X.; Oye, M. M.; Meyyappan, M.; Rout, T. K.; Fu, J. Y.; Banerjee, S. *ACS Appl. Mater. Interfaces* 2013, 5, 10650-10657), Zn metal sheets of 0.25 mm thickness (99% purity, McMaster-Carr) were cut into ca. 3 mm×3 mm pieces and placed onto a 316 stainless steel mesh (McMaster-Carr) and inserted into a 1" quartz tube. The quartz tube was then placed within a tube furnace (Lindburg/BlueM™). The assembly was heated at a rate of about 43° C./min to a temperature of about 950° C. and dwelled at that temperature for 1 min. A crackling sound was observed along with a red glow and a fluffy white residue was collected from the walls of the quartz tube after allowing the furnace to cool to room temperature. The ZnO nanotetrapods were dispersed in 2-propanol (99.9%, Fisher Scientific) at a concentration of 20 mg/μL by ultrasonication.

The above method was modified by utilizing a 2" quartz tube (MTI Corporation) to increase the amount of ZnO produced per reaction. A similar process was followed in which Zn metal (McMaster-Carr) was abraded and then cut into ca. 3×3 mm pieces. The pieces were placed on a 316 stainless steel mesh and inserted into the 2" quartz tube. The tube, including the stainless steel mesh and Zn metal pieces, was placed inside a tube furnace (Thermo Scientific) and heated in open air at a rate of about 40° C./min to about to a temperature of about 950° C. where the system was held at this temperature for 1 min before being allowed to cool. The ZnO nanotetrapods were collected for dispersion in 2-propanol.

The ZnO nanotetrapod dispersion in 2-propanol was spray-coated onto the 316 stainless steel mesh with a pore size of about 84 μm (McMaster-Carr) or onto the etched A36 carbon steel substrates using a Master airbrush with a nozzle diameter of 0.5 mm with the help of an air compressor at an output pressure of 45 psi. The final coated substrates had ZnO loadings ranging from about 3.5 to 7.8 mg/$cm^2$. A range of loadings from about 2 mg/$cm^2$ to about 25 mg/$cm^2$ may be applicable. Without being limited to theory, for loadings higher than about 25 mg/$cm^2$, it may become progressively more difficult to achieve adherence to the substrate. The substrates were held at a temperature of about 120° C. during the coating process to facilitate removal of the 2-propanol solvent.

While the ZnO nanotetrapods were reasonably well-adhered to the mesh substrates, their adhesion on flat etched carbon steel was generally poor. In order to increase adhesion and mechanical resilience of the ZnO nanotetrapod coatings, a $SiO_2$ layer was constituted using a modified Stöber method. In order to constitute an amorphous $SiO_2$ shell, TEOS was used as the precursor and applied from a solution containing 80 vol. % ethanol, 18.5 vol. % deionized water ($\rho$=18.2 M$\Omega$/cm), 1 vol. % of 28-30% aqueous solution of $NH_4OH$, and 0.5 vol. % TEOS (99.999+% metals basis, Alfa Aesar). Compounds other than TEOS may be used to derive $SiO_2$, for example, tetramethyl orthosilicate or tetrabutyl orthosilicate. Due to accessibility via sol-gel methods, high thermal stability, and abrasion resistance, aluminosilicates, $HfO_2$, $ZrO_2$, or $TiO_2$ may also be used to adhere ZnO to the steel substrate. Aluminum(III) isopropoxide may be used as a precursor along with TEOS to prepare aluminosilicates. Silanes bearing functional groups that can further be polymerized can also be used to adhere ZnO to the etched steel substrates.

Experiments were performed to examine the efficacy of three different configurations of $SiO_2$ shells (also called layers or coatings): (1) a configuration wherein the TEOS precursor solution for generating $SiO_2$ was applied onto the cleaned and etched steel substrates prior to spray-coating of the ZnO nanotetrapods; (2) a configuration wherein the ZnO nanotetrapods were dispersed in the TEOS precursor solution for generating $SiO_2$ (described above) and the mixture was directly coated onto the steel meshes; and (3) a configuration wherein the TEOS-derived $SiO_2$ layer (also referred to as a TEOS overlayer coating) was sprayed after already having deposited the ZnO nanotetrapods. The substrates were held at a temperature of 120° C. during the spray deposition of the TEOS-derived $SiO_2$; this temperature facilitated the evaporation of the solvent and formation of a highly crosslinked siloxane framework. The last listed configuration (3) was best at improving adhesion and was examined in some detail as discussed below. The final loading of the TEOS-derived $SiO_2$ used within the overlayer coatings was about 3.9 μL/$cm^2$. A range of loadings from about 2 μL/$cm^2$ to about 400 μL/$cm^2$ may be applicable. Without being limited to theory, loadings higher than about 400 μL/$cm^2$ may diminish the plastron-like behaviour of the material.

The nanostructured oxide coating may be a coating comprising one or more of ZnO, $Al_2O_3$, MgO, $Fe_2O_3$, $Fe_3O_4$, $SiO_2$, $TiO_2$, $V_2O_5$, $ZrO_2$, $HfO_2$, $MoO_3$, or $WO_3$.

Surface Modification

To decrease the surface energy (and thus increase the hydrophobicity and oleophobicity) of the acid-etched steel sheets and ZnO nanotetrapod coated surfaces, the substrates were functionalized with perfluorinated silanes and phosphonic acid. In order to perform this surface modification, 2.7 mM solutions of the desired fluorinated compounds were prepared by combining 400 µL of ammonium hydroxide (28-30%), 400 µL of deionized water (ρ=18.2 MΩ/cm), and the appropriate mass of the fluorinated precursor. The mixture was then diluted to 20 mL using 1-butanol (99%, Alfa Aesar). The silanes, heptadecafluoro-1,1,2,2-tetrahydrodecyl trimethoxysilane, nonafluorohexyltriethoxysilane, and triethoxyfluorosilane were purchased from Gelest Inc. and used without further purification, whereas 1H,1H,2H,2H-perfluorooctanephosphonic acid (FPA) was purchased from Sigma-Aldrich and perfluorooctane was purchased from Alfa Aesar. Perfluorinated phosphonic acids and perfluorinated silanes with chain lengths of 4-22 carbon atoms may be suitable. A trial of different silane chain lengths and the perfluorooctanephosphonic acid was performed to identify the optimal species for surface modification. The substrates were immersed in the 1-butanol solutions of the fluorinated silanes for 1 h, rinsed with 1-butanol to remove physisorbed silanes, and then allowed to dry before testing. The perfluorinated silanes were selected for more detailed studies of the $SiO_2$ adhered samples given their compatibility with the siloxane framework, whereas perfluorooctanephosphonic acid was used as the modifier of choice to functionalize the surfaces of ZnO nanotetrapods. Substrates with surface modification were prepared using perfluorinated compound concentrations ranging from about 2.7 to 27 mM. A range of concentrations from about 1.5 mM to about 250 mM may be applicable. Even at the lowest tested concentrations, some degree of water and oil repellency was achieved. Without being limited to theory, depending on the surface modifier selected, there may be an upper concentration at which solubility limits, precipitation of the compound out of solution, and solution-phase aggregation of silanes may limit the use of the compound for surface modification. Perfluorinated compounds may comprise silanes, phosphonic acids, carboxylic acids, sulfonates, alcohols, thiols, and amines. Perfluorinated compounds may be linear or branched.

Characterization of ZnO Nanotetrapods

In order to evaluate the morphology of the ZnO nanotetrapods, scanning electron microscopy images were obtained utilizing a JEOL JSM-7500F field-emission scanning electron microscope (FE-SEM). An accelerating voltage of 2-5 keV or 10 keV was used to image the nanostructures. The instrument resolution was about 1.0 nm. Energy dispersive X-ray mapping analysis was conducted using an Oxford energy-dispersive X-ray (EDX) system on the same instrument but using an accelerating voltage of 10 keV and an emission current of 10 µA (FIG. 20A-E). To generate the false-color elemental maps shown in FIG. 22B-E, the following parameters were used: accelerating voltage of 15 kV, emission current of 9 µA, and probe current of 11 µA. False-color elemental composition maps were generated using the *Inca* Suite 5.05 software. X-ray diffraction was performed using a Bruker-AXS D8 Vario X-ray powder diffractometer with Cu Kα radiation (λ=1.5418 Å). Raman spectroscopy measurements were acquired utilizing 514.5 nm laser excitation from an Ar-ion laser using a Jobin-Yvon Horiba Labram HR instrument and an integrated Olympus microscope. Fourier transform infrared (FTIR) analysis was performed using a Bruker Vertex 70 instrument.

XPS spectra were collected with an Omicron XPS/UPS system equipped with an *Argus* detector using Mg Kα X-rays (source energy of 1253.6 eV) with sample charge neutralization achieved using a CN10 electron flood source. A spectral resolution of 0.8 eV was used in the measurements. High-resolution spectra were collected at a pass energy of 150 eV (in constant analyzer energy (CAE) mode) and at an energy step size of 0.05 eV. High-resolution spectra were calibrated against the C 1s line of adventitious carbon (284.8 eV). FTIR data were acquired using a Bruker Vertex-70 FTIR instrument equipped with a Pike MIRacle™ single reflection horizontal attenuated total reflectance (ATR) accessory.

Contact Angle Measurements

All contact angles were measured using a CAM 200 Optical Goniometer. For all experiments, a drop size of 10 µL was used to apply the test liquids. A mechanical pipette was used to apply deionized water (ρ=18.2 MΩ/cm), whereas hexadecane (99%, Sigma-Aldrich) and sales oil were applied using a manual micropipette. All contact angles and standard deviations shown are a result of at least three replicates.

Adhesion Testing

The surface-modified ZnO nanotetrapod films embedded onto 316 stainless steel meshes and A36 low carbon steel were evaluated for their strength of adhesion using American Society for Testing of Materials (ASTM) standardized tests. Adhesion testing of the samples was performed by following ASTM tests D3359 and D2197. In test D3359, a grid was defined on the coated substrate and a tape from the ASTM kit was applied and subsequently removed. The tested area was then evaluated for the removal of coating material from the surface and classified from 0B to 5B based on the standards prescribed by the ASTM method. In ASTM D2197, successive amounts of weight were added to a standardized balanced-beam scrape adhesion apparatus while the coated sample was pulled underneath a stainless steel U-shaped loop. The weight at which the U-shaped loop continuously broke through the coating and reached the substrate was then recorded as the scrape adhesion strength or failure end point.

Thermal Analysis

Thermogravimetric analysis (TGA) of the samples was performed using a Shimadzu TA-60WS thermal analyzer from 25 to 900° C. at 10° C./min with a nitrogen flow rate of 50 mL/min.

Results

Figure 8:
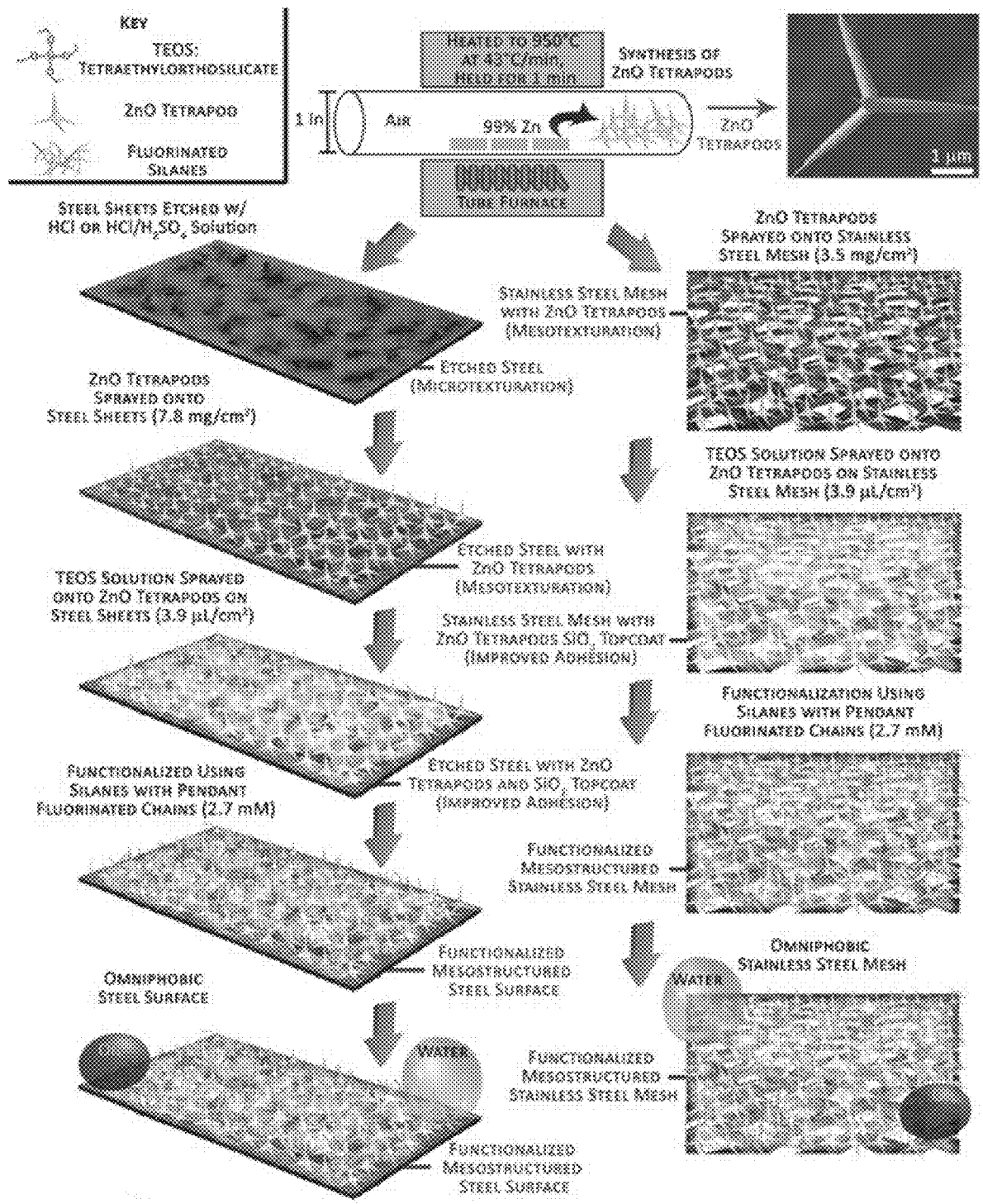
FIG. 8 shows a method of producing omniphobic surfaces integrated onto metal substrates.

As noted above, even weak interfacial liquid-solid interactions are enough to disrupt the cohesive forces between low surface tension fluids; therefore, the creation of oleophobic surfaces represents a much greater challenge as compared to the creation of hydrophobic surfaces. FIG. 8 details the method of manufacture of omniphobic surfaces integrated directly onto structural steel substrates, either etched carbon steel or stainless steel meshes. The method includes the following elements: microscale texturation derived from the woven stainless steel meshes or defined by acid etching of flat carbon steel substrates; nanoscale topography defined by ZnO nanotetrapods; plastron-like capture of air pockets between ZnO nanotetrapods and the underlying substrate; a "cementing" $SiO_2$ layer that is optionally used to adhere nanotetrapods to steel substrates; and a high density of surface perfluorinated pendant groups.

The need for hierarchical texturation and low surface energy termination can be rationalized based on Equation 1 above and the considerations outlined below. Given the large number of process variables and potentially vast matrix of compositional possibilities, contact angle measurements have been used to rapidly screen conditions and to down-select promising candidates for further examination along the process flow depicted in FIG. 8. Initially, water contact angles were used to modify the process flow to converge upon etching conditions and nanotetrapod loadings (in other words, hierarchical texturation) that showed promising non-wettability. Subsequently, the nanotetrapod loadings and nature and extent of functionalization with perfluorinated compounds were modified and the surfaces thus prepared were challenged with water, hexadecane, and sales oil. Tables 1 and 2 below provide a detailed listing of contact angles measured during the process flow shown in FIG. 8.

Based on Equation 1, in order to provide a surface that repels oil droplets, a relatively low energy surface is necessary and minimizing liquid-solid interactions ensures a relatively large interfacial surface energy. The use of a fluorous phase that is incompatible with both water and hydrocarbons is imperative to obtain an omniphobic surface. Assuming conformal wetting in the Wenzel regime, Equation 1 is modified by surface roughness to provide Equation 2 below:

$$\cos\theta_W = \frac{r(\gamma_{SV} - \gamma_{SL})}{\gamma_{LV}} = r\cos\theta_e \qquad (2)$$

where $\theta_W$ is the observed contact angle, r is a roughness factor that represents the ratio of the actual surface area to the surface area of an equivalent smooth surface, and $\theta_e$ is the equilibrium contact angle. Equation 2 implies that in the conformal wetting regime, the introduction of texturation cannot change the sign of the wettability but can amplify the magnitude of the observed cos θ value. Hierarchical texturation thus amplifies the intrinsic non-wettability of fluorous-terminated surfaces.

Additionally, omniphobic surfaces greatly benefit from architectures that suspend liquid droplets above air pockets according to the Cassie-Baxter formalism. In this regime, the contact angle is modified as follows in Equation 3 to an effective contact angle of $\theta_c$:

$$\cos\theta_c = f_s(\cos\theta_e + 1) - 1 \qquad (3)$$

where $f_s$ is the fraction of the solid that touches the liquid and needs to be as small as possible to repel liquid droplets. The ZnO nanotetrapods can serve as plastrons and stabilize air pockets enabling the nanotetrapods to suspend both water and oil droplets across the hierarchically textured substrates illustrated in FIG. 8.

Microscale Texturation

Micrometer-scale texturation was established through the use of stainless steel meshes of #80, 100, 150, and 180 gauge (ga.) or by chemical etching of flat carbon steel substrates. The results reported here are for stainless steel 316 meshes with a pore size of about 84 μm (180 gauge). FIG. 9 shows the microscale topographies defined by the meshes and the structured interlocking stainless steel fibers that enclose the pores. FIG. 9A-FIG. 9C show optical micrographs of 80, 100, and 180 gauge meshes, respectively, obtained at 10× magnification. The inset FIG. 9D shows digital photographs of the three meshes (180, 100, and 80 gauge from left to right) indicating their distinctive microscopic texturations. FIG. 9E shows a magnified view of the spacing defined by an individual 180 gauge mesh indicating the interlocking stainless steel fibers. The end-to-end distance is about 84 μm. FIG. 9F shows an SEM image of an individual 180 gauge mesh. The scale bar represents 10 μm. The microscale texturation afforded by the meshes yielded a water contact angle of 127°±3°, suggesting a fairly hydrophobic surface. Reacting surface hydroxyl groups with a fluorinated silane increased the contact angle to 130°±2° (Table 1) as a result of lowering the surface energy and increased incompatibility of the surface with water droplets as per Equation 1.

As an alternative to the meshes, microscale topography can be established by chemical etching of carbon steel. Immersion of carbon steel within strong electrolyte solutions in an ambient air environment results in pitting corrosion and roughening of the surface; the specific topographies and extent of roughness depends sensitively on the etching conditions. The etch patterns depend on the etchant and the specific elements that are selectively dealloyed from carbon steel as well as the reactivity along the dislocations in the material. Three types of etch solutions were examined: (1) an aqueous solution of 6.05 M HCl and 24.9 mM hexamethylenetetramine at 25° C. and 80° C. (for 10 min and 1 h), as reported in ASTM G1 for the cleaning and removal of oxides from carbon steel surfaces; (2) an aqueous solution of 6.05 M HCl at 80° C. (for 10 min and 60 min); and (3) a mixed acid solution of 4.6 M HCl and 2.2 M $H_2SO_4$ at 93° C. (for 30-90 s). Multiple replicates of about >3 to about 20 were performed for each of the three etching conditions described. HCl and $H_2SO_4$ etch steel in different ways and have been reported to yield hierarchical surface morphologies. (See Bramfitt, B. L.; Benscoter, A. O. *Metallographer's Guide: Practice and Procedures for Irons and Steels*; ASM International, 2001.)

Figure 11A:
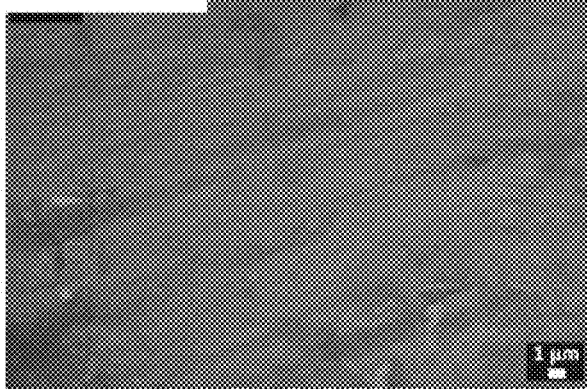
FIG. 11A through FIG. 11F contrasts scanning electron microscope (SEM) images acquired at different magnifications for carbon steel after etching compared to cleaned A36 carbon steel.
Figure 11B:
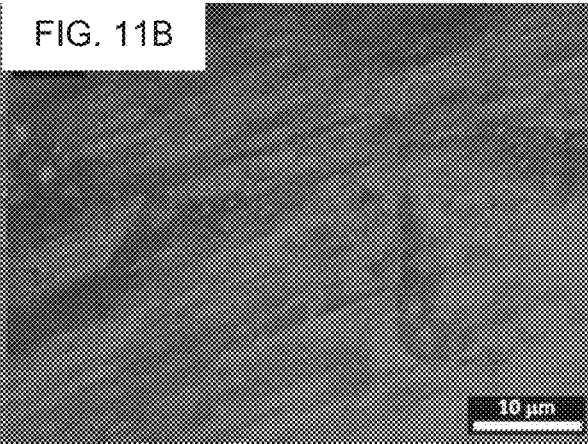
Figure 11C:
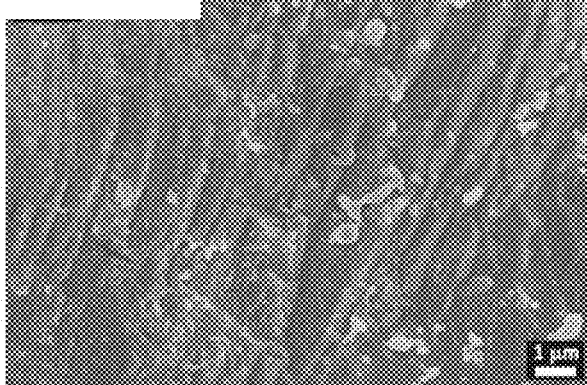
Figure 11D:
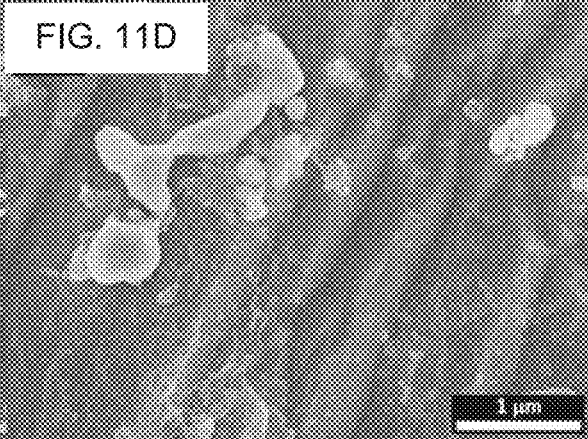
Figure 11E:
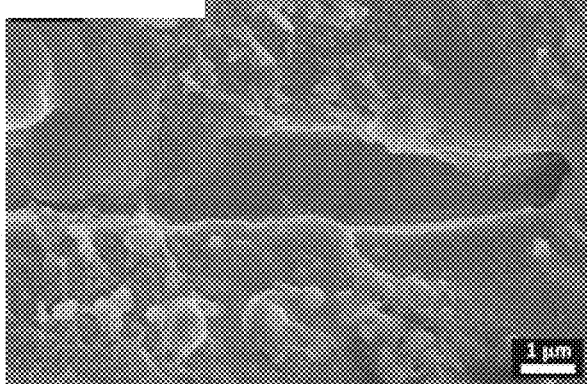
Figure 11F:
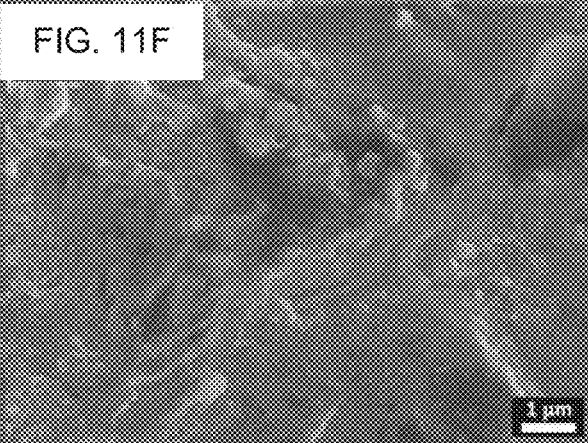

FIG. 10 shows optical microscopy images of the carbon steel surfaces after etching with different solutions for different periods of time showing contours tracing steps defined on the carbon steel surfaces. The HCl/hexamethylenetetramine solution is particularly well suited to the removal of oxide scale but did not greatly roughen the surface. Indeed, optical microscopy images indicate terraces that are tens of microns wide. In contrast, the substrates etched with the mixed acid solution showed much more closely spaced steps spanning only a few microns, whereas the substrates etched with HCl alone at 80° C. exhibited sub-micron-scale pores in addition to steps. FIG. 11A through FIG. 11F contrasts SEM images acquired at different magnifications for the latter two samples as compared to cleaned A36 carbon steel substrates (FIGS. 11A and 11B). For the mixed acid sample etched at 93° C. for 45 s (FIG. 11C and FIG. 11D), large terraces were observed spaced by 500 nm-1 μm suggesting distinctive microscale texturation. In contrast, for the HCl-etched sample prepared at 80° C. for 1 h (FIG. 11E and FIG. 11F), nanometer sized porosity was evidenced in proximity of deeper etch pits.

The efficacy of the etch solutions in defining texturation were assessed by measuring water contact angles before and after functionalization with a perfluorinated silane (a 2.7 mM solution of heptadecafluoro-1,1,2,2-tetrahydrodecyl trimethoxysilane). Upon examining the contact angles for an unfunctionalized surface it was apparent that increasing texturation decreased the contact angle for a hydrophilic surface. All of the water contact angles are listed in Table 1. A freshly cleaned steel substrate was fairly hydrophilic with a water contact angle of 63±3° (shown in both FIG. 12A & FIG. 13A). Etching with a solution of HCl, hexamethylenetetramine, and water at 25° C. for 10 min actually increased the contact angle to 80°±5°, whereas etching with the same solution at 80° C. for 10 min decreased the water contact angle to 26°±3°. Without being limited to theory, the increased water contact angle for the 25° C. etch may have resulted from removal of scale, which yielded a smoother surface that better reflects the mildly hydrophilic nature of the carbon steel. The much lower contact angle upon etching at 80° C. may have been a result of somewhat increased texturation of the surface as observed in FIG. 10 and FIG. 11. Etching the carbon steel substrates in a 1:1 HCl:$H_2O$ solution at 80° C. for 10 min induced a comparable degree of texturation and also decreased the contact angle to 27°±8°. When this same etching solution was used for an extended time of 60 min, the water contact angle decreased to 10°±1° (FIG. 13B). In comparison, the mixed acid etchant deployed at 93° C. for only 45 s decreased the contact angle to 40°±8° (FIG. 12B). When comparing the mixed acid etch at shorter and longer times of 30 s and 90 s, the water contact angle decreased to <10° and 14°+3°, respectively. The decreased contact angle for these substrates with increasing roughness was consistent with the amplification of intrinsic wettability predicted by Equation 2. The lower contact angle for the more extensively etched samples (mixed acid for 90 s or HCl etch for 60 min) suggests a higher degree of nanoscale texturation (and thus a higher r value in Equation 2), which is consistent with the deeper etch pits and nanoscale porosity observed (and shown in FIG. 11) for those samples.

The extent to which such textured surfaces were rendered hydrophobic when the surface was modified to present pendant fluorinated groups was examined. The lower rows of contact angle measurements shown in FIG. 12 and FIG. 13 indicated that after functionalization with a perfluorinated silane, the water contact angle of clean steel was increased to 114°±3° suggesting that the pendant perfluorinated groups rendered the surface hydrophobic. Again, as predicted by Equation 2, the texturation induced by etching amplified this intrinsic non-wettability of the (now) low surface energy substrate. The steel sample etched with a solution of HCl, hexamethylenetetramine, and water at 25° C. for 10 min provided a water contact angle of 115°±2° after surface modification, again suggesting that this set of etching conditions does not induce substantial texturation of the surface. When the temperature of this etching solution was increased to 80° C. for 10 min the contact angle was modestly increased to 118°±1° showing that as compared to the texturation of the cleaned blank steel, the impact, if any, of this etchant on additional texturation was nominal. These values are a good representation of the surface energy of a flat surface capped with the perfluorinated silane. For the samples etched with a 1:1 HCl:H$_2$O solution at 80° C. for 10 min and then modified with the perfluorinated silane, the water contact angle was slightly increased to 120°±3°. In contrast, a shorter 30 s etch with mixed acid solution at 93° C. yielded a greater contact angle of 133°±5°. Further, surfaces etched by a 1:1 HCl:H$_2$O solution at 80° C. for 60 min or with a mixed acid solution at 93° C. for 45 s showed much more extensive texturation as per FIG. 10 and FIG. 11 and exhibited water contact angle values of 151°±4° and 143°±6° respectively, after surface modification with the perfluorinated silane. As noted above, the latter etchant induced primarily microscale steps, whereas the former yielded nanoscale pits in addition to microscale terraces. The two most optimal etching conditions, 1:1 HCl:H$_2$O solution at 80° C. for 10 min and mixed acid solution at 93° C. for 45 s, were selected for further enhancement of non-wettability based on the addition of ZnO nanotetrapods and surface modifiers as described in subsequent sections.

Contact angles are listed in Table 1. for bare freshly etched samples as well as samples functionalized with 2.7 mM solutions of perfluorinated silanes. M-chain represents functionalization with nonafluorohexyltriethoxysilane, L-chain represents functionalization with heptadecafluoro-1,1,2,2-tetrahydrodecyl trimethoxysilane, and FPA represents functionalization with 1H,1H,2H,2H-perfluorooctanephosphonic acid. Water contact angles were acquired in triplicate for each sample and are presented as the mean and the standard deviation.

TABLE 1

Water contact angles for carbon steel substrates subjected to different etching conditions to define micro- and nanoscale texturation.

| Etching Agent | Time | Fluorinated Silane | Water Contact Angle |
| --- | --- | --- | --- |
| None | None | None | 63° ± 3° (FIG. 12A & FIG. 13A) |
| None | None | 2.7 mM M-chain | 108° ± 9° (FIG. 12C & FIG. 13C) |
| None | None | 2.7 mM L-chain | 114° ± 3° |
| HCl/HMT 25° C. | 10 min | None | 80° ± 5° |
| HCl/HMT 25° C. | 10 min | 2.7 mM L-chain | 115° ± 2° |
| HCl/HMT 25° C. | 60 min | None | 41° ± 4° |
| HCl/HMT 25° C. | 60 min | None | 127° ± 5° |
| HCl/HMT 80° C. | 10 min | None | 26° ± 3° |
| HCl/HMT 80° C. | 10 min | 2.7 mM L-chain | 118° ± 1° |
| HCl/HMT 80° C. | 1 h | None | 15° ± 5° |
| HCl/HMT 80° C. | 1 h | 2.7 mM L-chain | 137° ± 2° |
| Mixed acid 93° C. | 30 s | None | <10° |
| Mixed acid 93° C. | 30 s | 2.7 mM L-chain | 133° ± 5° |
| Mixed acid 93° C. | 30 s | 2.7 mM M-chain | 103° ± 3° |
| Mixed acid 93° C. | 45 s | None | 40° ± 8° (FIG. 12B) |
| Mixed acid 93° C. | 90 s | None | 14° ± 3° |
| Mixed acid 93° C. | 45 s | 2.7 mM M-chain | 133° ± 3° (FIG. 12D) |
| Mixed acid 93° C. | 45 s | 2.7 mM L-chain | 143° ± 6° |
| Mixed acid 93° C. | 45 s | 2.7 mM FPA | 145° ± 2° |
| HCl 80° C. | 10 min | None | 27° ± 8° |
| HCl 80° C. | 10 min | 2.7 mM L-chain | 120° ± 3° |
| HCl 80° C. | 1 h | 2.7 mM L-chain | 151° ± 4° |
| HCl 80° C. | 1 h | None | 10° ± 1° (FIG. 13B) |
| HCl 80° C. | 1 h | 2.7 mM M-chain | 158° ± 4° (FIG. 13D) |

Nanoscale Texturation:

FIG. 14A and FIG. 14B show two different orientations of individual ZnO nanotetrapods. FIG. 14C and FIG. 14D are low and high-magnification (respectively) views of ZnO nanotetrapods integrated onto stainless steel meshes. FIG. 14E and FIG. 14F are low and high-magnification (respectively) views of ZnO nanotetrapods integrated onto etched A36 steel substrates. The Raman spectrum acquired for harvested ZnO powders shown in FIG. 14G is consistent with stabilization of the hexagonal form of ZnO and the symmetry assignments of the phonon modes are indicated in FIG. 14G. The XRD pattern of the ZnO nanotetrapods shown in FIG. 14H was indexed to Joint Committee on Powder Diffraction Standards (JCPDS) #36-1451, indicating the formation of phase-pure ZnO in the hexagonal zincite phase.

Without being limited to theory, the arms of the tetrapods are thought to be a result of a screw-dislocation-mediated growth mechanism. As the Zn concentration is depleted, the nanowires taper to a point. While a few nanowire arms may be broken during harvesting and spray-coating, the structures nevertheless may provide a continuous nanoscale topography on the meshes and the etched steel substrates as a result of the protruding arms. The nanotetrapods provide the following advantages: (i) the tetrapod morphology with protruding arms gives rise to a nanotextured morphology regardless of the specific orientation of the nanostructures, which is much more advantageous as compared to nanowire arrays that can potentially buckle and flatten under an applied stress; (ii) the tetrapod morphology is impossible to close pack and thus enmeshed nanotetrapods yield nanoscale porosity as evidenced in FIG. 14C and FIG. 14D; and (iii) the nanotetrapods define a "bed of nails" geometry enabling classical Cassie-Baxter or plastron-like behavior by trapping air beneath suspended water or oil droplets.

The deposition of the nanotetrapods on the surfaces tested resulted in an increase of the water contact angle due to increased texturation as predicted by Equations 2 and 3 for Wenzel and Cassie-Baxter regimes, respectively. For a loading of 3.5 mg/cm$^2$ ZnO nanotetrapods, the water contact angle for a stainless steel mesh increased to 141° from 127°. When water was placed on these surfaces and the surfaces were tilted to an angle of about 5°, the water was strongly and rapidly repelled away from (rolled off of) the surface, demonstrating superhydrophobic behavior (as shown in FIG. 15, which represents a time frame of 1 s from FIG. 15A to FIG. 15F).

Adhering ZnO Nanotetrapods to Steel Substrates

The enmeshed and interlocked ZnO nanotetrapods were reasonably well adhered to the stainless steel mesh substrates but showed rather poor adhesion to the etched steel substrates upon spray deposition. The stainless steel mesh substrates were directly functionalized as described in subsequent sections herein. To improve the adhesion of ZnO nanotetrapods onto etched carbon steel, an amorphous SiO$_2$ shell was constituted by a condensation reaction of surface hydroxyl groups of the nanotetrapods and steel surfaces with silanols that were obtained by the base-catalyzed hydrolysis of TEOS. As mentioned above, three different configurations were tested in terms of adhesion to clean steel surfaces: (1) an initial condensation reaction of TEOS with the surface hydroxyl groups of the thin oxide layer on the steel surface followed by spray deposition of ZnO nanotetrapods; (2) spray deposition of ZnO nanotetrapods from a TEOS dispersion in ethanol and water; and (3) an overlayer of TEOS-derived SiO$_2$ after spray deposition of the initial ZnO nanotetrapod layer. FIG. 16 shows the results of ASTM 3359 testing of the samples assessed on a standardized scale of 0B to 5B with higher numerical figures representing better adhesion. In the absence of TEOS-derived SiO$_2$ (first column of images in FIG. 16), the deposited ZnO coating was removed from almost every region of the scribed grid with a rating of 0B. The application of an initial (basecoat) TEOS-derived SiO$_2$ layer (third column of images in FIG. 16) or spray-coating from a TEOS dispersion (fourth column of images in FIG. 16) slightly improved the adhesion to 1B, but a large amount of the coating was still readily removed by application of the adhesive tape. However, application of a top layer (topcoat) of TEOS-derived SiO$_2$ (second column of images in FIG. 16) to an initially spray-deposited ZnO nanotetrapod coating earned the highest rating of 5B. Notably, the tests were performed on flat and clean steel substrates for consistent results for adhesion testing. A greater degree of adhesion is expected for etched surfaces that present a higher surface roughness.

Figure 17:
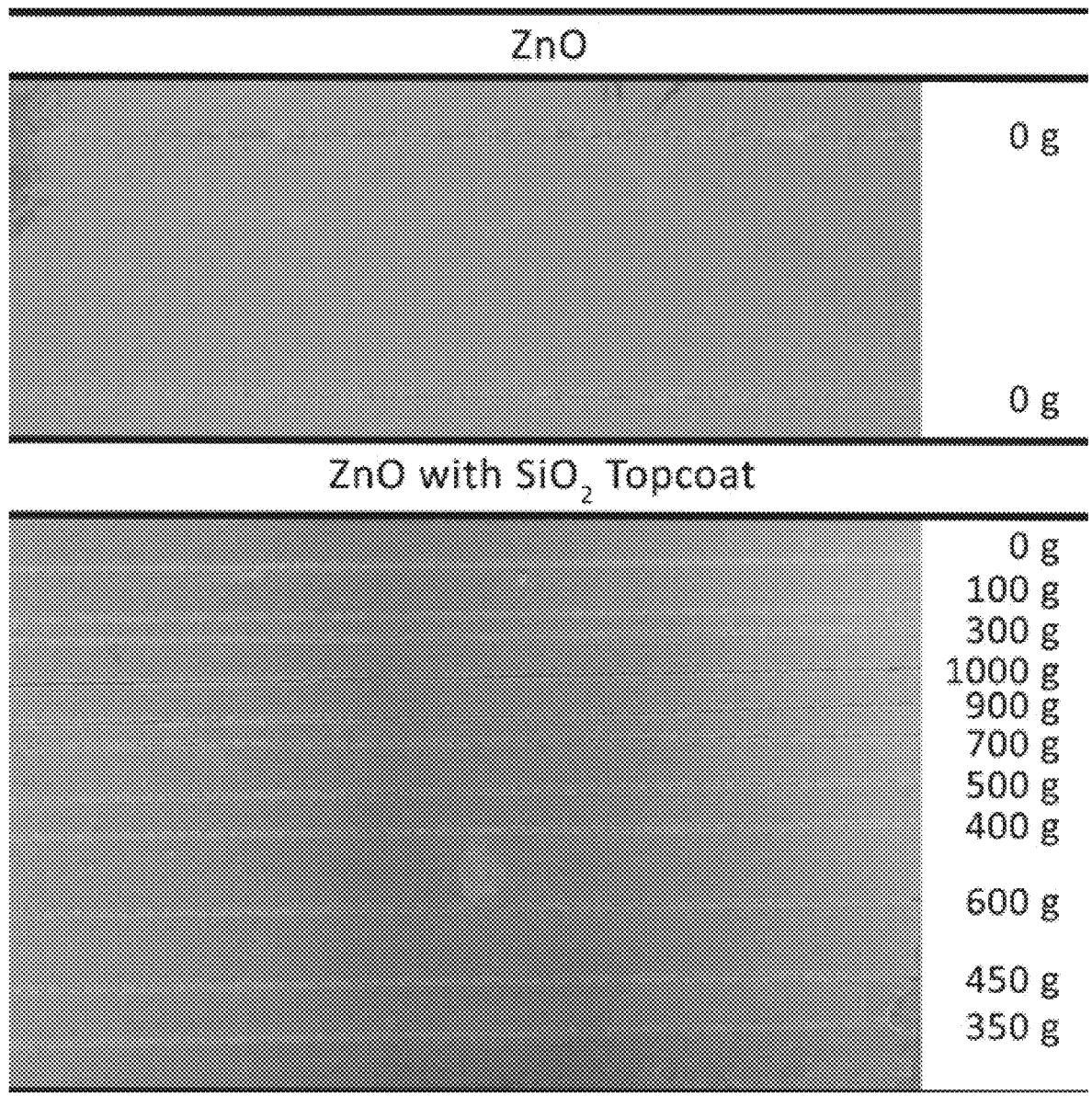
FIG. 17 shows that a spray-deposited ZnO nanotetrapod layer is removed from a carbon steel substrate with minimal weight in the ASTM D2197 scrape adhesion test and shows substantial increase in adhesion strength upon coating with a top layer of tetraethylorthosilicate (TEOS)

Similarly, FIG. 17 indicates that the topcoated substrates showed an adhesion strength of 450-550 g in ASTM D2197 scrape adhesion tests as compared to 0 g for ZnO nanotetrapods spray-deposited without a TEOS-derived SiO$_2$ layer.

A top cementing layer of TEOS-derived SiO$_2$ was thus adopted to adhere the ZnO nanotetrapods particularly to the etched carbon steel substrates and indeed the top cementing layer facilitated functionalization with, for example, perfluorinated siloxanes. The SEM images in FIG. 18A through FIG. 18C illustrate at increasingly higher magnifications the hierarchical texturation of stainless steel mesh/ZnO nanotetrapod/TEOS-derived SiO$_2$ layers. An amorphous SiO$_2$ shell was discernible around the ZnO nanotetrapods. The amorphous layer appeared to trace the contours of the nanotetrapods and the underlying substrate. Such a hierarchical structure showed a further enhancement of the water contact angle to 142°±2° (see Table 2). Similarly, FIG. 19 shows the hierarchical texturation of etched steel/ZnO nanotetrapod/TEOS-derived SiO$_2$ layers. The SEM images in FIG. 19A through FIG. 19C correspond to steel substrates etched with an HCl solution, whereas the SEM images in FIG. 19D through FIG. 19F were etched with the mixed acid solution as described above. The extremely porous and mesostructured topographies were easily discernible from the SEM images, demonstrating the possibility for "plastron-like" behavior where air pockets are trapped between the ZnO nanotetrapods and the etched steel surfaces.

Surface Functionalization with Fluorinated Silanes and Phosphonic Acids: Water Contact Angles As indicated by Equation 1, a low surface energy ensures non-wettability towards low surface tension liquids. Pendant fluorinated moieties are particularly useful owing to their minimal interactions with both water and hydrocarbons. The intermolecular interactions of C—F bonds are incompatible with hydrogen bonding favored by water molecules and dispersive interactions favored by hydrocarbons. As a consequence, minimal energetic stabilization may be realized when a water or hydrocarbon droplet impinges on a surface functionalized with a perfluorinated compound and thus the liquid-solid interfacial energies in Equation 1 remain quite large. In other words, the adhesive forces at a surface functionalized with a perfluorinated compound are inadequate to overcome the cohesive forces between droplet molecules. The surface energy depends on the surface grafting density of fluorinated moieties, which in turn is a function of the binding group, the length of the perfluorinated alkyl chains, and the processing conditions (concentration, temperature, and soak time).

As an initial screening parameter, varying lengths of perfluorinated alkyl chains were selected. Triethoxyfluorosilane represents the shortest chain length (C2), nonafluorohexyltriethoxysilane represents a medium chain derivative (C6), and heptadecafluoro-1,1,2,2-tetrahydrodecyl trimethoxysilane represents a long chain derivative (C10). Hereafter, each fluorinated silane will be mentioned by short (C2 or S-chain), medium (C6 or M-chain), and long chain (C10 or L-chain) labels. As an example of an entirely distinct binding mode, 1H,1H,2H,2H-perfluorooctanephosphonic acid (FPA) was also used as a fluorinated derivative because it has previously been shown to have a high affinity for ZnO surfaces (see Timpel, M.; Nardi, M. V.; Krause, S.; Ligorio, G.; Christodoulou, C.; Pasquali, L.; Giglia, A.; Frisch, J.; Wegner, B.; Moras, P.; Koch, N. *Chem. Mater.* 2014, 26, 5042-5050). The phosphonic acid moiety may potentially directly bind ZnO surfaces, whereas the silanes were used to react towards surface hydroxyl groups.

The etched surfaces were screened using the three types of silanes initially using water contact angles as a measurement of the surface energy and roughness in each case. The M-chain fluorinated silane exhibited the highest degree of hydrophobicity with a water contact angle of 158° for the HCl etched sample (Table 1). It is worth noting the perfluorinated phosphonic acid yielded comparable or superior results depending on the etching conditions. For example, for the sample etched in a 1:1 HCl:H$_2$O solution for 1 h at 80° C., functionalization with perfluorinated phosphonic acid yielded a water contact angle of 140°±5°. Analogously, a water contact angle of 145° 2° was obtained for blank steel etched with mixed acid at 93° C. for 90 s and functionalized with perfluorinated phosphonic acid, whereas the M-chain silane yielded a water contact angle of 133°±3°. The M-chain silane and FPA were used to further functionalize the mesh and etched steel substrates coated with ZnO nanotetrapods as per the process flow depicted in FIG. 8 and the resulting surfaces were further challenged with hexadecane and sales oil as test liquids apart from water (Table 2). The sales oil is particularly relevant to real-world applications and is a realistic and viscous liquid that strongly wets pipelines and storage tanks.

FIG. 20A through FIG. 20F illustrate aspects of an EDX analysis of ZnO nanotetrapods functionalized with the L-chain silane. FIG. 20 shows (A) zinc, (B) oxygen, (C) flourine, and (D) carbon EDX maps of ZnO nanotetrapod samples on a stainless steel mesh; (E) an EDX spectrum of the sample area analyzed in (F); (F) an SEM image of the ZnO nanotetrapods coated onto a stainless steel mesh; and (G) an attenuated total reflection FTIR spectrum of TEOS-derived $SiO_2$ coated ZnO nanotetrapods soaked for 1 h in a 2.7 mM butanol solution of heptadecafluoro-1,1,2,2-tetrahydrodecyl trimethoxysilane. The localization of Zn and F signals verifies the surface grafting of the fluorinated moieties with a measured Zn:F ratio of 20:39. In addition the FTIR spectrum acquired in attenuated total reflectance mode shown in FIG. 20G indicates vibrational modes at 1201 and 1146 $cm^{-1}$, which can be assigned to C—F stretching and C—F bending modes of the perfluoroalkyl chains of the heptadecafluoro-1,1,2,2-tetrahydrodecyl trimethoxysilane, respectively. In addition, a Si—O—Si stretch at 1076 $cm^{-1}$ from the TEOS-derived $SiO_2$ coating was also observed.

FIG. 21A and FIG. 21B illustrate that the ZnO nanotetrapod coated mesh acquires a shiny lustrous appearance upon immersion in water, which reflects the trapped air pockets enclosed by the tetrapodal structures. High water repellency of the superhydrophobic surface is illustrated by the complete ejection of the substrate upon partial immersion in water. The plastronic features result from the individual micron-sized pores being further interconnected by the tetrapodal structures at their periphery, which serve to yield an extended porous network. The trapped air renders the substrates buoyant over the span of several months without loss of water repellency. Unlike in the case of isolated plastronic pockets, the interconnected network of pores ensures that the plastrons are not destroyed upon immersion as long as a part of the substrate is not submerged. Water droplets impinging on the surface ricochet from the surface as a result of the high water repellency of the coated substrates.

The surfaces of the ZnO tetrapods were functionalized with 1H,1H,2H,2H-perfluorooctanephosphonic acid (FPA, obtained from Sigma-Aldrich), given the ability of phosphonic acids to form well-ordered phosphonate monolayers strongly bound to the surface through multidentate coordination. The phosphonic acid moieties provided substantially greater packing densities as compared to perfluorinated silanes on the ZnO surface. The packing of the perfluorinated groups represents a trade-off between enthalpic gains from formation of an ordered layer and entropic costs derived from immobilization and loss of configurational entropy. FPA was selected to ensure optimal packing, which is lost with longer, or substantially shorter, chains as a result of poor ordering at low temperatures. The surface functionalization of the ZnO tetrapods with FPA was characterized by energy dispersive X-ray (EDX) spectroscopy, X-ray photoelectron spectroscopy (XPS), and Fourier transform infrared (FTIR) spectroscopy as illustrated in FIG. 22A through FIG. 22H and FIG. 23. FIG. 22E shows an EDX spectrum acquired for an individual tetrapod shown in FIG. 22A. EDX maps corresponding to characteristic fluorescent X-rays detected for Zn, 0, and F are shown in FIG. 22B, FIG. 22C and FIG. 22D, respectively, and indicate localization of surface functionalization to the tetrapodal oxide surfaces. Homogeneous surface functionalization is detected within the limits of spatial resolution across the surface of the tetrapod.

Several distinct chemical bonding environments were discernible in high-resolution C Is XPS spectra acquired for the functionalized ZnO tetrapods (see FIG. 22F). The feature centered at 284.8 eV was from both adventitious hydrocarbons, physisorbed onto nanostructured surfaces exposed to ambient conditions and also observed prior to functionalization, and methylene carbons from the phosphonic acid ligand. The feature centered at 285.9 eV was assigned to both C—P and —$CH_2$ groups next to a —$CF_2$ group (—$CF_2$—$CH_2$—). The feature centered at 290.4 eV was attributed to —$CF_2$ groups situated immediately adjacent to a —$CH_2$ group (—$CF_2$—$CH_2$—). The feature centered at 292.5 eV was attributed to —$CF_2$ groups adjacent to another —$CF_2$ group (—$CF_2$—$CF_2$—). Finally, the feature centered at 293.8 eV was attributed to —$CF_3$ groups next to a —$CF_2$ group (—$CF_2$—$CF_3$). The O 1s high-resolution XPS spectrum was characterized by three distinctive features (as shown in FIG. 22G). Features centered at 530.1 and 531.9 eV, which were also observed for the ZnO tetrapods prior to functionalization, can be attributed to lattice oxygen atoms bonded to Zn atoms in the hexagonal zincite structure and to surficial oxygen from hydroxyl groups on ZnO, respectively. Upon surface functionalization, a third distinctive feature centered at 533.8 eV was observed and was ascribed to O—P bonds of FPA bonded in a bidentate fashion to ZnO. FIG. 22H shows F is XPS spectra acquired for the functionalized ZnO tetrapods. No fluorine was detected prior to functionalization. The high-resolution F 1 s XPS spectrum included a major feature at 687.7 eV, which was attributed to fluorine atoms bonded to carbon in —$CF_2$ and —$CF_3$ groups of FPA, analogous to values noted for spectra acquired for perfluorinated monolayers of phosphonic acids and thiols. A minor peak centered at 685.4 eV denotes the presence of inorganic fluoride impurities.

Figure 23:
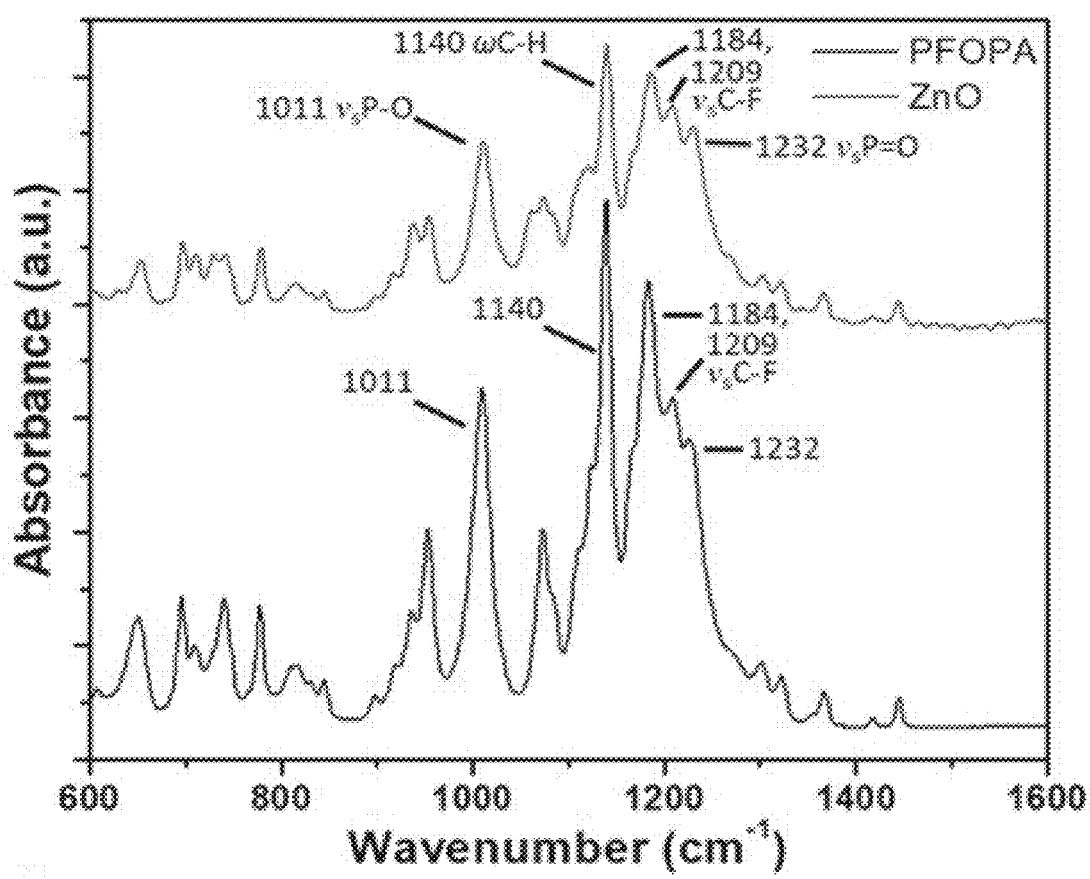
FIG. 23 shows Fourier transform infrared attenuated total reflectance (FTIR ATR) spectra of 1H,1H,2H,2H-perfluorooctanephosphonic acid (FPA or PFOPA) in black and PFOPA-functionalized ZnO tetrapods in grey.

Further analysis was performed using FTIR spectroscopy to characterize the ordering of the functionalizing moiety on the ZnO surfaces. FIG. 23 contrasts the FTIR ATR spectra of FPA-functionalized ZnO tetrapods (grey line) with that of the free phosphonic acid (black line). The peaks observed at 1140 $cm^{-1}$ and 1232 $cm^{-1}$ suggested the ordering of perfluorinated groups forming a self-assembled monolayer on the tetrapod surfaces. These two modes correspond to asymmetric $CF_2$ stretches perpendicular to the helical axis of fluoroalkanes that are ordered with a helical-tilt orientation. Further corroboration of the helical configuration within the monolayers was derived from the observation of characteristic modes at 1325 $cm^{-1}$ and 1367 $cm^{-1}$, which confirmed the presence of symmetrical $CF_2$ stretching parallel to the fluoroalkyl helical axis. These values were indicative of the relatively close packing of the fluoroalkyl chains, which translated to a low surface energy and thus superhydrophobicity and superoleophobicity. A band observed at 2947 $cm^{-1}$ (not shown) was ascribed to asymmetric $CH_2$ stretching and was blue-shifted from the free acid indicating that the $CH_2$ groups immediately adjacent to the phosphonic acid binding groups of the fluoroalkyl chains were less ordered. The relatively large steric footprint of the phosphoryl binding groups is believed to restrict the packing of adjacent $CH_2$ groups. However, the fluoroalkyl chains that are further away from the phosphoryl binding groups interact to form helical assemblies. Bands observed at 951 $cm^{-1}$, 955 $cm^{-1}$, and 1011 $cm^{-1}$ were also shown, which were ascribed to P—O and P—OH stretching. The broad band discernible in the 2100-3100 cm$^{-1}$ range (not shown) was characteristic of (OH)$_2$P=O groups.

The results of water contact angle measurements for ZnO nanotetrapods deposited onto stainless steel mesh or etched carbon steel and then modified with the M-chain silane or the FPA are enumerated in Table 2. FIG. 24 highlights the superhydrophobic behavior of ZnO loaded stainless steel meshes after functionalization with a perfluorinated compound. Water droplets were observed to roll or bounce off the mesh samples in <1 s (time elapsed between FIG. 24A and FIG. 24F) leaving behind no visible residue. Functionalization of ZnO nanotetrapods on etched steel with the M-chain silane yielded the highest water contact angles for HCl and mixed acid etchants (165° and 164°, respectively). In contrast, the sales oil contact angles for these two samples were 92° and 105°, respectively, which indicate a moderate degree of non-wetting that was greatly improved over the spreading of sales oil onto the etched surfaces observed prior to functionalization with a perfluorinated compound. The superior non-wettability obtained for the M-chain fluorinated silane in comparison to the perfluorinated phosphonic acid in this case was likely a result of the greater grafting density of the former on the TEOS-derived SiO$_2$ coated surface that overcoats much of the ZnO nanotetrapod layer.

Mixtures of all the fluorinated silanes were also examined by immersion of the substrates in two different silane solutions for 1 hour each. The results listed in Table 2 indicate that for mixtures of fluorinated silanes, the water contact angle was reduced in comparison to the substrates functionalized with a single type of perfluorinated compound no matter the etchant. Without wishing to be bound by theory, it is hypothesized that mixed monolayers show a lower degree of ordering on the ZnO surfaces, which translates to a lower grafting density of pendant fluorinated species and thus a higher surface energy. The higher water contact angles obtained for the M-chain silane tests may also correlate to the relatively better ability of M-chain silanes to form self-assembled monolayers on the surfaces; the steric footprint of longer chain silanes likely precludes ordered self-assembly, whereas the shorter chain silanes likely have a relatively low degree of ordering on account of limited intermolecular interactions across the short perfluorinated ethyl chains.

Surface Functionalization with Fluorinated Silanes and Phosphonic Acids: Hexadecane and Sales Oil Contact Angles The medium chain (C6) silane and 1H,1H,2H,2H-perfluorooctanephosphonic acid (FPA) were further examined as surface modifiers for the two most textured surfaces down-selected from the process flow mapped in FIG. 8 based on measurements of water contact angles: (1) etched steel with ZnO nanotetrapods and TEOS-derived SiO$_2$ topcoat and (2) ZnO nanotetrapods on a 150 gauge steel mesh with a TEOS-derived SiO$_2$ topcoat. The functionalized substrates were challenged with sales oil and hexadecane in addition to water (Table 2). As a control, the contact angles of hexadecane and sales oil on flat carbon steel were measured to be 15°±3° (FIG. 25A) and 59°±4° (FIG. 25F), respectively. The sequence of freeze frame images acquired in FIG. 26 indicated that the viscous sales oil spreads to cover and wet the surface of blank steel and cannot be drained from the surface.

Upon surface modification of the blank steel with the M-chain silane, the hexadecane contact angle increased to 76°±3° (FIG. 25B), whereas the sales oil contact angle increased to 60°±4° (FIG. 25G). Microscale texturation of blank steel induced by etching with hydrochloric acid and subsequent functionalization increased the hexadecane contact angle from 15°±3° (FIG. 25A) for blank steel to 59°±4° (FIG. 25C), whereas the sales oil angle was maintained at 58°±3° (FIG. 25H) under the same conditions.

After the successive steps of HCl acid roughening, deposition of ZnO nanotetrapods, and surface modification with the M-chain fluorinated silane, the hexadecane and sales oil contact angles were 58°±3° (FIG. 25D) and 58°±3° (FIG. 25I), respectively. After HCl acid roughening, deposition of ZnO nanotetrapods, TEOS-derived SiO$_2$ spray-coating, and surface modification with the M-chain fluorinated silane, the hexadecane and sales oil contact angles were measured to be 60°±3° (FIG. 25E) and 105°±7° (FIG. 25J), respectively, noting a significant increase for sales oil in particular (FIG. 25J). Without being limited to theory, the amorphous SiO$_2$ layer may provide additional sites to bind the fluorous monolayer, increasing the grafting density of the pendant fluorous groups, as indicated by the increase in the sales oil contact angle. The same increase in contact angle observed for sales oil may not have been seen for hexadecane due to the lower viscosity of hexadecane, which may make it more difficult to establish a plastron; increasing the hexadecane contact angle compared to that for sales oil may require higher concentrations, for example about 10 times higher, of the fluorosilane as well as longer soak times.

In contrast to the chemical etching procedures with results illustrated in FIG. 25, for the stainless steel mesh substrates, introduction of either hexadecane (FIG. 27A) or sales oil (FIG. 27E) led to a contact angle of 0°, demonstrating complete wettability. Functionalization of these mesh substrates with the M-chain silane significantly increased the contact angle of hexadecane to 109°±9° (FIG. 27B); however the more dense sales oil completely permeated through the mesh functionalized with a perfluorinated compound with a contact angle of 0° (FIG. 27F). With a ZnO nanotetrapod loading of 3.5 mg/cm$^2$ and subsequent surface modification with the M-chain silane, the mesh substrate maintained a hexadecane contact angle of 107°±2° (FIG. 27C); however, the additional texturation helped render the surface more non-wettable towards sales oil, which showed a contact angle of 77°±6° (FIG. 27G). A ZnO nanotetrapod loading of 3.5 mg/cm$^2$ followed by TEOS-derived SiO$_2$ spray-coating, and subsequent functionalization with the M-chain silane yielded hexadecane and sales oil contact angles of 113°±7° (FIG. 27D) and 145°±4° (FIG. 27H), respectively, noting a significant increase for sales oil in particular (FIG. 27H).

Based on evaluation of the substrates with more challenging low surface tension liquids, hexadecane and sales oil, the two most promising set of samples from each branch of the process flow shown in FIG. 8 were: (1) HCl etched steel coated with ZnO nanotetrapods with a SiO$_2$ overlayer and (2) stainless steel mesh coated with ZnO nanotetrapods with and without a SiO$_2$ overlayer; therefore, these samples were selected to further evaluate methods for lowering surface energy. For these highly textured surfaces, a lower surface energy was obtained by increasing the grafting density of fluorinated species. With an increase in concentration of the M-chain (C6) silane to 8.1 mM, the hexadecane and sales oil contact angles of the stainless steel mesh coated with ZnO nanotetrapods with a TEOS-derived SiO$_2$ overcoating were somewhat increased to 117°±5° compared to the previous result of 113°±7° for hexadecane and 151°±4° compared to the previous result of 145°±4° for sales oil (Table 2). The high sales oil contact angles for this substrate suggest strong omniphobicity resulting from an optimal combination of low surface energy and hierarchical texturation. This surface not only provided trapped plastronic air pockets but the high grafting density of fluorinated species imparted a low surface energy. Consequently, oil droplets were suspended across nanoscale and microscale topographies with relatively minimal contact (in Cassie-Baxter mode as expressed by Equation 3) with a high value of $\gamma_{SL}$ at the intermittent contact points.

In comparison, by increasing the concentration of the M-chain (C6) silane to 8.1 mM, the hexadecane and sales oil contact angles of carbon steel etched with a 1:1 HCl:H$_2$O solution at 80° C. for 1 h with a ZnO nanotetrapod coating and with a TEOS-derived SiO$_2$ overcoating were increased to 91°±2° compared to the previous result of 60°±2° for hexadecane and 139°±8° compared to the previous result of 105°±7° for sales oil (Table 2). Given the clear superiority of the stainless steel mesh and HCl etched samples in repelling hydrocarbon liquids at higher M-chain fluorinated silane loading, the texturation and surface energy of these samples were further varied by evaluating the influence of ZnO nanotetrapod loading and higher concentrations of FPA as a surface modifier.

To further enhance the omniphobicity of the samples, the texturation was increased by doubling the concentration of ZnO nanotetrapods on the HCl etched steel and stainless steel mesh surfaces to 7.0 mg/cm$^2$ and the concentration of the surface modifier, 1H,1H,2H,2H-perfluorooctanephosphonic acid, was further increased by an order of magnitude from the original trials shown in FIG. 25 to 27.0 mM. FIG. 28 depicts water and sales oil contact angles for such surfaces (also see Table 2). FIG. 28A and FIG. 28B show water contact angles of (A) 168°±3° on carbon steel after etching with an HCl:H$_2$O solution at 80° C. for 1 h, deposition of 7.8 mg/cm$^2$ of ZnO nanotetrapods, and modification with a 27.0 mM tetrahydrofuran (THF) solution of 1H,1H,2H,2H-perfluorooctanephosphonic acid (FPA) and (B) 155°±2° on 80 gauge mesh loaded with 7.0 mg/cm$^2$ of ZnO nanotetrapods and modification with a 27.0 mM THF solution of FPA. FIG. 28C and FIG. 28D show sales oil contact angles of (C) 133°±1° and (D) 156°±1°, demonstrating the wetting behavior of sales oil for samples (A) and (B), respectively.

The motion of a droplet on a surface in the range of non-wettability depends on the balance of forces between gravity and surface tension (unbalanced Young's forces) at the contact line. In the Cassie-Baxter regime, the contact line may become pinned resulting in hysteresis between advancing and receding contact angles. From a practical perspective, this implies that for omniphobic behavior of a liquid droplet, an optimal degree of nanotexturation is required. A very high degree of nanotexturation provides an abundance of sites to pin the liquid droplet, whereas with minimal nanotexturation, it may become difficult to stabilize the droplet in the Cassie-Baxter regime and the conformal wetting (Wenzel regime) becomes more likely. Of the samples tested, a ZnO nanotetrapod loading of 7.0 mg/cm$^2$ was found to facilitate gliding of sales oil droplets on the substrate shown in FIG. 29 (over a time of 50 s) and FIG. 30 (over a time of 90 s), the substrate being a stainless steel mesh surface coated with 7.0 mg/cm$^2$ of ZnO nanotetrapods functionalized by immersion in a THF solution of 27.0 mM FPA for 1 h.

As shown in Equation 4, a liquid droplet can glide across a surface when:

$$\rho V g \sin \alpha > \pi r \gamma (\cos \theta_R - \cos \theta_A) \quad (4)$$

where r is the radius of the contact line, $\gamma$ is the surface tension of the liquid, $\theta_R$ and $\theta_A$ are the receding and advancing contact angles, respectively, $\rho$ is the density of the liquid, V is the volume of the droplet, g is the acceleration due to gravity, and $\alpha$ is the angle by which the substrate is tilted. Based on this equation, it was observed that a water droplet readily glided across the fabricated substrates.

FIG. 15 and FIG. 24 indicated the motion of water droplets impinging on stainless steel mesh substrates coated with ZnO nanotetrapods before and after functionalization with nonafluorohexyltriethoxysilane, respectively. The facile motion of water droplets was facilitated by the high density of water (1,000 kg/m$^3$) and the fact that the radius of the contact line is rather small given the high water contact angle (>160°, Table 2). Consequently, the gliding of water droplets was relatively more forgiving of contact angle hysteresis due to defects in the substrates. In contrast, the hydrocarbons tested have a relatively lower density and wet the surfaces relatively more (see sales oil contact angles in the range of 130°-156°, Table 2), giving rise to a relatively larger radius of the contact line. As a consequence, reducing the contact angle hysteresis (to reduce the ($\cos \theta_R - \cos \theta_A$) term in Equation 4) and further enhancing non-wettability (to reduce r in Equation 4) is utilized to achieve gliding of the oil droplets at reasonable values of $\alpha$. The images shown in FIG. 29 indicate that for stainless steel mesh coated with 7.0 mg/cm$^2$ of ZnO nanotetrapods and functionalized by immersion in a tetrahydrofuran (THF) solution of 27.0 mM 1H,1H,2H,2H-perfluorooctanephosphonic acid (FPA), even viscous sales oil droplets glided from the surfaces upon tilting. The images shown in FIG. 30 suggest that the substrate can be completely immersed in sales oil which then drips off the substrate upon tilting, leaving behind a clean surface that can be reused. Sales oil droplets were only pinned and retained at the uncoated edges of the substrate in this test.

Figure 31B:
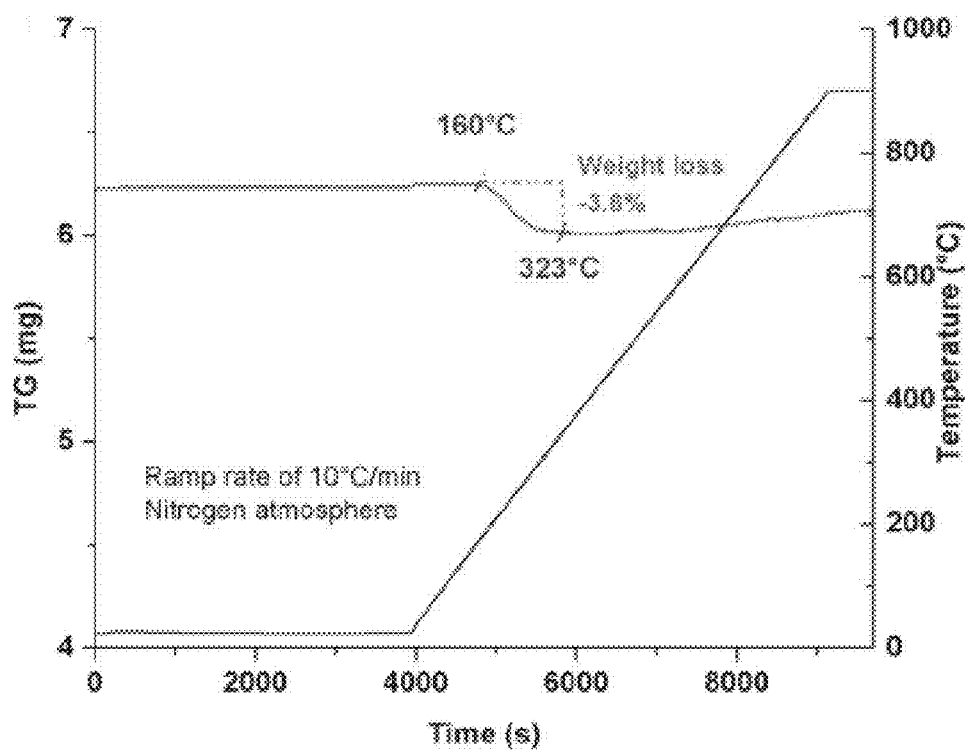
Figure 31C:
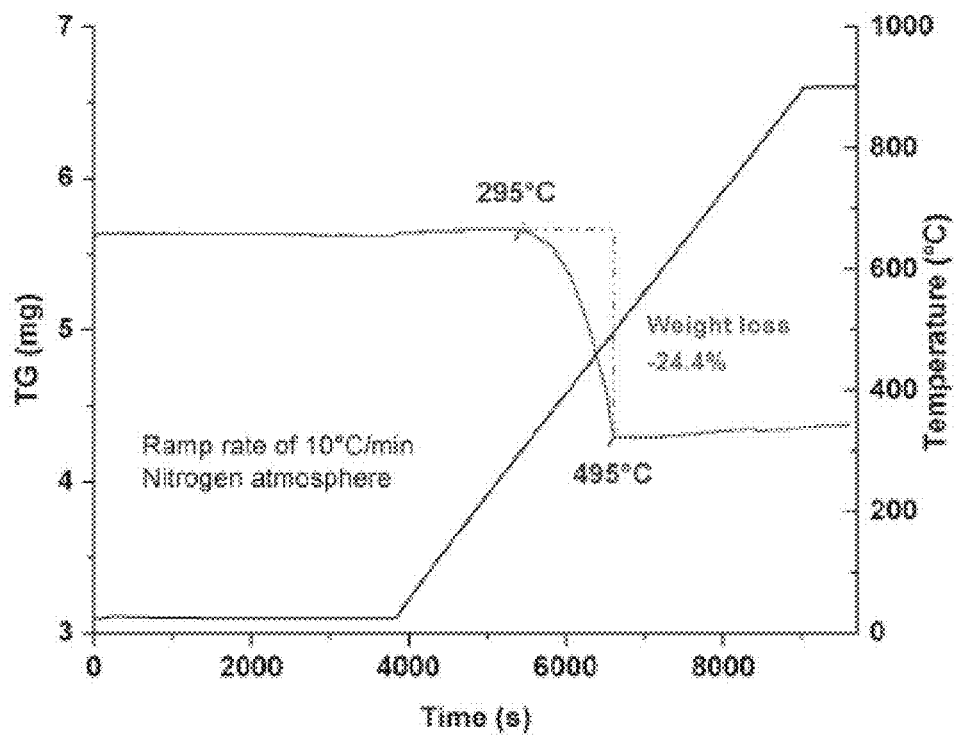

Thermal Stability of ZnO Nanotetrapod/TEOS-Derived SiO$_2$/Fluorinated Samples:

Thermal analysis was undertaken of the following four samples: (1) ZnO nanotetrapods, (2) ZnO nanotetrapods with a topcoat of amorphous SiO$_2$ constituted from hydrolysis and cross-linking of TEOS, (3) ZnO nanotetrapods functionalized with the M-chain silane, and (4) ZnO nanotetrapods with a topcoat of amorphous SiO$_2$ constituted from hydrolysis and cross-linking of TEOS and functionalized with the M-chain silane. Thermal analysis was performed by thermogravimetric analysis (TGA) under ambient nitrogen. The TGA data shown in FIG. 31 demonstrates the inherent stability of the ceramic ZnO nanotetrapods (FIG. 31A) with no discernible weight loss up to 900° C. Once the ZnO nanotetrapods were coated with an amorphous layer of SiO$_2$, a small weight loss of about 3.8% was observed in the temperature range of about 160-325° C. as shown in FIG. 31B. This weight loss may be due to the loss of residual water and hydroxyl groups from the porous SiO$_2$ layer, which leads to a greater degree of cross-linking and compaction of the silica matrix. FIG. 31C shows that once the ZnO nanotetrapods were functionalized with a perfluorinated compound there was a significant weight loss of about 25% in the temperature range of about 300-500° C. due to the gradual breakdown and removal of pendant fluorinated groups from the silanes attached to the ZnO nanotetrapods. The loss of omniphobic character and functionality due to the degradation of fluorine functionality for these samples occurs at temperatures much higher than previously reported for other comparable technologies. It should also be noted that crude oil is handled at temperatures on the order of 200°

C., which is well within the range where these coatings are stable. Finally, the slight increase in weight occurring for all samples at temperatures greater than about 800° C. may be due to oxygen uptake as a result of elimination of oxygen vacancies and residual Zn being oxidized to ZnO.

w/w of polystyrene/ethanol mixtures were prepared. The nominal diameter of the PS microspheres was approximately 2.4 m as verified by scanning electron microscopy (SEM).

Coatings were prepared by combining 7.5 wt. % 1500 nm $TiO_2$ (US Research Nanomaterials, Inc.) and deionized

TABLE 2

Water, hexadecane, and sales oil contact angles measured for micro- and nanotextured substrates with varying loadings of ZnO nanotetrapods and TEOS-derived $SiO_2$ and upon functionalization with either nonafluorohexyltriethoxysilane, a medium-chain (M-chain (C6)) silane or 1H,1H,2H,2H-perfluorooctanephosphonic acid (FPA), a perfluorinated phosphonic acid.

| Substrate | Etching Agent | Time | ZnO loading | TEOS derived $SiO_2$ Loading | Fluorinated Silane | CA water | CA Hexadecane | CA Sales oil |
|---|---|---|---|---|---|---|---|---|
| Steel | None | None | None | None | None | 63° ± 3° | 15° ± 3° | 59° ± 4° |
| Steel | None | None | None | None | 2.7 mM M-chain | 108° ± 9° | 76° ± 3° | 60° ± 4° |
| Steel | None | None | None | 3.9 μL/cm² | None | 84° ± 4° | | |
| Steel | None | None | None | 3.9 μL/cm² | 2.7 mM | 95° ± 8° | | |
| Steel | None | None | 7.8 mg/cm² | 3.9 μL/cm² | 2.7 mM, 9 h | 164° ± 2° | 76° ± 4° | 108° ± 6° |
| Steel | Mixed acid | 45 s | None | None | None | 40° ± 8° | | |
| Steel | Mixed acid | 45 s | None | None | 2.7 mM FPA | 145° ± 2° | | |
| Steel | Mixed acid | 90 s | None | None | None | 14° ± 3° | | |
| Steel | Mixed acid | 45 s | None | 3.9 μL/cm² | 2.7 mM M-chain | 113° ± 3° | | |
| Steel | Mixed acid | 45 s | None | None | 2.7 mM M-chain | 133° ± 3° | 105° ± 1° | |
| Steel | Mixed acid | 45 s | 7.8 mg/cm² | None | None | | | |
| Steel | Mixed acid | 45 s | 7.8 mg/cm² | None | 2.7 mM M-chain | 163° ± 5° | 69° ± 9° | |
| Steel | Mixed acid | 45 s | 7.8 mg/cm² | 3.9 μL/cm² | None | 116° ± 4° | | |
| Steel | Mixed acid | 45 s | 7.8 mg/cm² | 3.9 μL/cm² | 2.7 mM M-chain | 165° ± 4° | 51° ± 12° | 92° ± 6° |
| Steel | Mixed acid | 45 s | 7.8 mg/cm² | 3.9 μL/cm² | 8.1 mM M-chain | 164° ± 3° | 68° ± 2° | 125° ± 7° |
| Steel | Mixed acid | 45 s | 7.8 mg/cm² | 3.9 μL/cm² | 2.7 mM, 9 h | 157° ± 4° | 56° ± 3° | 119° ± 4° |
| Steel | HCl | 1 h | None | None | None | | | |
| Steel | HCl | 1 h | None | None | 2.7 mM M-chain | 107° ± 2° | 59° ± 4° | 58° ± 3° |
| Steel | HCl | 1 h | None | None | 2.7 mM FPA | 140° ± 5° | | |
| Steel | HCl | 1 h | 7.8 mg/cm² | None | None | | | |
| Steel | HCl | 1 h | 7.8 mg/cm² | None | 2.7 mM M-chain | 155° ± 6° | 79° ± 3° | 58° ± 3° |
| Steel | HCl | 1 h | 7.8 mg/cm² | 3.9 μL/cm² | None | | | |
| Steel | HCl | 1 h | None | 3.9 μL/cm² | 2.7 mM M-chain | 135° ± 4° | | |
| Steel | HCl | 1 h | 7.8 mg/cm² | 3.9 μL/cm² | 2.7 mM M-chain | 164° ± 5° | 60° ± 3° | 105° ± 7° |
| Steel | HCl | 1 h | 7.8 mg/cm² | 3.9 μL/cm² | 2.7 mM, 9 h | 152° ± 4° | 103° ± 4° | 124° ± 8° |
| Steel | HCl | 1 h | 7.8 mg/cm² | 3.9 μL/cm² | 8.1 mM M-chain | 168° ± 5° | 91° ± 2° | 139° ± 8° |
| Steel | HCl | 1 h | 7.8 mg/cm² | None | 2.7 mM FPA | 153° ± 5° | 135° ± 1° | |
| Steel | HCl | 1 h | 7.8 mg/cm² | None | 27.0 mM FPA | 168° ± 3° | | 133° ± 1° |
| Mesh 180 ga. | None | None | None | None | None | 127° ± 3° | 0° | 0° |
| Mesh 180 ga. | None | None | None | None | 2.7 mM M-chain | 130° ± 2° | 109° ± 9° | 0° |
| Mesh 180 ga. | None | None | None | 3.5 mg/cm² | None | 141° ± 2° | 0° | 0° |
| Mesh 180 ga. | None | None | None | 3.5 mg/cm² | 2.7 mM M-chain | 142° ± 1° | 107° ± 2° | 77° ± 6° |
| Mesh 180 ga. | None | None | None | 3.5 mg/cm² | 3.9 μL/cm² | None | 142° ± 2° | |
| Mesh 180 ga. | None | None | None | 3.5 mg/cm² | 3.9 μL/cm² | 2.7 mM M-chain | 156° ± 8° | 113° ± 7° | 145° ± 4° |
| Mesh 180 ga. | None | None | None | 3.5 mg/cm² | 3.9 μL/cm² | 8.1 mM M-chain | 144° ± 5° | 117° ± 5° | 151° ± 4° |
| Mesh 180 ga. | None | None | None | 7.0 mg/cm² | None | 27.0 mM FPA | 148° ± 1° | 145° ± 2° | 132° ± 5° |
| Mesh 100 ga. | None | None | None | 3.5 mg/cm² | 3.9 μL/cm² | 2.7 mM M-chain | 142° ± 1° | | |
| Mesh 100 ga. | None | None | None | 7.0 mg/cm² | 3.9 μL/cm² | 2.7 mM M-chain 9 h | 155° ± 1° | 95° ± 10° | 130° ± 4° |
| Mesh 80 ga. | None | None | None | 7.0 mg/cm² | None | 27.0 mM FPA | 155° ± 2° | | 156° ± 1° |

Example 2. $TiO_2$ $TiO_2$ nanoparticles of varying size were cast onto a low alloy steel surface in combination with micron-sized polystyrene (PS) spheres, the latter of which were used as sacrificial templates to prepare textured surfaces that exhibit superhydrophobic and superoleophobic properties.

Polystyrene microspheres were synthesized utilizing a modified dispersion polymerization approach. 17 mL of styrene, 1.5 g of 40,000 MW poly(vinylpyrrolidone) and 98 mL of anhydrous ethanol were added to a three-neck round bottom flask. The solution was stirred at 200 rpm and kept at a constant temperature of 70° C. while nitrogen was bubbled into the system. After 30 min, nitrogen bubbling was stopped and 0.15 g of 2,2'-azobis(2-methylpropionitrile) in 28 mL of ethanol was added to the flask and the system was allowed to react for 24 h. The synthesized microspheres were then centrifuged at 10,000 rpm for 15 min and washed with ethanol three times. Stock colloidal dispersions of 7% w/w of polystyrene/ethanol mixtures were prepared. The nominal diameter of the PS microspheres was approximately 2.4 m as verified by scanning electron microscopy (SEM).

Coatings were prepared by combining 7.5 wt. % 1500 nm $TiO_2$ (US Research Nanomaterials, Inc.) and deionized water with an aliquot of the prepared solution of colloidal polystyrene particles at a 1:1 (w/w) ratio of $TiO_2$ colloidal dispersion:polystyrene colloidal dispersion. Other sizes of $TiO_2$ particles were also prepared, including 20 nm $TiO_2$, 40 nm $TiO_2$, 100 nm $TiO_2$, and 800 nm $TiO_2$. The ratio of the $TiO_2$ colloidal dispersion:polystyrene dispersion ranged from 1:9 to 9:1.

The mixture was agitated and spray coated directly onto cleaned A36 steel substrates of 1" by 1" on a hot plate set to approximately 200° C. The steel was cleaned with hexane, ethanol, 1 wt. % Alconox™ solution, and deionized water.

The use of an appropriate relative ratio of polystyrene spheres and $TiO_2$ nanoparticles facilitated considerable control over the extent of surface texturation. The polystyrene spheres were eliminated by annealing of the coated substrates at 400° C. for 2 h, the polystyrene serving as a sacrificial template, leaving behind a micron-sized topography as shown in FIG. 32A through FIG. 32F with nanoscale texturation derived from the dimensions of the individual nanoparticles. FIG. 32A and FIG. 32B are SEM images at two different magnifications showing the nanoscale texturation resulting from coatings prepared utilizing 40 nm $TiO_2$. FIG. 32C and FIG. 32D are SEM images at two different magnifications showing the nanoscale texturation resulting from coatings prepared utilizing 800 nm $TiO_2$. FIG. 32E and FIG. 32F are SEM images at two different magnifications showing the nanoscale texturation resulting from coatings prepared utilizing 1500 nm $TiO_2$. In some examples, the polystyrene particles were dissolved using acetone. In some examples, $Ti(O^iPr)_4$ was spray-coated onto the substrate as an overlayer. The resulting coatings were tested and the results are shown in Tables 3 and 4.

Following the deposition procedure detailed above, $TiO_2$ nanospheres ranging in size from 20-150 nm were characterized by assessing water and viscous oil contact angle measurements. Contact angle measurements (see Table 3) were performed using a CAM 200 Optical Goniometer where a mechanical pipet dispensed doubly distilled and deionized water ($\rho$=18.2 M$\Omega$ cm$^{-1}$) with a volume of about 10 µL. Viscous oil (sales oil from a hydrocarbon recovery operation in Northern Alberta) was applied using a manual micropipette. The reported contact angles were an average of at minimum three measurements acquired at different regions of the substrate. Standard deviation values determined from performing the measurements in triplicate are also provided in Table 3. The ratio of colloidal $TiO_2$ nanoparticles:colloidal polystyrene spheres was 1:1. Table 3 depicts that the highest water and heavy oil contact angle values were obtained for the larger particle sizes. In particular, superoleophobic behavior corresponding to oil contact angles in excess of 150° was realized only for the 800 nm and 1500 nm diameter $TiO_2$ particles.

Table 4 shows adhesion results using the American Society for Testing Materials (ASTM) D3359 tape test and ASTM D2197 scrape test on a variety of samples with various loadings of the $TiO_2$ and PS mixture. The terminology "no coating" refers to the standard deposition of $TiO_2$ colloidal dispersion:polystyrene dispersion in a 1:1 ratio annealed at 400° C. for 2 h. The annealing temperature was further varied (300° C. and 800° C.) and the results for the same compositions are noted in Table 4. High-temperature annealing resulted in considerable delamination of the colloidally templated $TiO_2$ nanoparticle film. In some examples, an amorphous layer of $TiO_2$ was deposited using titanium (IV) isopropoxide, $Ti(O^iPr)_4$, as the precursor. Amorphous $TiO_2$ was applied atop the $TiO_2$ colloidal dispersion:polystyrene dispersion in a 1:1 ratio after annealing at 400° C. for 2 h. The additional $TiO_2$ overlayer brought about an increase in adhesion; however, further annealing the film at 600° C. diminished the strength of adhesion.

In another example, an amorphous layer of $SiO_2$ was deposited using tetraethyl orthosilicate (TEOS) as the precursor. In contrast to the A36 low-alloy steel, the standard deposition of $TiO_2$ colloidal dispersion:polystyrene dispersion in a 1:1 ratio annealed at 400° C. for 2 h was performed on aluminum. However, the use of TEOS as a precursor diminished the water and heavy oil contact angles owing to the poor binding of the perfluorinated phosphonic acid to $SiO_2$ surfaces.

Of the variety of conditions explored, good adhesion values and high contact angles resulted from 1500 nm $TiO_2$ nanospheres mixed in a 1:1 ratio and fluorinated in a 2.7 mM solution of FPA.

TABLE 3

Variation of water and heavy oil contact angles as a function of $TiO_2$ particle size for 1:1 mixtures of $TiO_2$ nanoparticles and polystyrene spheres

| Particle Size (nm) | Loading (mL) | FPA Concentration (mM) | Water Contact Angle | Heavy Oil Contact Angle |
|---|---|---|---|---|
| 20 | 11.9 | 2.7 | 157° ± 2° | 143° ± 4° |
| 50 | 9.3 | 2.7 | 154° ± 5° | 138° ± 2° |
| 40 | 10 | 2.7 | 165° ± 4° | 143° ± 1° |
| 40 | 10 | 27 | 169° ± 0° | 149° ± 6° |
| 800 | 10 | 2.7 | 144° ± 2° | 141° ± 1° |
| 800 | 10 | 27 | 160° ± 4° | 152° ± 6° |
| 1500 | 10 | 2.7 | 164° ± 5° | 161° ± 2° |
| 1500 | 10 | 27 | 148° ± 2° | 145° ± 2° |

TABLE 4

Adhesion of colloidally templated $TiO_2$ nanoparticle films under various film casting conditions with and without the addition of overlayers

| Coating | Loading (mL/in$^2$) | Tape test | Scrape test |
|---|---|---|---|
| No coating | 10 | 5B | 20-30 g |
| No coating | 1.3-4 | 2B | 20-30 g |
| 27 mM FPA | 10 | 5B | — |
| Annealing (800° C.) | 10 | 0B | N/A |
| Annealing (300° C.) | 10 | 5B | — |
| $Ti(O^iPr)_4$ (3 mL, 5%) | 10 | 5B | 50 g |
| $Ti(O^iPr)_4$ + annealing (600° C.) | 10 | 0B | 50 g |
| $Ti(O^iPr)_4$ (5 mL, 20%) | 10 | 5B | — |
| Aluminum | 1.3-2 | 5B | 10 g |
| TEOS (10 mL/in$^2$) | 10 | 5B | 40 g |
| TEOS (25-60 mL/in$^2$) | 10 | 5B | >1 kg |

Upon functionalization of the $TiO_2$ nanoparticles with self-assembled monolayers of FPA, heavy oil contact angles approaching 1600 were obtained, with facile gliding of heavy oil droplets on these surfaces. FIG. 33A shows a water contact angle of about 169° on the surface of a coating prepared utilizing 40 nm $TiO_2$ and functionalized with 27 mM FPA solution. FIG. 33B shows a sales oil contact angle of about 161° on the surface of a coating prepared utilizing 1500 nm $TiO_2$ and functionalized with 2.7 mM FPA solution. The extent of adhesion on planar steel substrates was relatively low, approaching about 50-100 g in scrape adhesion tests.

In summary, oleophobic behavior and very high oil contact angles were achieved without the use of a mesh and on planar substrates of different types utilizing a spray-coating process. At the conditions studied; however, relatively poor adhesion was observed, and the coatings were prone to damage under highly abrasive operational conditions.

Example 3. Electroless Deposition of Ni

FIG. 34A through FIG. 34E illustrates a process for preparing textured nickel coatings on steel utilizing electroless deposition. Polystyrene spheres were used as sacrificial templates. The unmodified steel is illustrated in FIG. 34A. Polystyrene and nickel were electrolessly deposited as illustrated in FIG. 34B, followed by removal of the polystyrene, as illustrated in FIG. 34C. The remaining electrolessly deposited nickel was functionalized with pendent fluorinated chains as illustrated in FIG. 34D. FIG. 34E illustrates the omniphobic coating on the steel resulting from the process.

Electroless nickel deposition includes reduction of a buffered nickel precursor under controlled conditions to yield substantially homogeneous polycrystalline thin films. The rate of deposition determined the surface roughness and adhesion. Polystyrene spheres were dispersed in the electroless nickel bath. The size and concentration of the polystyrene spheres were varied to control the micron-scale topography of the deposited thin films. The reducing agent was varied in composition and concentration to control the rate of deposition and thus the grain size. Low alloy steel surfaces were cleaned and electroless nickel deposition performed with varying reaction variables.

Electroless nickel and polytetrafluoroethylene (PTFE) electroless nickel kits (Caswell, Inc, having multiple "parts") were deposited according to instructions provided by the supplied kits and scaled according to the size of the substrate. A36 steel cut in 1" by 1" substrates were cleaned using hexane, ethanol, 1 wt. % Alconox™ solution, and deionized water. Cleaned substrates were then submerged into the electroless nickel solution of 63 mL deionized water, 4 mL part A, and 12 mL part B at approximately 90° C. Deposition was carried out for 30 min for a nickel coating of 0.0127 mm thickness. During the course of the deposition process, the nickel content was replenished every 6 min by the addition of 0.5 mL part A and 1 mL part C. Upon the completion of deposition, substrates were removed from the bath and rinsed with deionized water.

PTFE electroless nickel deposition baths were also prepared from the combination of 503 mL deionized water, 26 mL part A, 90 mL part B, and 3 g PTFE dispersion for a 1" by 1" substrate that was cleaned in the same manner as above. The bath was agitated with a magnetic stir bar throughout the entire deposition at 90° C. lasting 1 h for a coating of 0.01016 mm thickness. Nickel content was replenished every 12 min with a mixture of 5 mL part A, 10 mL part C and 0.5 g PTFE dispersion. Substrates were removed after the completion of the deposition and rinsed with deionized water.

The surface topographies were evaluated by scanning electron microscopy. Water contact angle measurements served as initial tests of surface texturation and were utilized to select samples for further optimization.

Functionalization with perfluorinated monolayers was performed. Perfluorinated phosphonic acids and carboxylic acids were examined with varying chain lengths of pendant groups. The surfaces were functionalized by immersion in appropriate solutions of fluorinated solvents. Heavy oil contact angle measurements were used to examine modification of the surface energy. Fourier transform infrared spectroscopy measurements were used to examine ordering of perfluorinated monolayers. Standard ASTM adhesion tests, ASTM D3359 (scotch tape test), D2197 (scrape adhesion), and D4541 (pull-off adhesion), were used to evaluate the adhesion strength. For surfaces showing oleophobicity, tilt angles corresponding to initiation of gliding of droplets of heavy oil were identified.

Contact angle measurements (see Tables 5-10) were performed using a CAM 200 Optical Goniometer where a mechanical pipet dispensed doubly distilled and deionized water ($\rho$=18.2 M$\Omega$ cm$^{-1}$) with a volume of about 10 µL. Viscous oil (sales oil from a hydrocarbon recovery operation in Northern Alberta) was applied using a manual micropipette. The reported contact angles were an average of at minimum three measurements acquired at different regions of the substrate. Standard deviation values determined from performing the measurements in triplicate are also provided in Tables 5-10.

Well-adhered electroless nickel layers were deposited onto planar low alloy steel substrates and were textured as well as functionalized with polytetrafluoroethylene (PTFE) and perfluorinated phosphonic acid to achieve contact angles in excess of 140° and even exceeding 150°. Tilt angles corresponding to initiation of gliding of droplets of heavy oil of 10° were observed. Adhesion properties were exceptional, typically above several kilograms in scrape adhesion tests. Films obtained were visually planar.

Low alloy steel surfaces were cleaned and manually sanded, sanded with a rotary sander, and ground with a grinder. Results are shown in Tables 5 to 10.

Table 5 shows data from manual sandpaper sanding with and without polytetrafluoroethylene (PTFE).

Table 6 shows data from using a Dremel 3000 surface roughening system to manually add texturation to the steel surface.

Table 7 shows data from using a metal grinder with the specified sandpaper grits to apply texturation to the surface. No additional functionalization was performed in this case.

In Table 8, contact angles (CA) of water and heavy oil are reported for initial nickel depositions and varying conditions of surface functionalization. Roughness was introduced to the steel substrates prior to deposition by manually roughening using sandpaper (60-D Aluminum Oxide #10111-15).

As shown in Table 9, additional fluorinating agents were examined on electroless Ni including perfluorooctane sulfonate (PFOS) and heptafluorobutyric acid (HFBA). FPA yielded the highest water and heavy oil contact angles, yielding superhydrophobic and superoleophobic behavior for functionalization from a 27 mM solution.

After coating the steel substrate, contact angles were measured 1, 12, 24, and 72 h upon immersion in a FPA solution of the appropriate concentration. Fluorinating conditions including time and concentration were varied. The most consistent results and reliable superhydrophobic and superoleophobic behavior was obtained upon functionalization with 27 mM FPA for 1 h. Results are provided in Table 10.

Table 11 shows the adhesion results using the American Society for Testing Materials (ASTM) D3359 tape test and ASTM D2197 scrape test on the surfaces obtained from each of the electroless nickel kits tested. Good adhesion was observed for both electroless nickel substrates and electroless nickel substrates with the addition of PTFE.

TABLE 5

Summary of results of water and heavy oil contact angles measured for nickel deposited onto the steel substrates after manual sandpaper sanding with and without polytetrafluoroethylene (PTFE)

| Manual Sandpaper | | Water CA | Heavy Oil CA | Water CA 27 mM FPA | Heavy Oil CA |
|---|---|---|---|---|---|
| 36-D/60-D | Electroless Ni | 0° | 70° ± 1° | 102° ± 3° | 85° ± 4° |
|  | PTFE Electroless Ni | 153° ± 11° | 110° ± 8° | 103° ± 19° | 142° ± 5° |

TABLE 5-continued

Summary of results of water and heavy oil contact angles measured for nickel deposited onto the steel substrates after manual sandpaper sanding with and without polytetrafluoroethylene (PTFE)

| Manual Sandpaper | | Water CA | Heavy Oil CA | Water CA 27 mM FPA | Heavy Oil CA |
|---|---|---|---|---|---|
| 36-D/100-C | Electroless Ni | 0° | 67° ± 3° | 94° ± 40° | 81° ± 7° |
|  | PTFE Electroless Ni | 138° ± 11° | 108° ± 8° | 104° ± 24° | 119° ± 0° |
| 60-D/100-C | Electroless Ni | 0° | 70° ± 6° | 103° ± 6° | 92° ± 10° |
|  | PTFE Electroless Ni | 125° ± 6° | 106° ± 8° | 88° ± 16° | 105° ± 3° |

TABLE 6

Summary of results of variation of water and heavy oil contact angles as a function of surface roughness induced using a Dremel 3000

| Dremel 3000 | | Water CA | Heavy Oil CA | Water CA 27 mM FPA | Heavy Oil CA |
|---|---|---|---|---|---|
| 16,000-21,0000 rpm | Electroless Ni | 0° | 77° ± 3° | 89° ± 14° | 87° ± 6° |
|  | PTFE Electroless Ni | 159° ± 11° | 124° ± 2° | 83° ± 37° | 117° ± 11° |
| 22,000-27,000 rpm | Electroless Ni | 0° | 67° ± 3° | 112° ± 13° | 98° ± 1° |
|  | PTFE Electroless Ni | 93° ± 23° | 107° ± 7° | 58° ± 9° | 112° ± 8° |
| 28,000-32,000 rpm | Electroless Ni | 0° | 74° ± 6° | 101° ± 7° | 86° ± 1° |
|  | PTFE Electroless Ni | 118° ± 16° | 114° ± 4° | 114° ± 6° | 106° ± 5° |

TABLE 7

Summary of results of variation of water and heavy oil contact angles induced using a metal angle grinder

| Metal Angle Grinder | | Water CA | Heavy Oil CA |
|---|---|---|---|
| 36 grit | 15 min PTFE Electroless Ni | 107° ± 7° | 87° ± 2° |
|  | 45 min PTFE Electroless Ni | 105° ± 3° | 88° ± 0° |
| 60 grit | 15 min PTFE Electroless Ni | 113° ± 6° | 90° ± 5° |
|  | 45 min PTFE Electroless Ni | 107° ± 4° | 83° ± 2° |
| 36/60 grit | 15 min PTFE Electroless Ni | 144° ± 6° | 132° ± 11° |
|  | 45 min PTFE Electroless Ni | 120° ± 6° | 133° ± 5° |

TABLE 8

Summary of results of water and heavy oil contact angles of electrolessly deposited Ni and Ni-polytetrafluoroethylene (Ni-PTFE) upon introduction of varying extents of surface roughness and variation of the FPA concentration

| | | Water CA | Heavy Oil CA |
|---|---|---|---|
| Standard | Electroless Ni (as per supplier specifications) | 47° ± 12° | 59° ± 2° |
|  | PTFE Electroless Ni (as per supplier specifications) | 130° ± 0° | 78° ± 4° |
| Standard Fluorinated | 2.7 mM FPA Electroless Ni | 109° ± 1° | 88° ± 16° |
| (1 hour) | 2.7 mM FPA PTFE Electroless Ni | 144° ± 7° | 114° ± 6° |
| Sandpaper | Electroless Ni | 80° ± 3° | 67° ± 4° |
|  | PTFE Electroless Ni | 165° ± 5° | 100° ± 6° |
| Fluorinated Sandpaper (1 hour) | 2.7 mM FPA Electroless Ni | 107° ± 3° | 81° ± 2° |
|  | 2.7 mM FPA PTFE Electroless Ni | 143° ± 3° | 104° ± 3° |
| Combo Sandpaper | Electroless Ni | 0° | 63° ± 3° |
|  | PTFE Electroless Ni | 143° ± 3° | 107° ± 5° |
| Fluorinated Combo Sandpaper (1 hour) | 2.7 mM Electroless Ni | 47° ± 3° | 80° ± 5° |
|  | 2.7 mM PTFE Electroless Ni | 146° ± 7° | 140° ± 8° |
| Increased FPA Concentration | 27 mM FPA Electroless Ni | 92° ± 5° | 87° ± 1° |
| Combo Sandpaper (1 hour) | 27 mM FPA PTFE Electroless Ni | 108° ± 18° | 130° ± 7° |

TABLE 9

Summary of results of variation of water and heavy oil contact angles (CA of electroless Ni and Ni-PTFE as a function of different functionalizing moieties and conditions

| | | Water CA | Heavy Oil CA |
|---|---|---|---|
| Standard | Electroless Ni | 47° ± 12° | 59° ± 2° |
| | PTFE Electroless Ni | 130° ± 0° | 78° ± 4° |
| Standard Fluorinated (1 hour) | 2.7 mM FPA Electroless Ni | 109° ± 1° | 88° ± 16° |
| | 2.7 mM FPA PTFE Electroless Ni | 144° ± 7° | 114° ± 6° |
| Increased FPA Concentration (1 hour) | 27 mM FPA Electroless Ni | 104° ± 6° | 86° ± 4° |
| | 27 mM FPA PTFE Electroless Ni | 160° ± 7° | 150° ± 14° |
| Fluorinated PFOS (1 hour) | 14 mM PFOS Electroless Ni | 0° | 99° ± 1° |
| | 14 mM PFOS PTFE Electroless Ni | 0° | 127° ± 5° |
| Fluorinated HFBA (1 hour) | 1 mM HFBA Electroless Ni | 26° ± 4° | 57° ± 4° |
| | 1 mM HFBA PTFE Electroless Ni | 139° ± 4° | 86° ± 5° |

TABLE 10

Summary of results of screening of water and heavy oil contact angles for different concentrations and immersion times

| PTFE Electroless Ni | Water CA | Heavy Oil CA | Water CA | Heavy Oil CA | Water CA | Heavy Oil CA | Water CA | Heavy Oil CA |
|---|---|---|---|---|---|---|---|---|
| | 1 hour | | 12 hour | | 24 hour | | 72 hour | |
| 2.7 mM FPA | 144° ± 7° | 114° ± 6° | — | — | — | — | — | — |
| 27 mM FPA | 160° ± 7° | 150° ± 14° | 136° ± 11° | 151° ± 6° | 154° ± 9° | 154° ± 6° | 147° ± 1° | 143° ± 4° |
| 50 mM FPA | — | — | 163° ± 8° | 149° ± 4° | 116° ± 5° | 134° ± 7° | 121° ± 17° | 85° ± 19° |

TABLE 11

Summary of results of adhesion properties of electroless Ni and Ni-PTFE

| | Tape test | Scrape test |
|---|---|---|
| Electroless Ni | 5B | 3 kg |
| PTFE Electroless Ni | 2B | 1 kg |

Superhydrophobic contact angles were achieved for the PTFE electroless nickel kit abraded manually with sandpaper and the superoleophobic contact angles were observed with the PTFE electroless nickel sample fluorinated for 24 h in the 27 mM FPA solution.

In summary, PTFE electroless nickel deposited and functionalized with 27 mM FPA for 24 hours provided had a roll-off angle of 100. The oxidation of surfaces of Ni provided improved omniphobicity.

The PTFE provided improved texturization over electrolessly plated nickel without the use of PTFE. Functionalization utilizing FPA provided better results by comparison to other fluorination.

The electroless nickel deposition to provide a nanotextured coating and functionalization provided excellent adhesion in excess of 1 kg in scrape adhesion testing and oil contact angles in excess of 140-150° were attained. Oil droplet gliding was also observed, although oil droplet gliding was inferior to that observed on the ZnO on metal mesh.

Advantageously, the use of a metallic nanostructured coating that has a coefficient of thermal expansion that is relatively close to that of the metal substrate renders the coating useful in thermal cycling applications.

Conclusions

The reduced diluent requirement, reduced safety and environmental risks, and the use of alternative railcar coatings and configurations may make shipping solid or semi-solid bitumen by rail less expensive and more attractive than shipping a liquid bitumen-diluent mixture by rail. A superoleophobic railcar coating or liner may be used to repel oil and allow bitumen to easily slide out of the railcar in one piece or in multiple pieces at refineries or other destinations. Superoleophobic coatings may reduce the costs associated with rail transportation of bitumen, making bitumen transportation by rail more competitive compared to oil transportation by pipeline. Superoleophobic and superomniphobic coatings may make re-use of the railcar more efficient by reducing the time, cost, or both required to clean the railcar before it is re-loaded and may improve rail facility loading and unloading processes.

Thermally robust and mechanically resilient surfaces that exhibit robust universal non-wettability were manufactured by combining microscale and nanoscale texturation with surface modification to obtain surfaces that were both hydrophobic as well as oleophobic and repellant to highly viscous sales oil. Microscale texturation was accomplished by using woven stainless steel meshes or by etching carbon steel substrates selectively along dislocations to define terraces. Nanoscale texturation was introduced by the deposition of ZnO nanotetrapods. The distinctive morphology of the nanotetrapods with four protuberant arms defined a nanoscale topography on both the mesh and etched steel substrates and facilitated the trapping of air pockets between the nanostructured layers and the steel substrates. TEOS was used as a precursor to constitute a thin layer of amorphous $SiO_2$ that bound the ZnO nanotetrapods to the steel surfaces based on condensation of silanols with surface hydroxyl groups on both the ZnO nanotetrapods and the surface oxides of the steel.

Functionalization of the ZnO nanotetrapods with perfluorinated phosphonic acid and of the ZnO nanotetrapod/TEOS-derived $SiO_2$ layers with perfluorinated silanes reduced the surface energy and yielded surfaces that strongly repelled water and oil. Without being limited to theory, liquid droplets impinging such surfaces are understood to be suspended in Cassie-Baxter states by the trapped air pockets within minimal contact points defined by the nanoscale terrain. The most omniphobic samples obtained, in terms of the ability to repel sales oil and to allow gliding of sales oil droplets on the surface, correspond to: (1) 80 gauge stainless steel meshes with a 7.0 mg/cm² loading of ZnO nanotetrapods functionalized by 1 h immersion in a 27.0 mM solution of 1H,1H,2H,2H-perfluorooctanephosphonic acid (FPA) in tetrahydrofuran (THF), which showed water and sales oil contact angles of 155°±2° and 156°±1°, respectively; (2) 180 gauge stainless steel meshes with a 7.0 mg/cm$^2$ loading of ZnO nanotetrapods functionalized by 1 h immersion in a 27.0 mM solution of FPA in THF, which showed water and sales oil contact angles of 148°±1° and 132°±5°, respectively; and (3) carbon steel etched with a 1:1 mixture of HCl:H$_2$O for 1 h at 80° C., with a 7.0 mg/cm$^2$ loading of ZnO nanotetrapods, 3.9 µL/cm$^2$ overlayer of TEOS-derived SiO$_2$, and functionalization by 1 h immersion in a 8.1 mM solution of nonafluorohexyltriethoxysilane (M-chain (C6)), which showed water and sales oil contact angles of 168°±5° and 139°±8°, respectively.

Upon optimization of the extent of nanotexturation and grafting density of the fluorinated moieties (and thus the surface energy), even viscous low surface tension droplets of sales oil glided off these surfaces. The steel meshes were much more amenable to sliding of sales oil droplets as compared to the etched surfaces, likely as a result of the more uniform texturation, which limits the number of pinning sites. The direct integration of hierarchical texturation and surface modification onto steel substrates provides a viable solution for oil-handling that is scalable, able to withstand high temperature, high pressure conditions, and compatible with existing infrastructure. Such ceramic omniphobic surfaces are stable up temperatures of 295° C. and are thus viable for applications in oil-handling equipment including tanker trucks, pipelines, storage tanks, and railcars.

The electroless nickel deposition to provide a nanotextured coating and functionalization provided excellent adhesion in excess of 1 kg in scrape adhesion testing and oil contact angles in excess of 140-150° were attained. PTFE electroless nickel deposited and functionalized with 27 mM FPA for 24 hours had a roll-off angle of 10°. The oxidation of surfaces of Ni provided improved omniphobicity. Thus, oil droplet gliding was also observed.

The electrolessly deposited nickel has a coefficient of thermal expansion that is relatively close to that of the metal substrate, by comparison to a ceramic, rendering the coating useful in thermal cycling applications, including applications in oil-handling equipment including tanker trucks, pipelines, storage tanks, and railcars.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

The invention claimed is:

1. A method of producing a superoleophobic coating for a vessel for transporting material that is solid or semi-solid at room temperature, the method comprising:
    applying a coating of ZnO nanotetrapods having protuberant and tapered arms, the coating of ZnO nanotetrapods having a porous network of interconnected micron-sized pores that trap air, to a surface of the vessel, the surface comprising textured metal;
    applying SiO$_2$ to the ZnO nanotetrapods layer to provide a nanotextured coating; and
    functionalizing the nanotextured coating with a fluorinated compound, providing a superoleophobic coating that is not wetted by heavy oil or bitumen and is stable at heavy oil handling temperatures of about 200° C., facilitating the flow of the heavy oil or bitumen along the surface.

2. The method according to claim 1, comprising chemically etching the surface or mechanically roughening the surface to provide the textured metal prior to applying the coating of ZnO nanotetrapods.

3. The method according to claim 1, wherein the surface comprises a metal mesh.

4. The method according to claim 1, wherein functionalizing the nanotextured coating with a fluorinated compound provides a superomniphobic coating.

5. The method according to claim 1, wherein functionalizing the nanotextured coating with the fluorinated compound comprises applying at least one of a silane, a phosphonic acid, a carboxylic acid, a sulfonate, an alcohol, a thiol, and an amine to the nanotextured coating.

6. The method according to claim 1, wherein applying SiO$_2$ comprises applying SiO$_2$ to form an amorphous SiO$_2$ shell.

7. The method according to claim 1, wherein applying SiO$_2$ comprises applying an overlayer of TEOS-derived SiO$_2$.

8. The method according to claim 1, wherein the surface of the vessel comprises an etched steel surface.

* * * * *